US008837853B2

(12) United States Patent
Tachi

(10) Patent No.: US 8,837,853 B2
(45) Date of Patent: Sep. 16, 2014

(54) IMAGE PROCESSING APPARATUS, IMAGE PROCESSING METHOD, INFORMATION RECORDING MEDIUM, AND PROGRAM PROVIDING IMAGE BLUR CORRECTION

(75) Inventor: Masayuki Tachi, Tokyo (JP)

(73) Assignee: Sony Corporation, Tokyo (JP)

( * ) Notice: Subject to any disclaimer, the term of this patent is extended or adjusted under 35 U.S.C. 154(b) by 34 days.

(21) Appl. No.: 13/565,264

(22) Filed: Aug. 2, 2012

(65) Prior Publication Data

US 2013/0057734 A1 Mar. 7, 2013

(30) Foreign Application Priority Data

Sep. 6, 2011 (JP) ................................. 2011-194417
Sep. 6, 2011 (JP) ................................. 2011-194418

(51) Int. Cl.
| | | |
|---|---|---|
| G06K 9/40 | (2006.01) | |
| G06T 5/00 | (2006.01) | |
| H04N 5/217 | (2011.01) | |
| H04N 9/04 | (2006.01) | |
| G06K 9/00 | (2006.01) | |
| H04N 5/357 | (2011.01) | |

(52) U.S. Cl.
CPC ...... *H04N 5/217* (2013.01); *G06T 2207/10024* (2013.01); *G06T 5/003* (2013.01); *H04N 5/3572* (2013.01); *H04N 9/045* (2013.01)
USPC ........................................................ 382/263

(58) Field of Classification Search
CPC ........ H04N 5/217; G06T 5/001; G06T 5/002; G06T 5/20
USPC ............. 382/254, 260–264, 275; 348/208.12, 348/208.99, 241, 242, E05.037, E05.078; 396/51, 53, 55
See application file for complete search history.

(56) References Cited

U.S. PATENT DOCUMENTS

| | | | | |
|---|---|---|---|---|
| 5,585,884 A | * | 12/1996 | Onuki ............................. | 396/51 |
| 7,486,879 B2 | * | 2/2009 | Moriya et al. ................... | 396/53 |
| 7,561,186 B2 | * | 7/2009 | Poon ......................... | 348/208.99 |
| 8,279,290 B2 | * | 10/2012 | Yamanaka ................. | 348/208.5 |
| 2008/0151066 A1 | * | 6/2008 | Serikawa ................... | 348/208.6 |
| 2013/0057734 A1 | * | 3/2013 | Tachi ........................... | 348/242 |

FOREIGN PATENT DOCUMENTS

| | | |
|---|---|---|
| JP | 2006-246080 A | 9/2006 |
| JP | 2009-159603 A | 7/2009 |
| JP | 2010-081263 A | 4/2010 |
| JP | 2011-055038 A | 3/2011 |

* cited by examiner

*Primary Examiner* — Amir Alavi
(74) *Attorney, Agent, or Firm* — Wolf, Greenfield & Sacks, P.C.

(57) ABSTRACT

There is provided an image processing apparatus including an image signal correction unit for performing a blur correction process on an image. The image signal correction unit includes a blur correction processing section configured to perform a blend process for a default filter and a coordinate position-corresponding high pass filter, which is generated according to an image height of a pixel to be subjected to blur correction, using a blend coefficient determined according to the image height of the pixel to be subjected to blur correction, and to perform a blur correction process using a filter generated through the blend process.

22 Claims, 30 Drawing Sheets

(b) WIENER FILTER (a) PHOTOGRAPHED IMAGE (CONVOLUTION OPERATION OF 25 PIXELS OF W COMPONENT)

FIG. 6
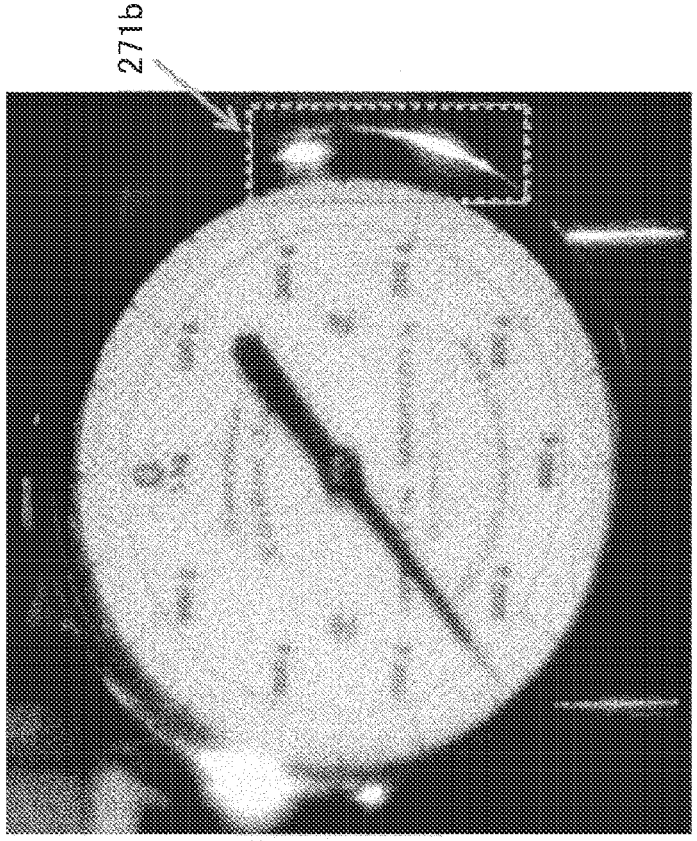
(a) BEOFRE BLUR CORRECTION PROCESS
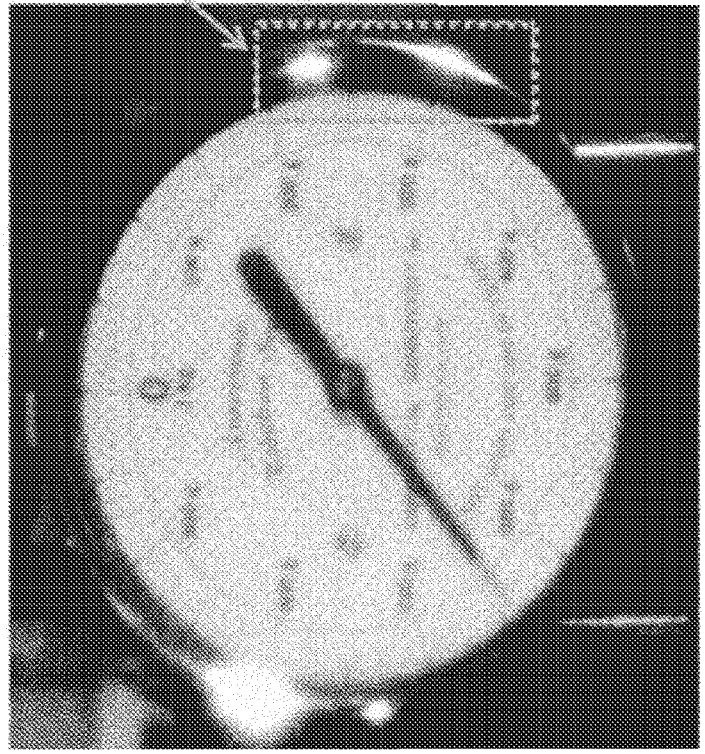
(b) AFTER BLUR CORRECTION PROCESS

FIG. 7

| G | R | G | B | G | R | G |
|---|---|---|---|---|---|---|
| B | G | B | G | B | G | B |
| G | R | G | R | G | R | G |
| R | G | B | G | B | G | R |
| G | R | G | R | G | R | G |
| B | G | B | G | B | G | B |
| G | R | G | B | G | R | G |

PERFORM THRESHOLD VALUE DETERMINATION PROCESS BY COMPARING PIXEL VALUE WITH PREDETERMINED THRESHOLD VALUE AT ALL 7 × 7 PIXELS AROUND TARGET PIXEL

⇒ ex. THRESHOLD VALUE DETERMINATION (SATURATION DETECTION) IN EACH ROW

○ DETECT SATURATION PIXEL (HIGHLIGHT) AREA, AND REPLACE SATURATION PIXEL AREA WITH SIGNAL WITHOUT BLUR CORRECTION PROCESS

○ DETECTION METHOD OF SATURATION PIXEL (HIGHLIGHT) IS THAT IT IS DETERMIEND WHETHER 7 × 7 PIXELS EXCEED THRESHOLD VALUE
⇒ IF AT LEAST ONE PIXEL EXCEEDS THRESHOLD VALUE, SINCE FALSE COLOR IS HIGHLY LIKELY TO BE GENERATED, REPLACE PIXEL AREA WITH SIGNAL WITHOUT CORRECTION PROCESS

FIG. 10
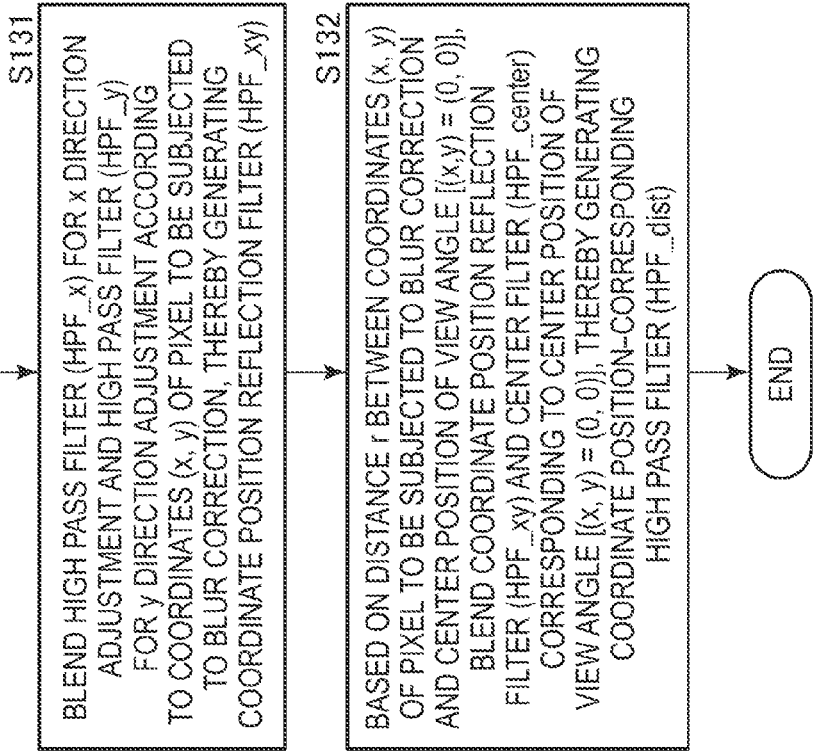
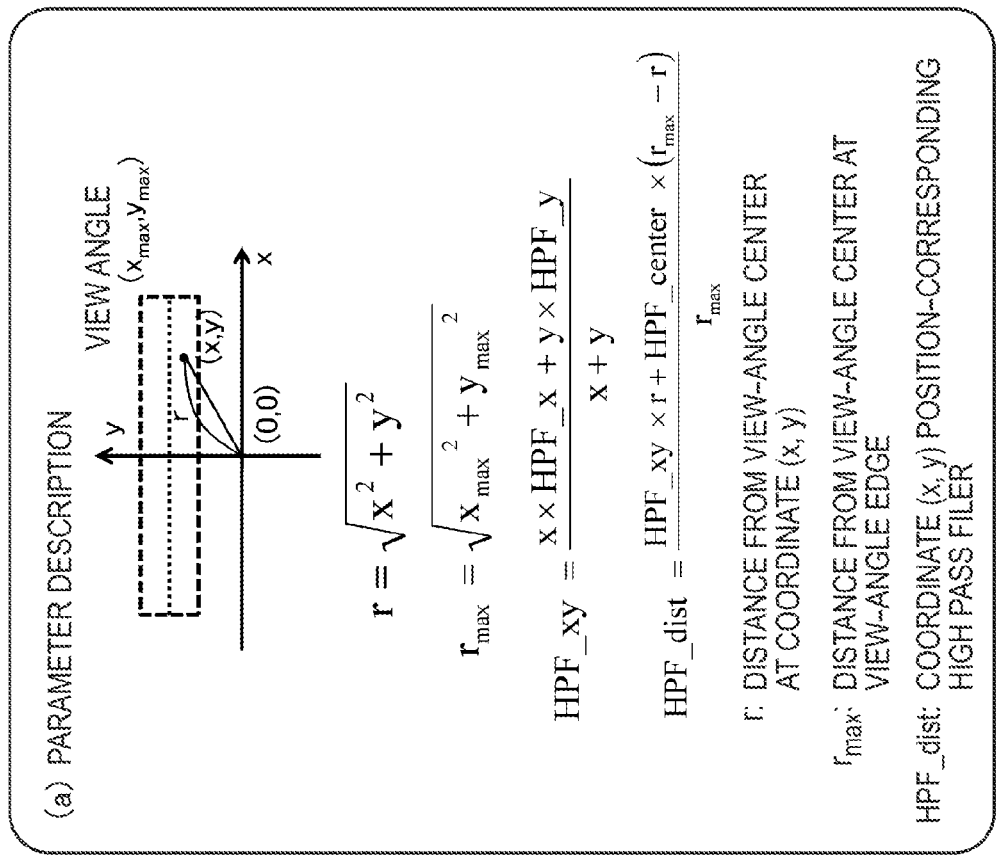

FIG. 26

(e) WHEN R PIXELS ARE POSITIONED ON OBLIQUE LINE FROM LEFT UPPER TO RIGHT LOWER SIDE OF CENTER PIXEL G (f) WHEN B PIXELS ARE POSITIONED ON OBLIQUE LINE FROM LEFT UPPER TO RIGHT LOWER SIDE OF CENTER PIXEL G

FIG. 27

FIG. 29
(a) mW CALCULATION FILTER
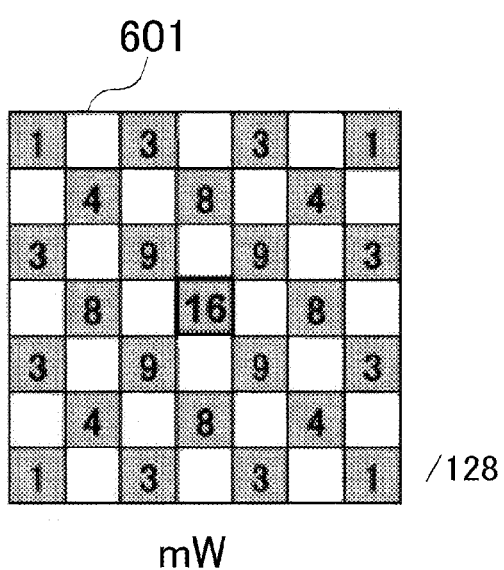
mW /128
(b) Wn CALCULATION FILTER
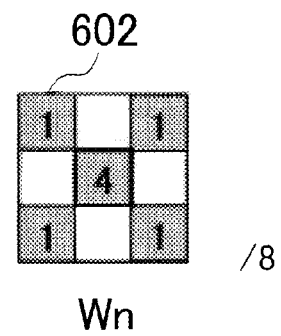
Wn /8

IMAGE PROCESSING APPARATUS, IMAGE PROCESSING METHOD, INFORMATION RECORDING MEDIUM, AND PROGRAM PROVIDING IMAGE BLUR CORRECTION

CROSS REFERENCE TO RELATED APPLICATIONS

The present application claims priority under 35 U.S.C. §119 to Japanese Patent Application No. JP 2011-194417, filed in the Japan Patent Office on Sep. 6, 2011, and claims priority to Japanese Patent Application No. JP 2011-194418, filed in the Japan Patent Office on Sep. 6, 2011, the entire contents of each of which are incorporated herein by reference.

BACKGROUND

The present disclosure relates to an image processing apparatus, an image processing method, an information recording medium, and a program, and more particularly, an image processing apparatus and method for performing image blur correction, an information recording medium, and a program.

In an image photographed by an imaging apparatus such as a digital camera, for example, noise or blurring occurs due to focus shift, lens aberration, and further noise occurring in a CCD, a CMOS and the like, which are imaging elements.

Particularly, in a camera using an inexpensive lens, blurring of an image is severe due to lens aberration as an image height (a distance from an optical center) increases.

A correction process of noise or blurring of an image caused by various factors as described above has been disclosed in the related arts, for example, Japanese Unexamined Patent Application Publication No. 2006-246080, Japanese Unexamined Patent Application Publication No. 2009-159603, Japanese Unexamined Patent Application Publication No. 2010-081263, and the like.

Japanese Unexamined Patent Application Publication No. 2006-246080 discloses a correction process configuration using sharpening parameters differing in units of areas of a photographed image. In detail, image correction is performed by enhancing the sharpening parameters as an image height (a distance from an optical center) increases.

However, since the process of Japanese Unexamined Patent Application Publication No. 2006-246080 corresponds to only a process for enhancing the magnitude of a high frequency component according to an image height, and for example, does not consider a change and the like in frequency characteristics of magnification chromatic aberration or blurring, there is a problem that appropriate correction may not be performed.

Furthermore, Japanese Unexamined Patent Application Publication No. 2009-159603 discloses a configuration in which, in order to cope with blurring changed by individual differences or manufacturing errors of lenses, filters are selected according to respective lens characteristics and a blur correction process is performed.

However, if the correction process is applied to blur with a blur pattern continuously changing according to an image height as with the aforementioned image height-dependent blur, there is a problem that the number of types of filters for blur correction is huge.

Moreover, Japanese Unexamined Patent Application Publication No. 2010-081263 discloses a configuration in which filters whose positions of center of gravity are shifted in respective image heights are applied to so-called partial blur indicating a blur pattern in which unevenness occurs due to the image heights, so that appropriate correction is performed according to the image heights.

In detail, correction corresponding to the partial blur is performed by correcting the positions of the center of gravity of the filters. However, since the positions of the center of gravity are mainly corrected, control of correction magnitude is not shown, and individual processes corresponding to a very blurred part and a less blurred part are not performed, appropriate correction may not be performed.

Moreover, Japanese Unexamined Patent Application Publication No. 2011-055038 discloses a correction process for a photographed image of an imaging apparatus provided with a filter having an RGBW array including a full wavelength transmission white (W) pixel as well as each RGB color as a filter subordinate to an imaging element.

In the case of using the filter having the RGBW array including the white (W) pixel, since the W pixel transmits visible rays with a wide wavelength region, a blur pattern is changed according to an object color.

In the process of Japanese Unexamined Patent Application Publication No. 2011-55038, uniform correction not dependent on an object color is performed, but there is a problem that a correction effect may not be sufficiently obtained for a blur pattern changed according to the object color.

Furthermore, in most configurations of the aforementioned related arts, for example, pixel value correction is performed based on filtering using a convolution operation. However, in order to perform various types of correction, since the configurations require many filters for performing the filtering and a large storage capacity memory, there is a problem that it is difficult for a small and inexpensive camera to employ the configurations.

SUMMARY

In light of the foregoing, it is desirable to provide an image processing apparatus and method for performing appropriate correction according to an image height in a configuration in which image blur correction is performed, an information recording medium, and a program.

Furthermore, in an embodiment of the present disclosure, it is desirable to provide an image processing apparatus, in which a blur correction filter corresponding to various types of blur is appropriately calculated and used based on a default filter, so that the number of filters to be stored in a memory in advance is reduced, an image processing method, an information recording medium, and a program.

According to a first embodiment of the present disclosure, there is provided an image processing apparatus including an image signal correction unit for performing a blur correction process on an image. The image signal correction unit includes a blur correction processing section configured to perform a blend process for a default filter and a coordinate position-corresponding high pass filter, which is generated according to an image height of a pixel to be subjected to blur correction, using a blend coefficient determined according to the image height of the pixel to be subjected to blur correction, and to perform a blur correction process using a filter generated through the blend process.

Further, according to an embodiment of the image processing apparatus of the present disclosure, the blur correction processing section performs a blend process for the default filter and the coordinate position-corresponding high pass filter using a blend coefficient determined according to the image height of the pixel to be subjected to blur correction and focus position information, and performs the blur correction process using a filter generated through the blend process.

Further, according to an embodiment of the image processing apparatus of the present disclosure, the blur correction processing section performs the blend process to reduce a blend rate of the coordinate position-corresponding high pass filter when the image height is increased as a pixel position of the pixel to be subjected to blur correction becomes farther from an image center.

Further, according to an embodiment of the image processing apparatus of the present disclosure, the blur correction processing section blends a high pass filter HPF_x for x direction adjustment, a high pass filter HPF_y for y direction adjustment, and a center filter HPF_center corresponding to a center position of a view angle [(x,y)=(0,0)] according to a pixel position of the pixel to be subjected to blur correction, thereby generating the coordinate position-corresponding high pass filter, the high pass filter HPF_x and the high pass filter HPF_y being held in a memory in advance.

Further, according to an embodiment of the image processing apparatus of the present disclosure, the blur correction processing section generates a magnitude adjustment filter by performing enhancing magnitude adjustment for the coordinate position-corresponding high pass filter according to the image height of the pixel to be subjected to blur correction, and performs the blur correction process using the magnitude adjustment filter.

Further, according to an embodiment of the image processing apparatus of the present disclosure, the blur correction processing section divides the coordinate position-corresponding high pass filter into a DC component and an AC component, performs an adjustment process for the AC component using a magnitude adjustment parameter corresponding to the image height of the pixel to be subjected to blur correction, and re-synthesizes the DC component with the AC component for which the adjustment process has been performed, thereby generating the magnitude adjustment filter.

Further, according to an embodiment of the image processing apparatus of the present disclosure, the blur correction processing section performs enhancing magnitude adjustment for the coordinate position-corresponding high pass filter using the image height of the pixel to be subjected to blur correction and a magnitude adjustment parameter corresponding to focus position information, thereby generating the magnitude adjustment filter.

Further, according to an embodiment of the image processing apparatus of the present disclosure, the image signal correction unit further includes an edge detection section configured to detect edge information of an image, and a blend processing section configured to output an image signal correction result. The blend processing section receives the edge information output from the edge detection section, a blur-corrected signal generated by the blur correction process through the blur correction process, and a signal without blur correction before the blur correction process is performed, and performs a blend process for the blur-corrected signal and the signal without blur correction according to a blend rate determined according to the edge information, thereby generating an output signal.

Further, according to an embodiment of the image processing apparatus of the present disclosure, the image signal correction unit is configured to perform the blur correction process for an output signal of an imaging element having an RGBW array including RGB pixels and a W (White) pixel, and at a time of the blur correction process for a W pixel signal to be corrected, the image signal correction unit generates a color ratio reflection blur correction filter having reflected a color ratio of a local area including the W pixel signal, and performs the blur correction process using the color ratio reflection blur correction filter.

Further, according to an embodiment of the image processing apparatus of the present disclosure, the blur correction processing section generates an interpolated image having the W pixel signal corresponding to all pixels through an interpolation process using the W pixel signal included in the output signal of the imaging element, generates the color ratio reflection blur correction filter for each W pixel constituting the generated interpolated image, and performs the blur correction process using the color ratio reflection blur correction filter.

Further, according to an embodiment of the image processing apparatus of the present disclosure, the blur correction processing section calculates low frequency components of RGB colors of the local area, and sets a ratio of values of the calculated low frequency components of the RGB colors as the color ratio of the local area.

Further, according to an embodiment of the image processing apparatus of the present disclosure, the blur correction processing section blends an R-corresponding blur correction filter, a G-corresponding blur correction filter, a B-corresponding blur correction filter held in a memory in advance according to a blend rate determined according to RGB color ratios of the local area, thereby generating the color ratio reflection blur correction filter.

Further, according to an embodiment of the image processing apparatus of the present disclosure, the image signal correction unit includes a saturation detection section configured to detect whether a saturation pixel is included in a local area including a plurality of pixels having the pixel to be subjected to blur correction. The blur correction processing section receives detection information from the saturation detection section, does not perform blur correction on the pixel to be subjected to blur correction when the saturation pixel is included in the local area, and performs the blur correction on the pixel to be subjected to blur correction only when the saturation pixel is not included in the local area.

Furthermore, according to a second embodiment of the present disclosure, there is provided an image processing apparatus including an image signal correction unit for performing a blur correction process on an image. The image signal correction unit divides a filter for blur correction into a DC component and an AC component, performs magnitude adjustment for the AC component using a magnitude adjustment parameter to be calculated according to an image height of a pixel to be subjected to blur correction, re-synthesizes the DC component with the AC component for which the magnitude adjustment has been performed to generate a magnitude adjustment filter, and performs blur correction using the magnitude adjustment filter.

Furthermore, according to a third embodiment of the present disclosure, there is provided an image processing method of performing a blur correction process on an image in an image processing apparatus. An image signal correction unit performs a blend process for blending a default filter and a coordinate position-corresponding high pass filter, which is generated according to an image height of a pixel to be subjected to blur correction according to a blend rate determined according to the image height of the pixel to be subjected to blur correction, and performs the blur correction process using a filter generated through the blend process.

Furthermore, according to a fourth embodiment of the present disclosure, there is provided an image processing method of performing a blur correction process on an image in an image processing apparatus. An image signal correction unit divides a filter for blur correction into a DC component and an AC component, performs magnitude adjustment for the AC component using a magnitude adjustment parameter to be calculated according to an image height of a pixel to be subjected to blur correction, re-synthesizes the DC component with the AC component for which the magnitude adjustment has been performed to generate a magnitude adjustment filter, and performs blur correction using the magnitude adjustment filter.

Furthermore, according to a fifth embodiment of the present disclosure, there is provided a program for causing a blur correction process on an image to be performed in an image processing apparatus. The program causes an image signal correction unit to perform a blend process for blending a default filter and a coordinate position-corresponding high pass filter, which is generated according to an image height of a pixel to be subjected to blur correction according to a blend rate determined according to the image height of the pixel to be subjected to blur correction, and the blur correction process using a filter generated through the blend process.

Furthermore, according to a sixth embodiment of the present disclosure, there is provided a recording medium for recording a program for causing a blur correction process on an image to be performed in an image processing apparatus. The recording medium records the program for causing an image signal correction unit to perform a blend process for blending a default filter and a coordinate position-corresponding high pass filter, which is generated according to an image height of a pixel to be subjected to blur correction according to a blend rate determined according to the image height of the pixel to be subjected to blur correction, and the blur correction process using a filter generated through the blend process.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The purposes, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to the configuration of an embodiment of the present disclosure, an apparatus and method for performing an optimal blur correction process according to an image height and the like of each pixel constituting an image are realized.

In detail, the apparatus includes an image signal correction unit for performing a blur correction process on an image, wherein the image signal correction unit blends a default filter and a coordinate position-corresponding high pass filter, which is generated according to an image height of a pixel to be subjected to blur correction, using a blend coefficient corresponding to the image height of the pixel to be subjected to blur correction, and performs blur correction using a filter generated through the blend process. For example, when the image height is increased the farther a pixel position of the pixel to be subjected to blur correction is from an image center, the image signal correction unit performs a blend process to reduce a blend rate of the coordinate position-corresponding high pass filter. Alternatively, the image signal correction unit generates a magnitude adjustment blur correction filter for which magnitude adjustment has been performed according to the image height, and performs blur correction.

Through the present processes, the optimal blur correction process according to an image height and the like of each pixel constituting an image is realized.

BRIEF DESCRIPTION OF THE DRAWINGS

FIGS. 6A-B are diagrams for describing false color generation and blur correction for a pixel area including a saturation pixel;

FIG. 7 is a diagram for describing a process in which no blur correction is performed for a pixel to be corrected when a saturation pixel is included around a pixel to be subjected to blur correction;

FIG. 10 is a flowchart for describing a sequence of generating a coordinate position-corresponding high pass filter HPF_dist;

FIG. 26 is a diagram for describing a configuration example of low frequency component calculation filters for calculating low frequency components mR, mG, and mB;

FIG. 27 is a diagram for describing a configuration example of low frequency component calculation filters for calculating low frequency components mR, mG, and mB;

FIGS. 29A-B are diagrams for describing an example of a low frequency component calculation filter for calculating a low frequency component mW, and a filter for calculating a W signal Wn having no noise signal.

DETAILED DESCRIPTION OF THE EMBODIMENT(S)

Figure 1:
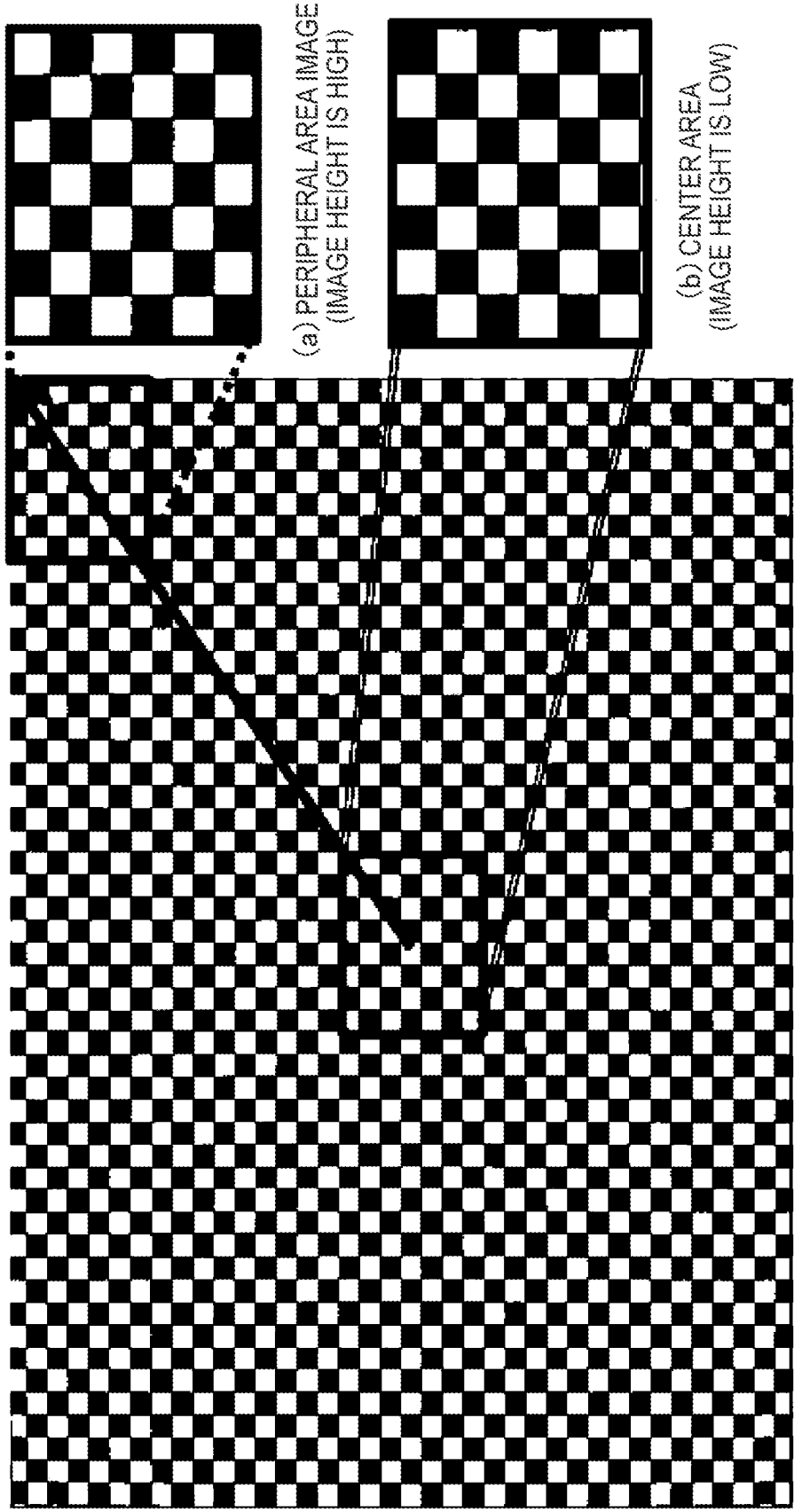
FIGS. 1A-B are diagrams for describing a blur pattern generated according to an image height.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing apparatus, an image processing method, an information recording medium, and a program of the present disclosure will be described in detail with reference to the appended drawings. In addition, the description will be given in the following order.

1. Characteristics of Blur Generated in Photographed Image, and Overview of Filter Applicable to Blur Correction
2. (First Embodiment) Configuration Example of Image Processing Apparatus
3. Details of Blur Correction Process of Image Processing Apparatus According to First Embodiment
4. (Second Embodiment) Configuration Example of Image Processing Apparatus for Performing Blur Correction in Consideration of Color Ratio
5. Details of Blur Correction Process of Image Processing Apparatus According to Second Embodiment
6. Conclusion of Configuration of Present Disclosure 1. Characteristics of Blur Generated in Photographed Image, and Overview of Filter Applicable to Blur Correction Before a detailed description of an image processing apparatus of the present disclosure is provided, characteristics of blur generated in a photographed image and the basic overview of a filter applicable to blur correction will be described.

As described above, in an image photographed by an imaging apparatus such as a digital camera, blurring occurs due to lens characteristics, or characteristics of an imaging element such as a CCD or a CMOS.

Particularly, in a camera using an inexpensive lens, blurring of an image becomes severe due to lens aberration as an image height (a distance from an optical center) increases.

The pattern of blur occurring due to an image height will be described with reference to FIG. 1.

FIG. 1 illustrates a photographed image with a checker pattern in which rectangular white areas and black areas are alternately set.

As illustrated in FIG. 1, blurring is small in a center area of the image. That is, blurring is small toward an optical center (an image height is reduced).

Meanwhile, as the distance from the optical center increases, that is, as the image height increases, blurring is severe.

As described above, blur occurring in the image photographed by a camera is small in the center of an image area near the optical center of the lens of the camera, and is severe in a peripheral area of the image away from the optical center of the lens.

Next, a Wiener filter will be simply described as an example of a filter used in image blur correction. The following three images are considered:

(1) Ideal Image with no Blur (original image);
(2) Photographed Image with Blur;
(3) Restored Image Restored by Applying Filter Processing to Photographed Image.

Here, a filter in which a square error of the above two images (1) and (3) is minimal will be called a least square filter or a Wiener filter.

Hereinafter, $f(x,y)$ is defined as the ideal image with no blur (the original image), $g(x,y)$ is defined as the photographed image with blur, $h(x,y)$ is defined as a degradation function due to lens aberration or shaking, and $n(x,y)$ is defined as a noise component.

$(x,y)$ indicates pixel positions of images, and $f(x,y)$, $g(x,y)$, $h(x,y)$, and $n(x,y)$ may indicate pixel values of coordinate positions $(x,y)$ of the images.

Here, if it is assumed that the degradation function $h(x,y)$ due to lens aberration or shaking has a fixed value, the following Equation 1 is established.

$$g(x,y) = \iint h(x-x', y-y') \cdot f(x',y') \cdot dx' dy' + n(x,y) \quad \text{Equation 1}$$

If both sides of Equation 1 are Fourier transformed, Equation 2 below is obtained.

$$G(u,v) = H(u,v) \times F(u,v) + N(u,v) \quad \text{Equation 2}$$

In Equation 2 above, $G(u,v)$, $H(u,v)$, $F(u,v)$, and $N(u,v)$ indicate Fourier transforms of $g(x,y)$, $h(x,y)$, $f(x,y)$, and $n(x,y)$, respectively.

When there is no zero point in the degradation function due to the lens aberration or shaking from Equation 2 above and a noise component has already been known, $F(u,v)$ can be calculated as in Equation 3 below.

$$F(u,v) = \frac{G(u,v) - N(u,v)}{H(u,v)} \quad \text{Equation 3}$$

However, since the noise component is generally unknown, it is not possible to strictly solve Equation 3 above. In this regard, blur correction is performed using a Wiener filter $K(u,v)$ of Equation 4 below which allows an error between an ideal image F and a blur-corrected restoration image F' to be minimal $$K(u,v) = \frac{H(u,v)}{|H(u,v)|^2 + (S_n(u,v)/S_f(u,v))} \quad \text{Equation 4}$$

In Equation 4 above, $(S_n(u,v)/S_f(u,v))$ indicates a power spectral density $\Gamma$ of the ideal image (original image) F and noise N ($\Gamma = S_n(u,v)/S_f(u,v)$).

As expressed in Equation 5 below, $k(x,y)$, which is obtained by inverse Fourier transforming the filter, and a measured image are convoluted in a real space, so that it is possible to obtain a blur-corrected image f'(x,y).

$$K(u, v) = \frac{H(u, v)}{|H(u, v)|^2 + (S_n(u, v)/S_f(u, v))}$$ Equation 5

Figure 2:
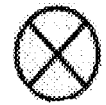
FIG. 2 is a diagram for describing an example of a blur correction process using a Wiener filter.

An example of a blur correction process by the Wiener filter according to Equation 5 above is illustrated in FIG. 2.

FIG. 2 illustrates (a) Photographed Image G and (b) Wiener Filter K.

(a) The photographed image is an RAW image including RGBW pixels having a W (White) pixel.

Here, a pixel to be corrected is the W pixel at the center of 7×7 pixels illustrated in (a) of FIG. 2.

(b) The Wiener filter K indicates a multiplication coefficient for each W pixel included in the 7×7 pixels. A convolution operation is performed to multiply pixel values of the W pixels included in the 7×7 pixels by each coefficient and add respective multiplication results to one another, thereby calculating a corrected pixel value of the central W pixel.

In addition, the example of FIG. 2 illustrates a processing example for the W pixels of the image having an RGBW configuration. However, the same filter processing is performed for each RGB pixel.

Furthermore, blur correction based on the same process using the Wiener filter is performed for an image having an RGB configuration other than the RGBW configuration.

2. (First Embodiment) Configuration Example of Image Processing Apparatus

Figure 3:
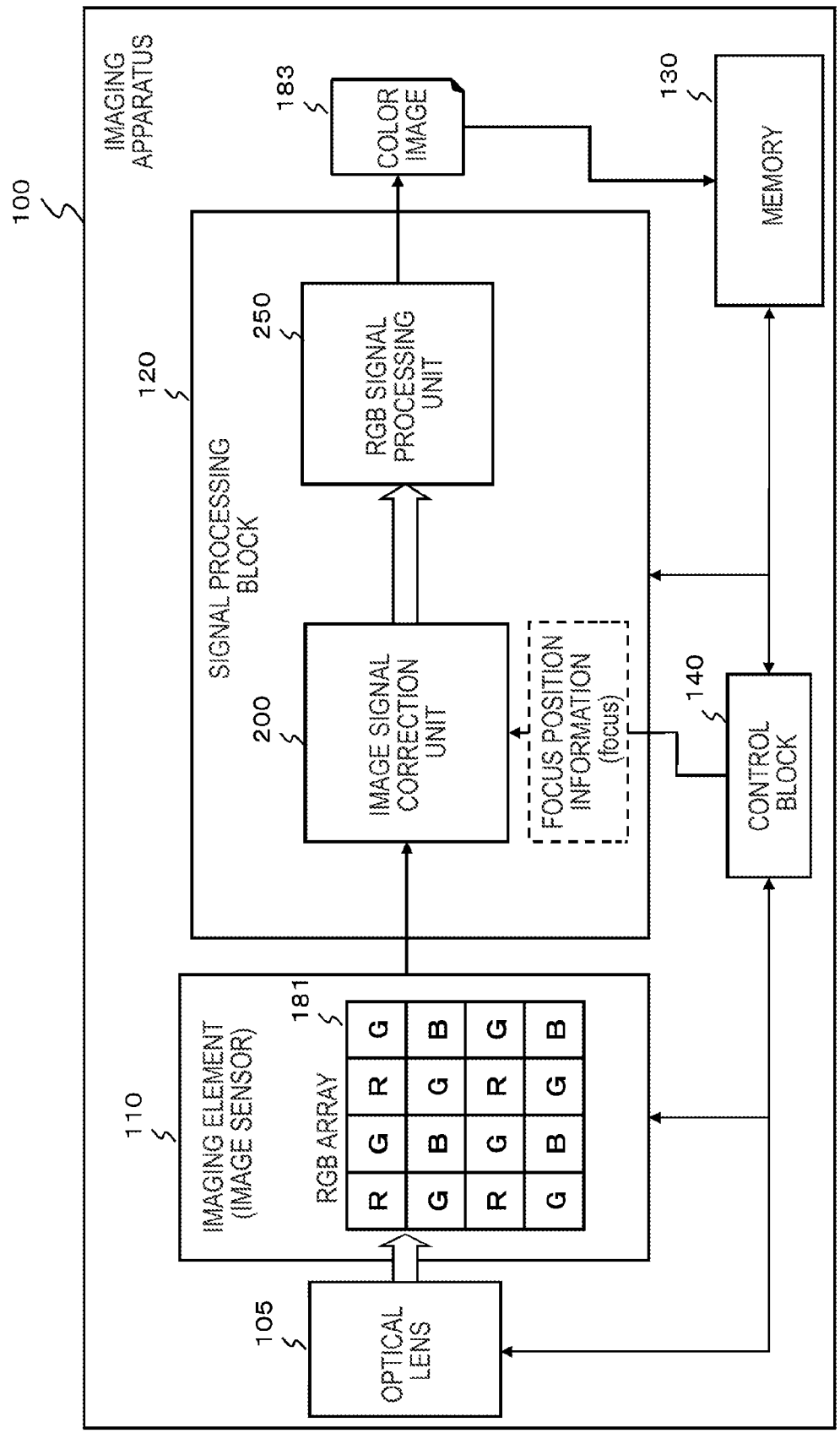
FIG. 3 is a diagram for describing a configuration example of an image processing apparatus of the present disclosure.
Figure 4:
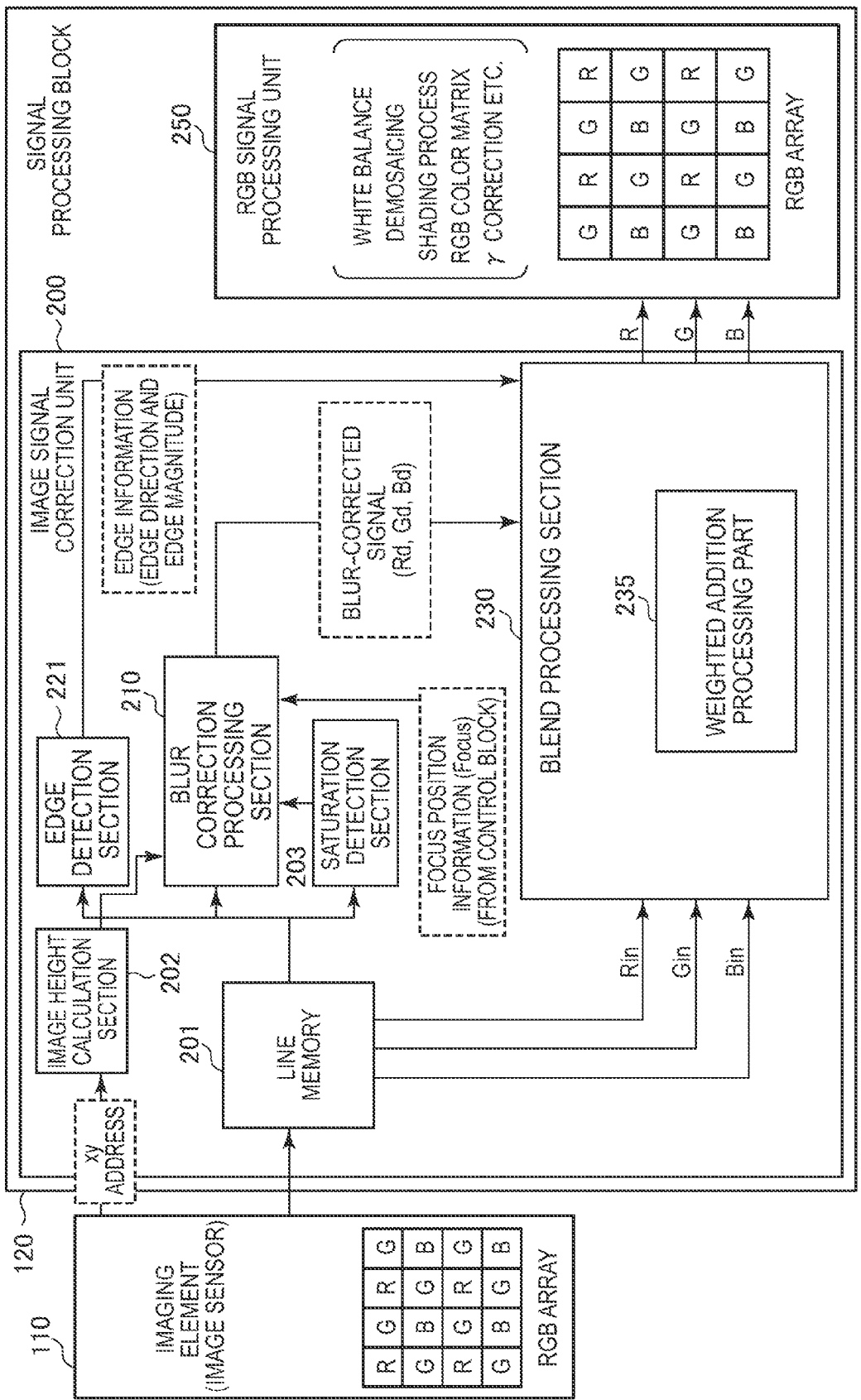
FIG. 4 is a diagram for describing a configuration example of an image processing apparatus of the present disclosure.

With reference to FIG. 3 and FIG. 4, a configuration example of the image processing apparatus of the present disclosure will be described.

FIG. 3 is a diagram illustrating a configuration example of an imaging apparatus 100 which is an embodiment of the image processing apparatus of the present disclosure. The imaging apparatus 100 includes an optical lens 105, an imaging element (an image sensor) 110, a signal processing block 120, a memory 130, and a control block 140. In addition, the imaging apparatus corresponds to an aspect of the image processing apparatus.

In addition, the image processing apparatus of the present disclosure, for example, includes an apparatus such as a PC. The image processing apparatus such as a PC includes elements other than the optical lens 105 and the imaging element 110 of the imaging apparatus 100 illustrated in FIG. 3, and is provided with an input unit or a storage unit for data acquired by the imaging element 110.

Hereinafter, the imaging apparatus 100 illustrated in FIG. 3 will be described as a representative example of the image processing apparatus of the present disclosure. In addition, the imaging apparatus 100 illustrated in FIG. 3, for example, includes a still camera, a video camera, and the like.

The imaging element (the image sensor) 110 of the imaging apparatus 100 illustrated in FIG. 3 includes a color filter having a Bayer array including an RGB array.

First, a configuration and a processing example using the imaging element 110 including the RGB array will be described.

Then, a configuration and a process using an imaging element including an RGBW array will be described.

The imaging element (the image sensor) 110 of the imaging apparatus 100 illustrated in FIG. 3 has an RGB array 181. That is, the imaging element 110 is an imaging element provided with a filter having three types of spectral characteristics of Red (R) that transmits a wavelength around a red color, Green (G) that transmits a wavelength around a green color, and Blue (B) that transmits a wavelength around a blue color.

The imaging element 110 having the RGB array 181 receives RGB light through the optical lens 105 in units of pixels, generates an electrical signal corresponding to the intensity of a light receiving signal through photoelectric conversion, and outputs the electrical signal. Through the imaging element 110, a mosaic image having three types of RGB spectra is obtained.

An output signal of the imaging element (the image sensor) 110 is input to an image signal correction unit 200 of the image processing block 120.

The image signal correction unit 200, for example, performs a blur correction process in consideration of a blur pattern changed according to an image height (a distance from an optical center) or a focus position. The configuration and process of the image signal correction unit 200 will be described in detail later.

A blur-corrected RGB image in the image signal correction unit 200 is output to an RGB signal processing unit 250.

The output of the image signal correction unit 200 is data having a Bayer array similarly to the output of the imaging element 110.

The RGB signal processing unit 250 performs the same process as a signal processing unit in an existing camera. In detail, the RGB signal processing unit 250 performs a demosaicing process, a white balance adjustment process, a γ correction process and the like, thereby generating a color image 183. The generated color image 183 is stored in the memory 130.

The control block 140 controls this series of processes. For example, in the state in which a program for executing the series of processes is stored in the memory 130, the control block 140 executes the program read from the memory 130, thereby controlling the series of processes.

In addition, the memory 130, for example, may include various recording media such as a magnetic disk, an optical disc, or a flash memory.

A detailed configuration of the image signal correction unit 200 will be described with reference to FIG. 4.

As illustrated in FIG. 4, the image signal correction unit 200 includes a line memory 201, an image height calculation section 202, a saturation detection section 203, a blur correction processing section 210, an edge detection section 221, and a blend processing section 230.

The blend processing section 230 includes a weighted addition processing part 235.

Pixel value signals corresponding to pixels output from the imaging element 110 are stored in the line memory 201 once.

Furthermore, an xy address indicating a coordinate position of each pixel associated with the pixel value of each pixel is output to the image height calculation section 202.

The line memory 201 has a line memory corresponding to seven horizontal lines of an imaging element. The line memory 201 sequentially outputs data corresponding to the seven horizontal lines in a parallel manner. An output destination is the blur correction processing section 210, the edge detection section 221, and the saturation detection section 203. Captured data of the RGB array 181 is output to these processing sections in units of seven lines.

The edge detection section 221 verifies an output signal from the line memory 201, generates edge information included in an image, for example, edge information including an edge direction and edge magnitude, and outputs the generated edge information to the blend processing section 230.

In detail, for example, the edge detection section 221 calculates flatness weightFlat calculated from pixel information of 7×7 pixels about a pixel to be processed (a center pixel of the 7×7 pixels), and outputs the flatness weightFlat to the blend processing section 230.

In addition, the flatness weightFlat calculation process can be performed as the same process as a process disclosed in Japanese Unexamined Patent Application Publication No. 2011-55038, which is the present applicant's priority application.

The blur correction processing section 210 verifies input signals Rin, Gin, and Bin from the line memory 201, performs a process for reducing image blur to calculate blur-corrected signals Rd, Gd, and Bd obtained through the processing result, and outputs the blur-corrected signals Rd, Gd, and Bd to the blend processing section 230.

The blend processing section 230 receives the RGB signals Rin, Gin, and Bin of the output signals from the line memory 201, the edge information output from the edge detection section 221, and the blur-corrected signals Rd, Gd, and Bd output from the blur correction processing section 210.

The blend processing section 230 generates blur-corrected output signals RGB, in which edges are considered, using the received information, and outputs the output signals RGB to the RGB signal processing unit 250.

The blend processing section 230 includes the weighted addition processing part 235, wherein the weighted addition processing part 235 performs a weighted addition process for the blur-corrected signals Rd, Gd, and Bd, which are output from the blur correction processing section 210, according to the edge information of the pixel to be processed calculated by the edge detection section 221, that is, the flatness weightFlat calculated from the pixel information of the 7×7 pixels about the pixel to be processed (the center pixel of the 7×7 pixels), thereby calculating each RGB pixel value of the RGB array 181. In detail, the blend processing section 230 determines the RGB pixel values according to the following equations.

$$R = (\text{weightFlat}) \times (Rd) + (1 - \text{weightFlat}) \times Rin$$

$$G = (\text{weightFlat}) \times (Gd) + (1 - \text{weightFlat}) \times Gin$$

$$B = (\text{weightFlat}) \times (Bd) + (1 - \text{weightFlat}) \times Bin$$

The blend processing section 230 outputs the R, G, and B obtained as the calculation results of the above equations to the RGB signal processing unit 250.

The RGB signal processing unit 250 is equivalent to a signal processing unit for an RGB array (a Bayer array) included in a general camera or image processing apparatus. The RGB signal processing unit 250 performs signal processing for the RGB array (the Bayer array) signals output from the blend processing section 230, thereby generating the color image 183 (refer to FIG. 3). In detail, the RGB signal processing unit 250, for example, performs a white balance process, a demosaicing process, a shading process, an RGB color matrix process, a γ correction process and the like, thereby generating the color image 183.

Figure 5:
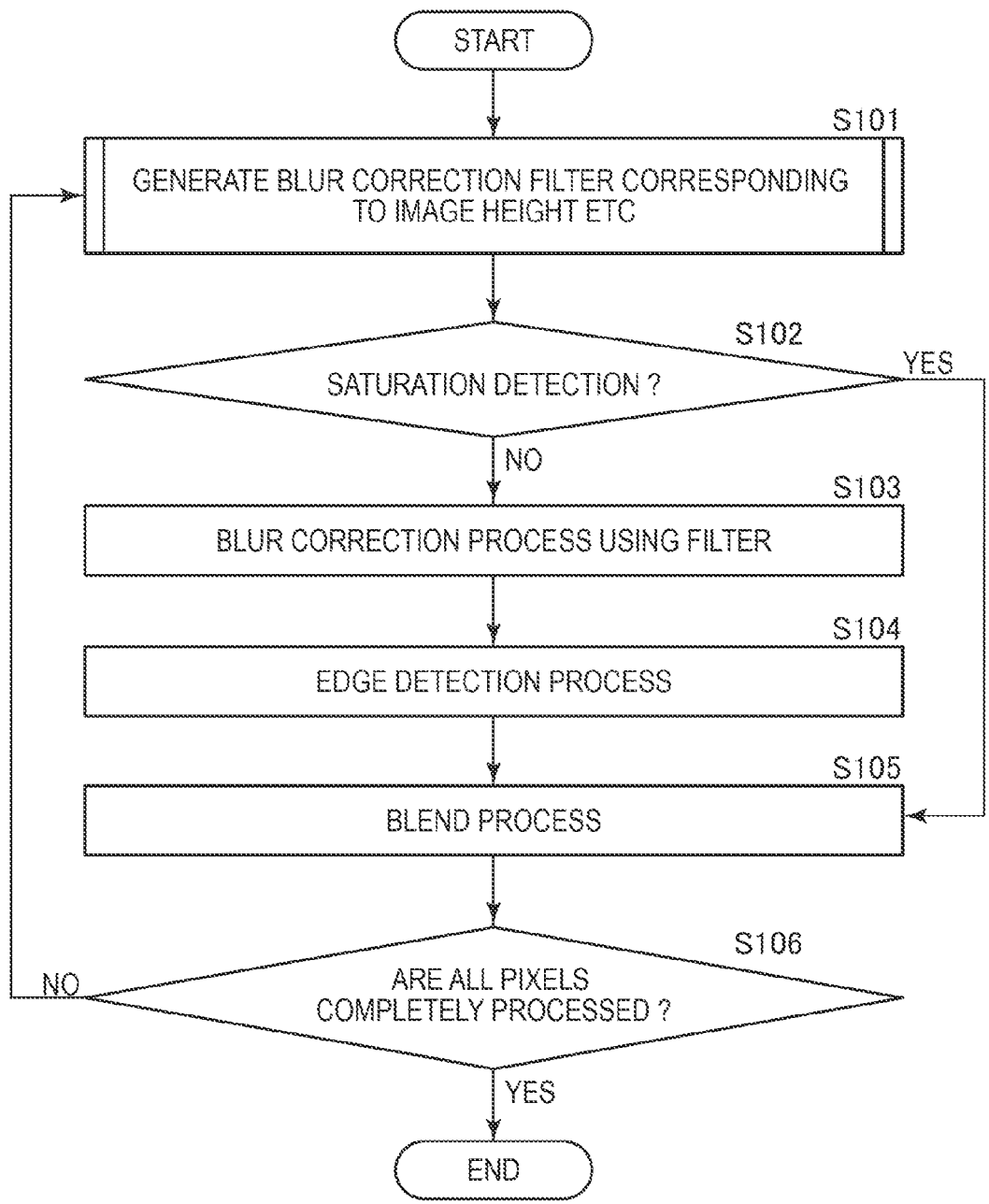
FIG. 5 is a flowchart for describing an entire sequence of processes performed by an image signal correction unit.

FIG. 5 is a flowchart for describing an entire sequence of the processes performed by the image signal correction unit 200.

In step S101, the image signal correction unit 200 generates a blur correction filter corresponding to an image height and the like. This process is performed by the blur correction processing section 210.

The blur correction processing section 210 receives image height (a distance from an image center (=an optical center)) information calculated based on an xy address of a pixel to be subjected to blur correction from the image height calculation section 202, and generates the blur correction filter according to the image height and the like.

In addition, details of this process will be described later.

In step S102, it is determined whether the pixel to be subjected to the blur correction has been saturated.

In detail, the saturation of the pixel to be subjected to the blur correction is detected by the saturation detection section 203 illustrated in FIG. 4, and detection information is input to the blur correction processing section 210.

When the pixel to be subjected to the blur correction has been saturated, if the blur correction is performed, a false color is likely to be generated. This is because the blur correction process includes a process of setting a pixel value of a pixel to be corrected with reference to pixel values of pixels around the pixel to be subjected to the blur correction.

For example, a pixel area 271a of an image illustrated in (a) of FIG. 6 is a pixel area including highlight pixels, that is, saturation pixels.

If a blur correction process is performed for the pixel area 271a including the saturation pixels, blur is reduced as illustrated in a pixel area 271b of (b) of FIG. 6. However, a false color in which a color different from the original color of an object is set is generated.

In order to prevent the generation of the false color, when a saturation pixel is included around the pixel to be subjected to the blur correction, for example, 7×7 pixels about a pixel to be corrected as illustrated in FIG. 7, no blur correction is performed for the pixel to be corrected.

As described above, the blur correction processing section 210 performs a process of replacing a saturation pixel area with a signal without the blur correction process according to the detection information of the saturation pixel (highlight) area in the saturation detection section 203.

The saturation detection section 203, for example, determines whether pixels of an area of 7×7 pixels about a pixel to be subjected to a blur correction process do not exceed a predetermined threshold value. If at least one pixel of the area of the 7×7 pixels exceeds the threshold value, the saturation detection section 203 outputs saturation detection information to the blur correction processing section 210.

If at least one pixel of the area of the 7×7 pixels exceeds the threshold value, since the false color is highly likely to be generated, the blur correction processing section 210 performs a process of replacing the pixel area with a signal without the correction process.

This process corresponds to a process when the determination of step S102 of the flowchart illustrated in FIG. 5 is Yes. In this case, step S105 is performed without performing steps S103 and S104.

That is, the blur correction process for the pixel to be processed (the center pixel of the 7×7 pixels) is not performed.

When no pixels of the area of the 7×7 pixels about the pixel to be subjected to the blur correction process exceed the predetermined threshold value and the saturation detection has not been performed, the determination of step S102 is No and a blur correction process using a filter is performed in step S103.

This blur correction process is a process performed by the blur correction processing section 210 illustrated in FIG. 4, and is performed using the blur correction filter generated in step S101 according to the image height and the like.

Next, an edge detection process is performed in step S104. This process is performed by the edge detection section 221 illustrated in FIG. 4. The edge detection section 221 verifies the output signal from the line memory 201 and generates the edge information included in the image, for example, the edge information including the edge direction and the edge magnitude.

In detail, as described above, the edge detection section 221, for example, calculates the flatness weightFlat calculated from the pixel information of the 7×7 pixels about the pixel to be processed (the center pixel of the 7×7 pixels), and outputs the flatness weightFlat to the blend processing section 230.

Figure 8:
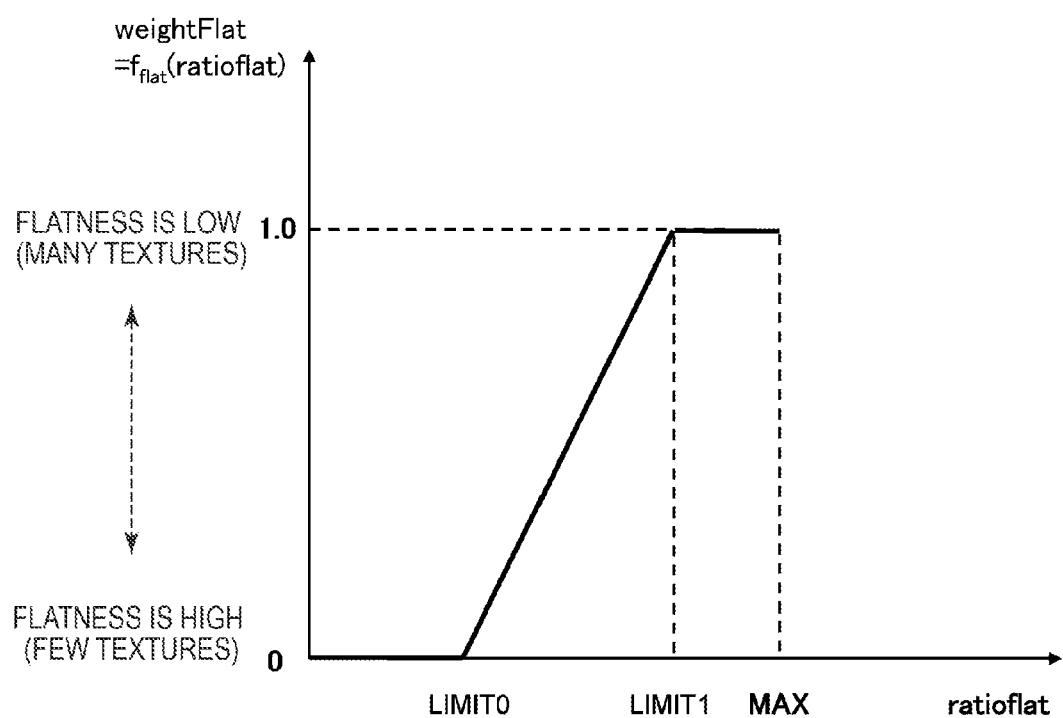
FIG. 8 is a diagram for describing flatness weightFlat.

The flatness weightFlat has values in the range of 0 to 1 as illustrated in FIG. 8, and is an index value of flatness indicating an image state in which flatness is low (many textures) as it approaches 1 and the flatness is high (a few textures) as it approaches 0.

As illustrated in FIG. 8, the flatness weightFlat is calculated using two preset threshold values Limit0 and Limit1 as follows:

If 0≤(ratioFlat)<Limit0, flatness(weightFlat)=0;

If Limit0≤(ratioFlat)<Limit1, flatness(weightFlat)=0 to 1; and

If Limit1≤(ratioFlat), flatness(weightFlat)=1.

The edge detection section 221, for example, outputs information on the flatness weightFlat to the blend processing section 230 as the edge information.

In addition, as described above, since the flatness weightFlat calculation process can be performed as the same process as a process disclosed in Japanese Unexamined Patent Application Publication No. 2011-55038, which is the present applicant's priority application, details of the flatness weightFlat calculation process can be found in Japanese Unexamined Patent Application Publication No. 2011-55038.

Next, in step S105, a blend process is performed.

This process is a process performed by the blend processing section 230 illustrated in FIG. 4. The blend processing section 230 receives the RGB signals Rin, Gin, and Bin of the output signals from the line memory 201, the edge information output from the edge detection section 221, and the blur-corrected signals Rd, Gd, and Bd output from the blur correction processing section 210.

The blend processing section 230 generates the blur-corrected output signals RGB, in which the edges are considered, using the received information, and outputs the output signals RGB to the RGB signal processing unit 250.

The blend processing section 230 includes the weighted addition processing part 235, wherein the weighted addition processing part 235 performs the weighted addition process for the blur-corrected signals Rd, Gd, and Bd, which are output from the blur correction processing section 210, according to the edge information of the pixels to be processed calculated by the edge detection section 221, that is, the flatness weightFlat calculated from the pixel information of the 7×7 pixels about the pixel to be processed (the center pixel of the 7×7 pixels), thereby calculating each RGB pixel value of the RGB array 181. In detail, the blend processing section 230 determines the RGB pixel values according to the following equations.

$R = (\text{weightFlat}) \times (Rd) + (1 - \text{weightFlat}) \times R\text{in}$ $G = (\text{weightFlat}) \times (Gd) + (1 - \text{weightFlat}) \times G\text{in}$ $B = (\text{weightFlat}) \times (Bd) + (1 - \text{weightFlat}) \times B\text{in}$ The blend processing section 230 outputs R, G, and B obtained as the calculation results of the above equations to the RGB signal processing unit 250.

In detail, the weighted addition processing part 235 of the blend processing section 230, for example, performs a blend process for increasing a blend rate of a signal with blur correction at a pixel position at which edge magnitude has been determined to be high, and for highly setting a blend rate of a signal without blur correction at a pixel position at which the edge magnitude has been determined to be low, based on the edge information of the pixel to be processed calculated by the edge detection section 221.

Preferably, there is a sharp signal with a restored high frequency component around an edge. However, since a high frequency component is not originally included at a flat part, it is preferable that there be a signal in which noise has been suppressed.

However, as described above, when the saturation pixel is detected from a predetermined unit of pixel area, for example, the area of the 7×7 pixels about the pixel to be subjected to the blur correction process, since the blur correction is not performed for the pixel, the input pixel values Rin, Gin, and Bin are output from the imaging element 110 as is.

Finally, in step S106, it is determined whether all the input pixels have been completely processed. When there is an unprocessed pixel, the processes of step S101 to step S105 are repeatedly performed for the unprocessed pixel.

In step S106, when it is determined that all the input pixels have been completely processed, the process of the image signal correction unit 200 is ended.

3. Details of Blur Correction Process of Image Processing Apparatus According to First Embodiment Next, a detailed example of the blur correction process performed by the image signal correction unit 200 illustrated in FIG. 4 will be described.

The blur correction processing section 210 of the image signal correction unit 200 illustrated in FIG. 4 verifies the input signals Rin, Gin, and Bin from the line memory 201, performs a process for reducing the image blur to calculate blur-corrected signals Rd, Gd, and Bd obtained through the processing result, and outputs the blur-corrected signals Rd, Gd, and Bd to the blend processing section 230.

The blur correction processing section 210 generates the blur correction filter according to the image height and the like of the pixel to be subjected to the blur correction in step S101 of the flowchart illustrated in FIG. 5, and performs the blur correction process using the generated filter in step S103.

Figure 9:
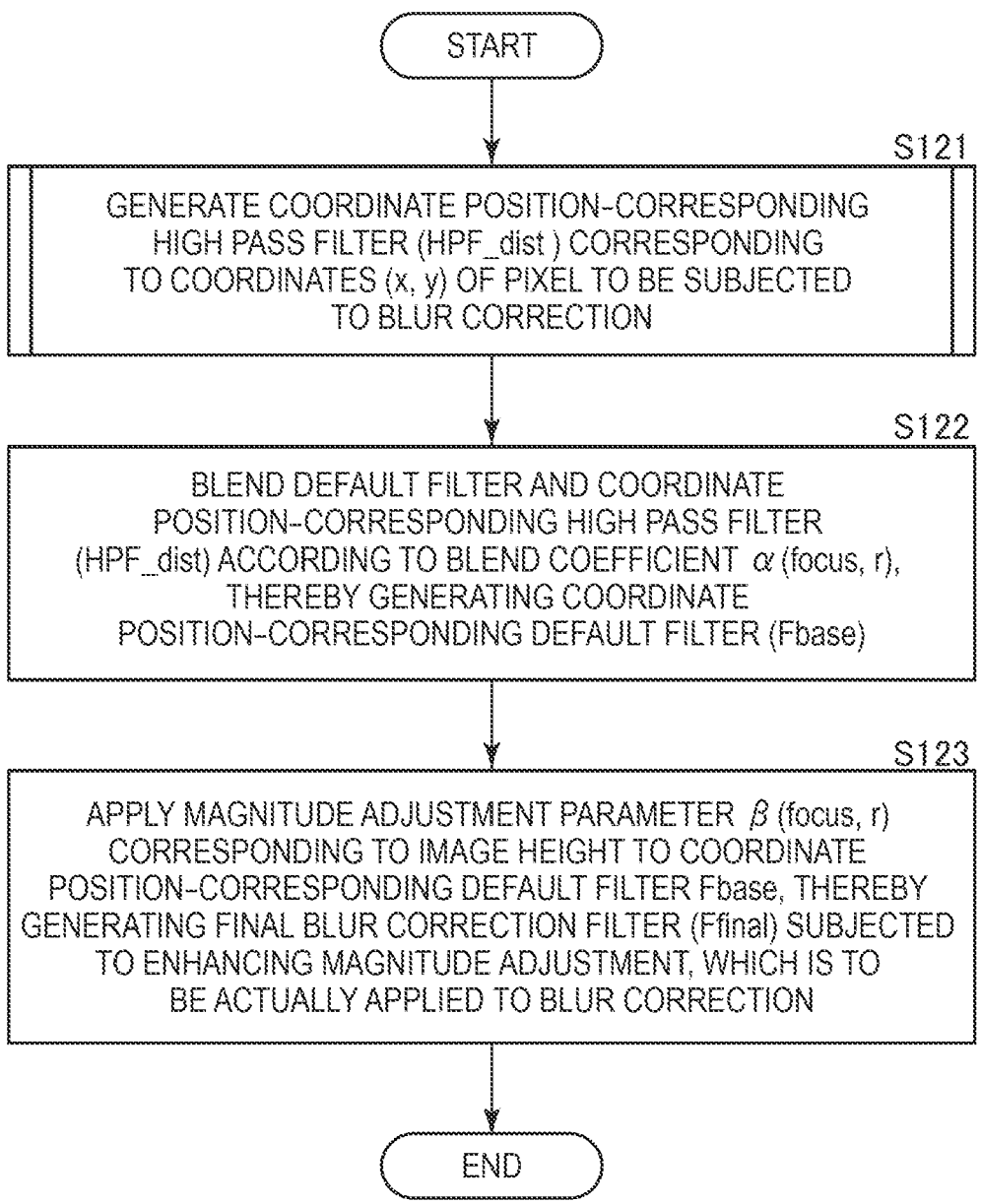
FIG. 9 is a flowchart for describing a detailed sequence of a filter generation process.

A flowchart for describing a detailed sequence of the filter generation process in step S101 of FIG. 5 is illustrated in FIG. 9.

Details of the generation process of the blur correction filter will be described with reference to the flowchart illustrated in FIG. 9.

In step S121, the blur correction processing section 210 generates a high pass filter corresponding to the xy address of the pixel to be subjected to the blur correction, that is, the coordinates (x,y), that is, generates a coordinate position-corresponding high pass filter HPF_dist.

The blur correction processing section 210 receives the coordinates (x,y) and the image height (the distance from the image center) of the pixel to be corrected from the image height calculation section 202 illustrated in FIG. 4, and generates the coordinate position-corresponding high pass filter HPF_dist.

This process will be described with reference to FIG. 10.

FIG. 10 is a diagram illustrating a flowchart for describing a generation process sequence of the coordinate position-corresponding high pass filter HPF_dist, parameters to be applied to the filter generation, and the like.

First, in step S131 of the flowchart illustrated in FIG. 10, the blur correction processing section 210 performs a process for blending (1) a high pass filter HPF_x for x direction adjustment and (2) a high pass filter HPF_y for y direction adjustment according to the coordinates (x,y) of the pixel to be subjected to the blur correction, thereby generating (3) a coordinate position reflection filter HPF_xy.

In addition, (1) the high pass filter HPF_x for x direction adjustment and (2) the high pass filter HPF_y for y direction adjustment are filters held in the memory in the image processing apparatus, and are obtained from the memory by the blur correction processing section 210.

A detailed example of these filters will be described with reference to FIG. 11.

Figure 11:
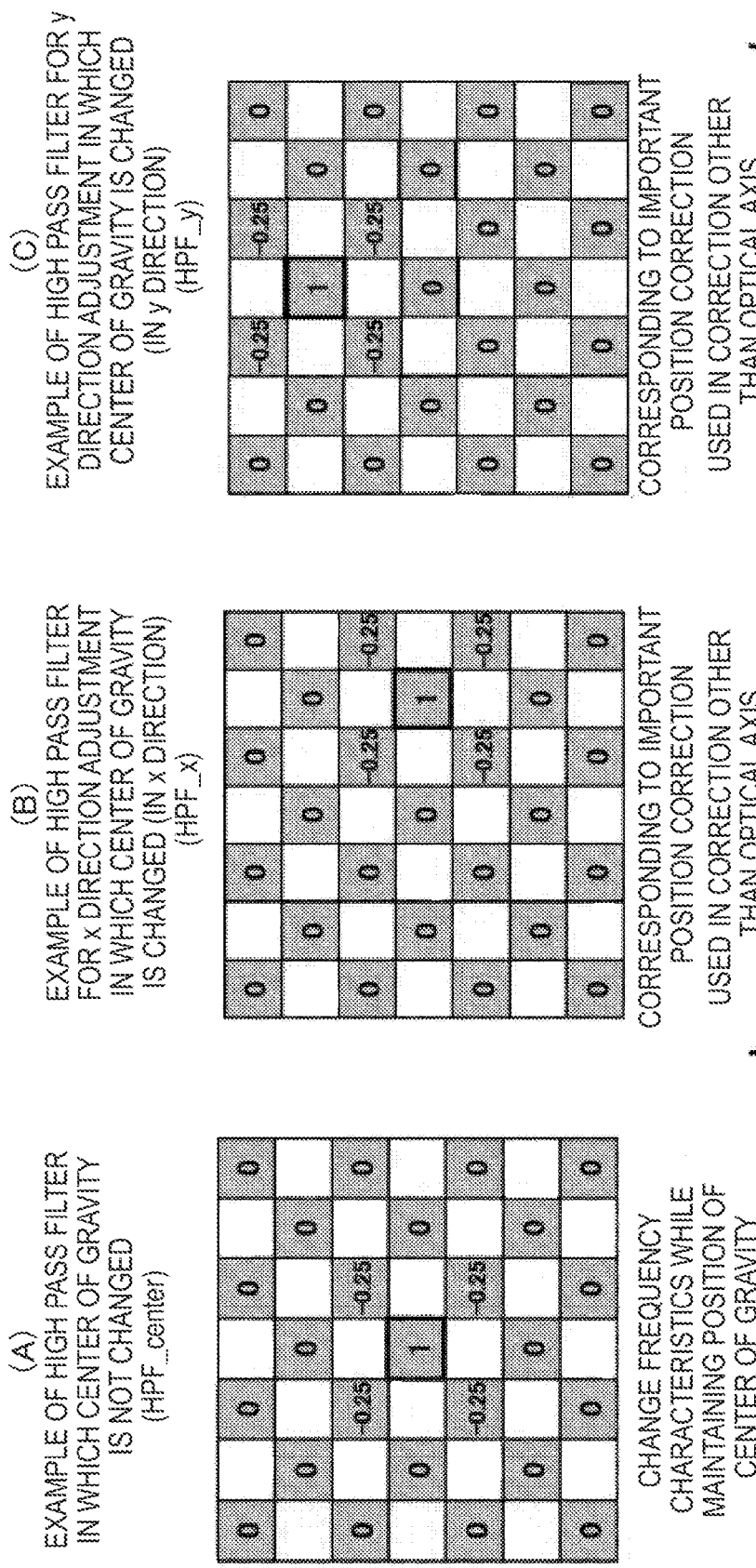
FIGS. 11A-C are diagrams for describing an example of a high pass filter applied in order to generate a coordinate position-corresponding high pass filter HPF_dist.

FIG. 11 illustrates the following three high pass filters:

(A) High pass filter HPF_center in which the center of gravity is not changed (B) High pass filter HPF_x for x direction adjustment in which the center of gravity is changed in the x direction (horizontal direction)

(C) High pass filter HPF_y for y direction adjustment in which the center of gravity is changed in the y direction (vertical direction)

In step S131 of the flowchart illustrated in FIG. 10, the blur correction processing section 210 performs a process of blending (B) the high pass filter HPF_x for x direction adjustment and (C) the high pass filter HPF_y for y direction adjustment according to the coordinates (x,y) of the pixel to be subjected to the blur correction, thereby generating the coordinate position reflection filter HPF_xy.

In detail, the blur correction processing section 210 generates the coordinate position reflection filter HPF_xy according to the following equation.

$$HPF\_xy=(x \times HPF\_x + y \times HPF\_y)/(x+y)$$

In step S131 of FIG. 10, the blur correction processing section 210 generates the coordinate position reflection filter HPF_xy according to the coordinates (x,y) of the pixel to be subjected to the blur correction.

In step S132, based on a distance r between the coordinates (x,y) of the pixel to be subjected to the blur correction and a center position of the view angle [(x,y)=(0,0)], the blur correction processing section 210 blends (1) the coordinate position reflection filter HPF_xy and (2) a center filter HPF_center corresponding to the center position of the view angle [(x,y)=(0,0)], thereby generating the coordinate position-corresponding high pass filter HPF_dist.

(1) The coordinate position reflection filter HPF_xy is a filter calculated in step S131.

(2) The center filter HPF_center corresponding to the center position of the view angle [(x,y)=(0,0)] is a filter illustrated in (A) of FIG. 11, is a filter held in the memory in the image processing apparatus, and is obtained from the memory by the blur correction processing section 210.

In addition, as illustrated in the parameter description of (a) of FIG. 10, when the coordinate of the pixel to be subjected to the blur correction is set as (x,y), the distance r from the image center (0,0) is calculated as an image height.

Furthermore, a maximum value of the image height to view-angle edges $x_{max}$ and $y_{max}$ is set as rmax.

Under the above setting, the blur correction processing section 210 calculates the coordinate position-corresponding high pass filter HPF_dist according to the following equation.

$$HPF\_dist=[(HPF\_xy \times r)+(HPF\_center \times (r_{max}-r))]/r_{max}$$

In step S132, the blur correction processing section 210 calculates the coordinate position-corresponding high pass filter HPF_dist according to the above process.

The processes of steps S131 and S132 of the flowchart of FIG. 10 are the process in step S121 of the flowchart illustrated in FIG. 9, and the coordinate position-corresponding high pass filter HPF_dist is generated through these processes.

Next, in step S122 of the flowchart illustrated in FIG. 9, the blur correction processing section 210 blends (1) a default filter and (2) the coordinate position-corresponding high pass filter HPF_dist according to a blend coefficient α (focus, r) determined according to the image height r and focus position information focus, thereby generating (3) a coordinate position-corresponding default filter Fbase.

(1) The default filter is a filter held in the memory in the image processing apparatus, and is obtained from the memory by the blur correction processing section 210.

In detail, it is possible to apply a filter called the least square filter or the Wiener filter described with reference to FIG. 2.

The image processing apparatus holds a blur correction filter such as the Wiener filter in the memory as the default filter, and blends the default filter and the coordinate position-corresponding high pass filter HPF_dist generated in step S121, thereby generating the coordinate position-corresponding default filter Fbase in step S122 of the flowchart illustrated in FIG. 9.

The coordinate position-corresponding default filter Fbase is calculated through the following equation based on the blend coefficient α determined according to the image height r and the focus position information focus.

$$Fbase=(1.0-\alpha) \times (\text{default filter}) + \alpha (HPF\_dist)$$

Moreover, in step S123, the blur correction processing section 210 applies a magnitude adjustment parameter β (focus, r) corresponding to the image height and the focus position to the coordinate position-corresponding default filter Fbase generated in step S122, thereby generating a blur correction filter Ffinal subject to enhancing magnitude adjustment, which is to be actually applied to blur correction.

The blur correction filter Ffinal generated in step S123 is a filter to be actually applied to a blur correction process for the pixel (x,y) to be processed.

First, in step S122, the blur correction processing section 210 blends (1) the default filter and (2) the coordinate position-corresponding high pass filter HPF_dist according to the blend coefficient α (focus, r) determined according to the image height r and the focus position information focus, thereby generating the coordinate position-corresponding default filter Fbase.

This process will be described with reference to FIG. 12 and subsequent diagrams.

The blend process for (1) the default filter and (2) the coordinate position-corresponding high pass filter HPF_dist based on the blend coefficient α determined according to the image height r and the focus position information focus corresponds to a process of adjusting (tuning) the frequency characteristics of a filter.

That is, the blend process is performed as a process of changing the frequency characteristics of the filter based on the blend coefficient α determined according to the image height r and the focus position information focus.

Figure 12:
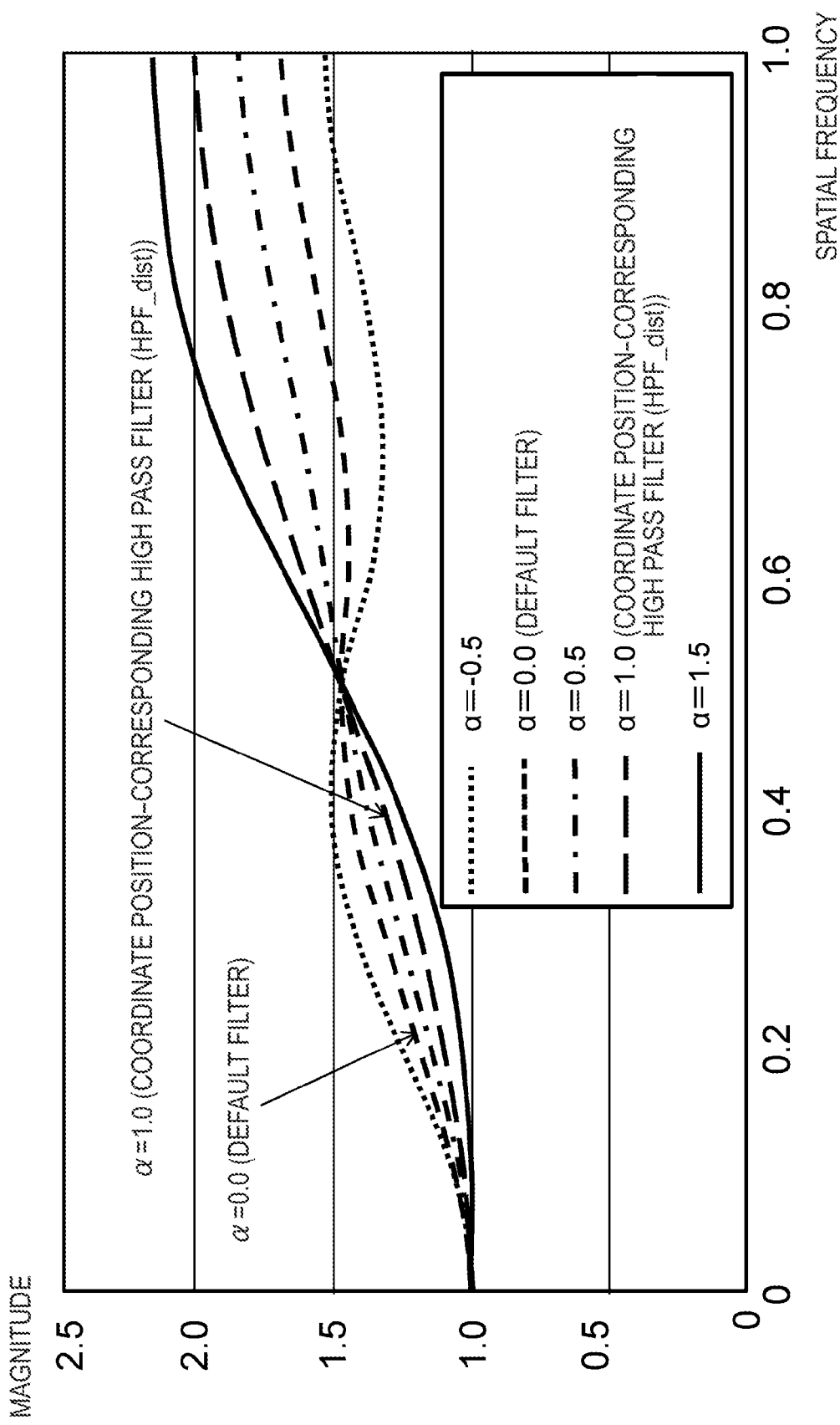
FIG. 12 is a diagram illustrating enhancing characteristics of a filter.

The graph illustrated in FIG. 12 illustrates the enhancing characteristics of a filter, wherein a horizontal axis denotes a spatial frequency and a vertical axis denotes magnitude corresponding to a pixel value output after the filter is applied.

The graph illustrates the enhancing characteristics of the filter generated by variously setting the blend coefficient α (α=−0.5 to 1.5) to be applied to the aforementioned blend process.

As described above, the coordinate position-corresponding default filter Fbase is calculated through the following equation based on the blend coefficient α determined according to the image height r and the focus position information focus.

$$Fbase=(1.0-\alpha)\times(\text{default filter})+\alpha(\text{HPF\_dist})$$

In the above equation, when the blend coefficient α is set to 0, Fbase=(default filter) and is a filter of a line having characteristics illustrated with α (0.0) illustrated in FIG. 12.

Furthermore, in the above equation, when the blend coefficient α is set to 1.0, Fbase=(HPF_dist) and is a filter of a line having characteristics illustrated with α (1.0) illustrated in FIG. 12.

That is, α is changed to various values, so that it is possible to generate filters having the frequency characteristics of (α=−0.5 to 1.5) as illustrated in FIG. 12.

As described above, the generation of the coordinate position-corresponding default filter Fbase performed in step S122 of the flowchart illustrated in FIG. 9 as a process corresponding to the process of adjusting (tuning) the filter frequency characteristics by blending (1) the default filter and (2) the coordinate position-corresponding high pass filter HPF_dist.

In addition, the blend coefficient α is determined according to the image height r and the focus position information focus.

A setting example of the blend coefficient α will be described with reference to FIG. 13.

Figure 13:
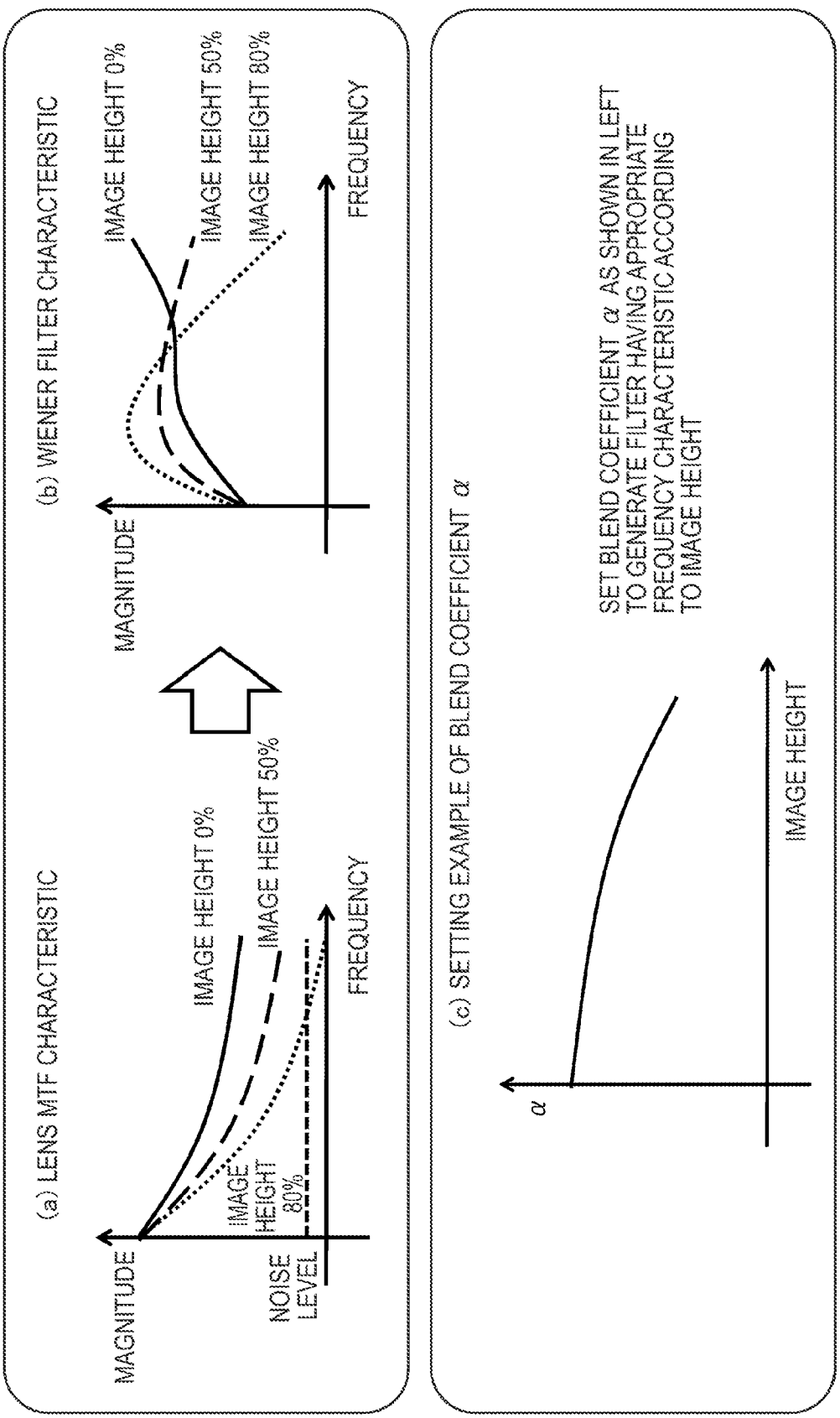
FIG. 13 is a diagram for describing a setting example of (a) lens MTF characteristics, (b) Wiener filter characteristics, and (c) a blend coefficient $\alpha$.

FIG. 13 illustrates (a) lens MTF characteristics, (b) Wiener filter characteristics, and (c) a setting example of the blend coefficient α.

As illustrated in (a) of FIG. 13, the MTF characteristics generally deteriorate when an image height is increased (a distance from an image center is increased). Particularly, since a high frequency region is buried in noise, enhancing characteristics of the Wiener filter are shifted to a low frequency region as illustrated in (b) of FIG. 13.

In this regard, as illustrated in (c) of FIG. 13, when the image height is increased (the distance from the image center is increased), a blend rate of a high pass filter is allowed to be reduced. That is, it is preferable that the blend coefficient α be allowed to be small.

It can be said that focus shift is similar. That is, as the focus shift is increased, the blend coefficient α is allowed to be small.

In addition, the focus shift corresponds to a value unique to an image processing apparatus (a camera), and a shift amount generated corresponding to each focus position is a unique value in each camera. Accordingly, since a focus shift amount can be calculated from focus position information, the blur correction processing section 210 receives the focus position information (refer to FIG. 4) from the control block 140, calculates the focus shift amount according to a preset calculation equation, and calculates the blend coefficient α (focus, r) using the focus shift amount and the image height r acquired from the image height calculation section 202.

As described above, in step S122 of the flowchart illustrated in FIG. 9, the blur correction processing section 210 blends (1) the default filter and (2) the coordinate position-corresponding high pass filter HPF_dist according to the blend coefficient α (focus, r) determined according to the image height r and the focus position information focus, thereby generating the coordinate position-corresponding default filter Fbase.

Next, a description will be provided for the process of step S123, that is, the process of applying the magnitude adjustment parameter β (focus, r) corresponding to the image height and the focus position to the coordinate position-corresponding default filter Fbase generated in step S122, thereby generating the blur correction filter Ffinal subject to the enhancing magnitude adjustment.

Figure 14:
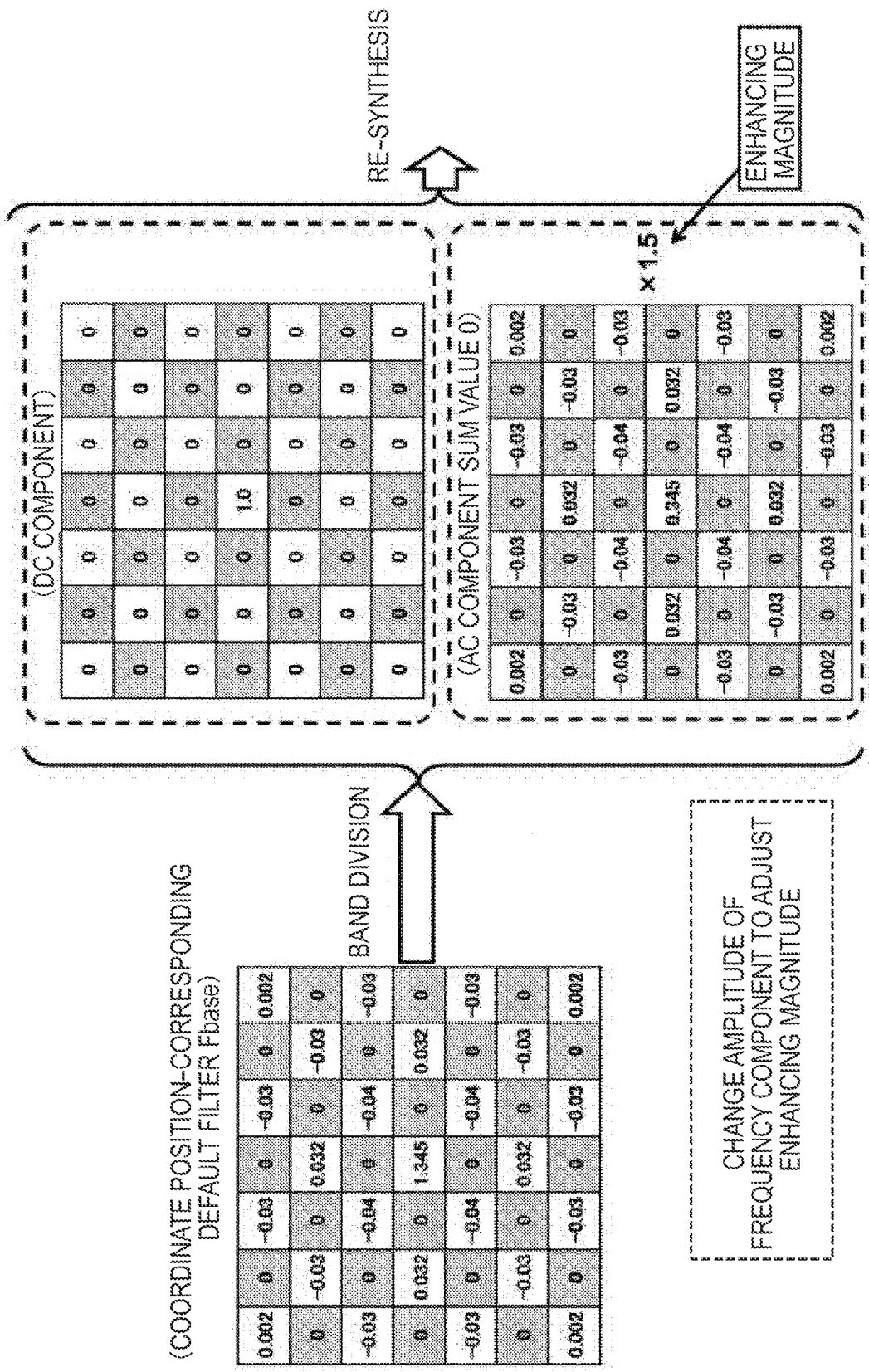
FIG. 14 is a diagram for describing a process of generating a blur correction filter Ffinal for which enhancing magnitude adjustment has been performed.
Figure 15:
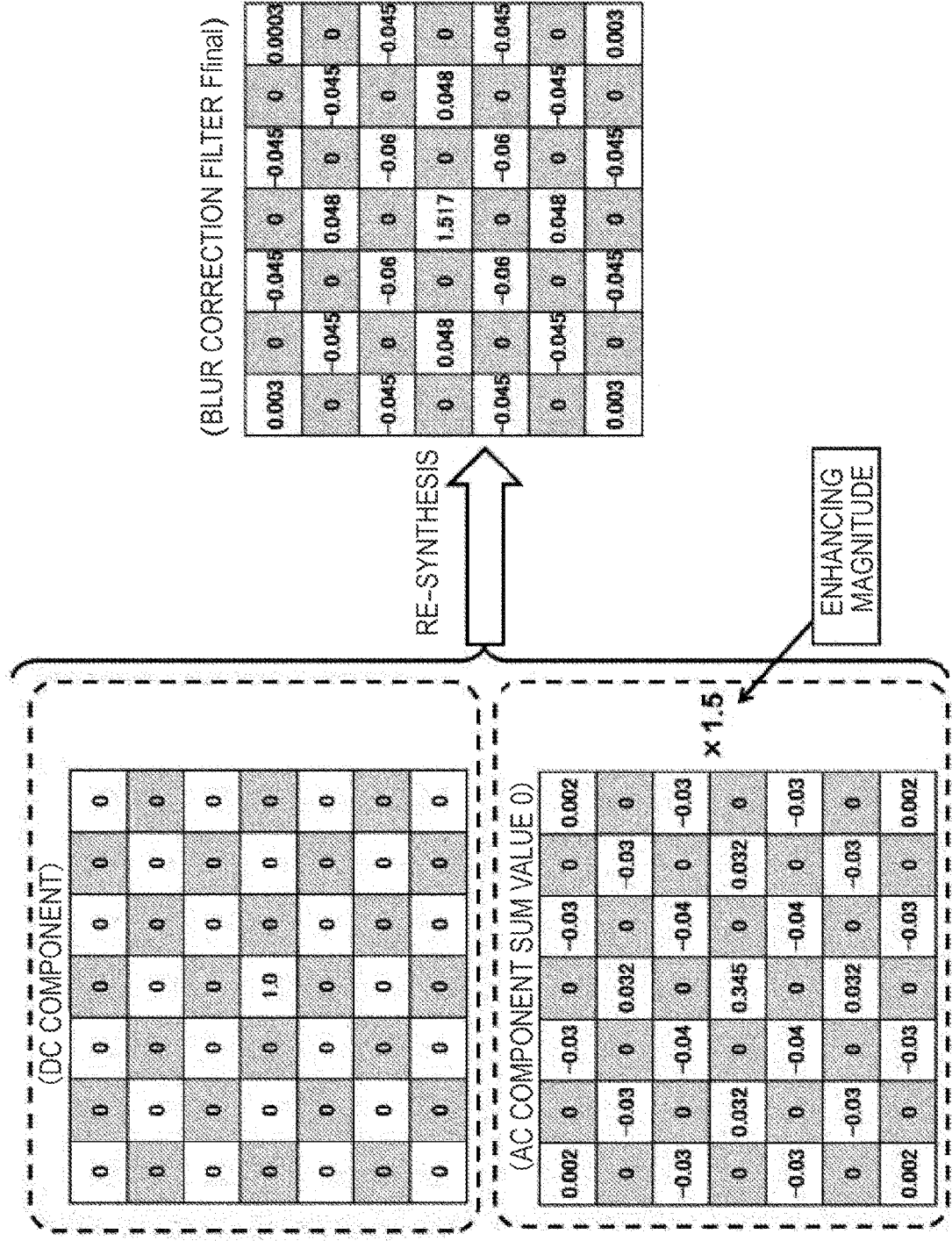
FIG. 15 is a diagram for describing a process of generating a blur correction filter Ffinal for which enhancing magnitude adjustment has been performed.

The process of step S123 is performed through (a) a band division process illustrated in FIG. 14 and multiplication of enhancing magnitude for an AC component, and (b) a re-synthesis process illustrated in FIG. 15.

First, the band separation process illustrated in FIG. 14 will be described.

The coordinate position-corresponding default filter Fbase illustrated in FIG. 14 is the filter generated in the process of step S122 of the flowchart illustrated in FIG. 9.

First, the coordinate position-corresponding default filter Fbase is band-divided into a DC component and an AC component, thereby obtaining two filters.

The filter with the DC component is a filter in which a coefficient of only a center pixel of a filter of 7×7 pixels is 1.0 and coefficients of the other pixels have been set to 0.

The filter with the AC component is a filter having coefficients obtained by subtracting the coefficients of the DC component from coefficients of the coordinate position-corresponding default filter Fbase.

Moreover, the AC component is multiplied by the enhancing magnitude (=magnitude adjustment parameter β).

Using the result obtained by multiplying the AC component by the enhancing magnitude and the re-synthesis process for adding the DC component, the blur correction processing section 210 generates the final blur correction filter Ffinal to be applied to final blur correction illustrated in FIG. 15.

The enhancing magnitude corresponds to the magnitude adjustment parameter β.

In the examples illustrated in FIG. 14 and FIG. 15, the enhancing magnitude adjustment parameter β is 1.5.

The blur correction processing section 210 multiplies the filter coefficient of the AC component generated by the band division process illustrated in FIG. 14 by the enhancing magnitude adjustment parameter β (=1.5) and performs a synthesis process of adding the multiplication result to each corresponding coefficient of the DC component, thereby generating the final blur correction filter Ffinal with adjusted enhancing magnitude and the coefficients illustrated in FIG. 15.

Setting of the enhancing magnitude adjustment parameter β and a change in the filter characteristics will be described with reference to FIG. 16.

Figure 16:
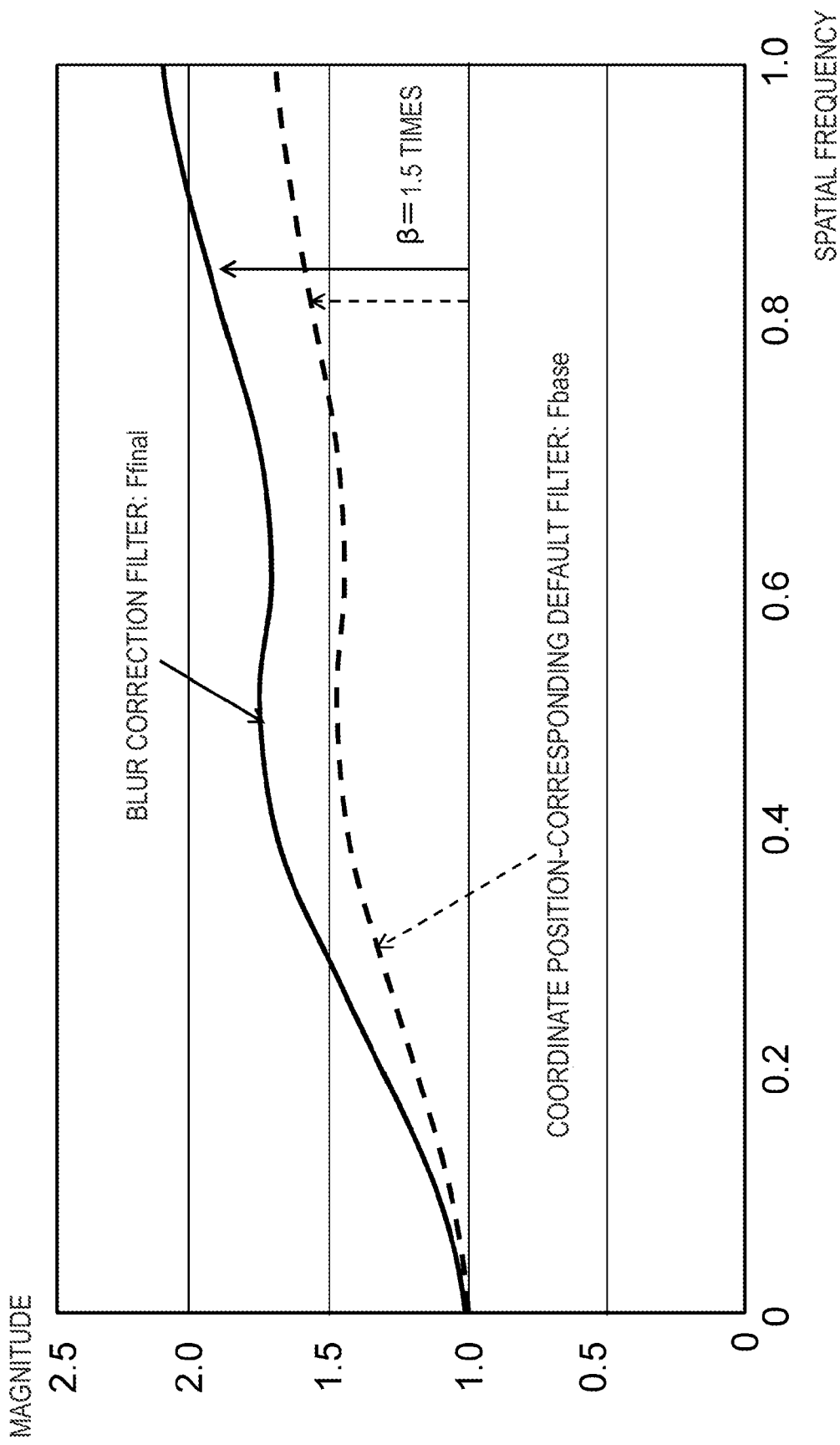
FIG. 16 is a diagram illustrating enhancing characteristics of a filter.

FIG. 16 is a diagram illustrating the enhancing characteristics of a filter similarly to the description with reference to FIG. 12, wherein a horizontal axis denotes a spatial frequency and a vertical axis denotes magnitude corresponding to a pixel value output after the filter is applied.

It is assumed that the enhancing characteristics of the coordinate position-corresponding default filter Fbase, for example, are indicated by a dotted line of FIG. 16.

The coordinate position-corresponding default filter Fbase is subject to (s1) the band division to the DC component and the AC component, (s2) the multiplication of the AC component and the enhancing magnitude adjustment parameter β (=1.5), and (s3) the re-synthesis process based on the addition process of the multiplication results of the AC component and the DC component, which have been described with reference to FIG. 14 and FIG. 15, so that it is possible to generate the blur correction filter Ffinal having characteristics indicated by a solid line of FIG. 16.

In the example illustrated in FIG. 16, the enhancing magnitude adjustment parameter β is 1.5. However, it is possible to generate the blur correction filter Ffinal having various types of settings by changing the value of β.

In addition, the enhancing magnitude adjustment parameter β is determined according to the image height r and the focus position information focus, similarly to the blend coefficient α described above.

A setting example of the enhancing magnitude adjustment parameter β will be described with reference to FIG. 17.

Figure 17:
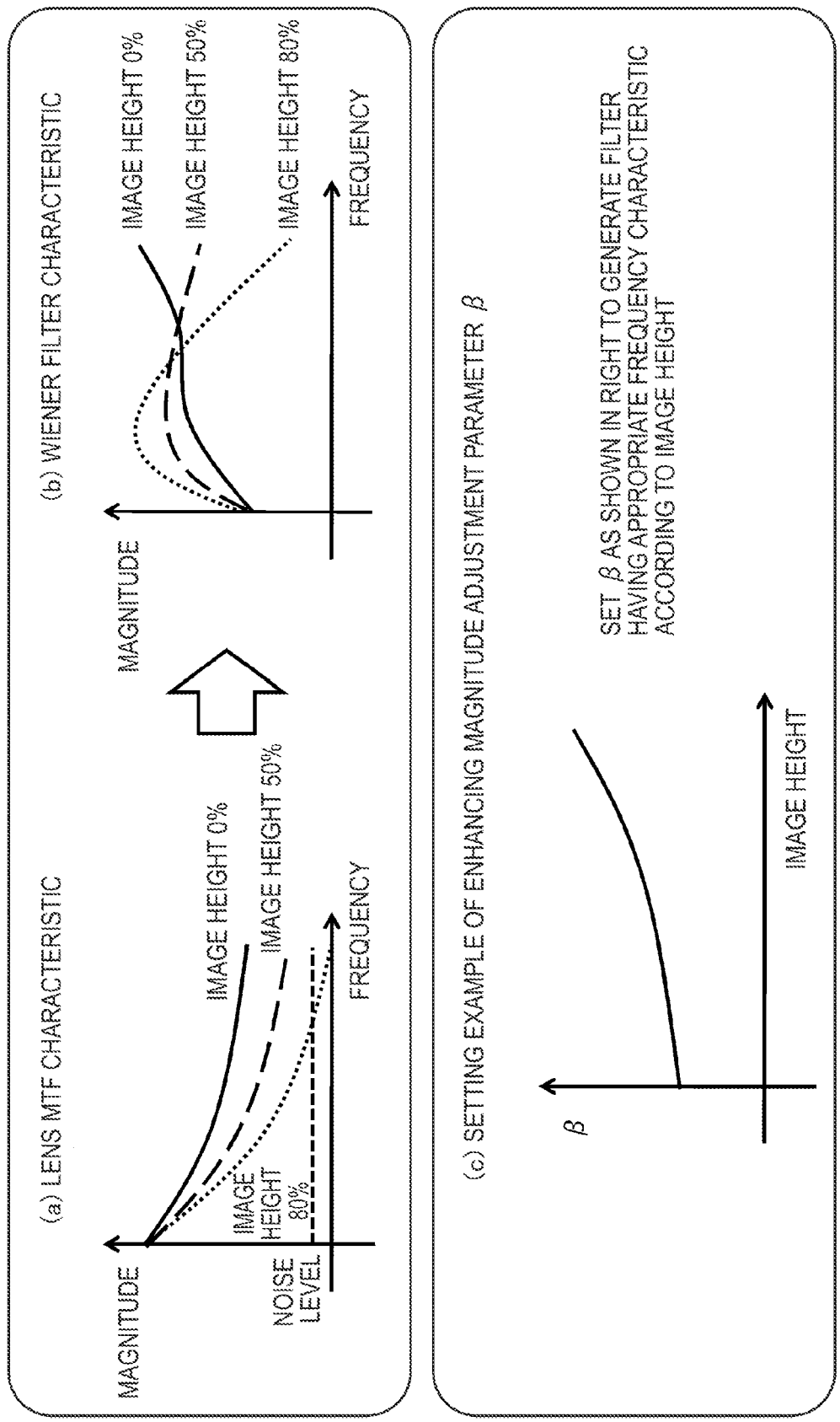
FIG. 17 is a diagram for describing a setting example of (a) lens MTF characteristics, (b) Wiener filter characteristics, and (c) an enhancing magnitude adjustment parameter $\beta$.

FIG. 17 illustrates (a) lens MTF characteristics, (b) Wiener filter characteristics, and (c) a setting example of the enhancing magnitude adjustment parameter β.

As illustrated in (a) of FIG. 17, the MTF characteristics generally deteriorate when an image height is increased (a distance from an image center is increased). Therefore, the enhancing magnitude of the Wiener filter is also allowed to be increased as illustrated in (b) of FIG. 17.

In this regard, as illustrated in (c) of FIG. 17, when the image height is increased (the distance from the image center is increased), it is preferable that the enhancing magnitude adjustment parameter β be allowed to be increased.

It can be said that focus shift is similar. That is, as the focus shift is increased, the enhancing magnitude adjustment parameter β is allowed to be increased.

In addition, as described above, the focus shift corresponds to a value unique to an image processing apparatus (a camera), and a shift amount generated according to each focus position is a unique value in each camera. Accordingly, since a focus shift amount can be calculated from focus position information, the blur correction processing section 210 receives the focus position information (refer to FIG. 4) from the control block 140 as shown in FIG. 3, calculates the focus shift amount according to a preset calculation equation, and calculates the enhancing magnitude adjustment parameter β (focus, r) using the focus shift amount and the image height r acquired from the image height calculation section 202.

As described above, in step S123 of the flowchart illustrated in FIG. 9, the blur correction processing section 210 applies the magnitude adjustment parameter β (focus, r) corresponding to the image height and the focus position to the coordinate position-corresponding default filter Fbase generated in step S122, thereby generating the blur correction filter Ffinal subject to the enhancing magnitude adjustment.

The blur correction filter Ffinal generated in step S123 of the flowchart illustrated in FIG. 9 is the blur correction filter generated in step S101 of the entire process flowchart illustrated in FIG. 5 described as the entire process sequence of the image signal correction unit 200 illustrated in FIG. 4.

The blur correction filter is a filter corresponding to the image height and the focus position, and is a filter sequentially generated according to each corrected pixel position and each focus position.

The blur correction filter Ffinal generated in step S101 of the flowchart illustrated in FIG. 5 is applied to step S103, so that the blur correction process is performed for each pixel.

In addition, the filter application process is equivalent to the process described with reference to FIG. 2.

Instead of (b) the Wiener filter illustrated in FIG. 2, the blur correction filter Ffinal generated through the aforementioned processes is applied.

That is, a convolution operation is performed to multiply pixels of a predetermined unit of pixel area (for example, a pixel area of 7×7 pixels) about a pixel to be corrected by the coefficients of the blur correction filter Ffinal generated through the aforementioned processes, and to add multiplication results to one another, thereby calculating a corrected pixel value of a center pixel.

In addition, as described above, when the saturation detection has been performed in step S102 of the flowchart illustrated in FIG. 5, the blur correction process is omitted.

When the saturation pixel is not detected from the predetermined unit of pixel area (for example, the pixel area of 7×7 pixels) about the pixel to be corrected, the blur correction process based on pixel value correction using the blur correction filter Ffinal generated through the aforementioned processes is performed.

As described above, the blur correction filter Ffinal generated in the present embodiment is a filter for which coefficient adjustment has been performed in consideration of the position of a pixel to be corrected, in detail, the image height and the focus position. That is, using a filter with frequency characteristics and magnitude characteristics adjusted according to the image height and the focus position, it is possible to perform optimal blur correction corresponding to each pixel position and each focus position.

In addition, the aforementioned embodiment has been described using the process in which the blur correction filter generated in step S101 of the flowchart illustrated in FIG. 5 is used as the blur correction filter Ffinal finally generated according to FIG. 8 and the flowchart illustrated in FIG. 9, and the blur correction filter Ffinal is applied to step S103 illustrated in FIG. 5 to perform the blur correction process for each pixel.

However, for example, step S123 of the flowchart illustrated in FIG. 9 may be omitted, and in step S122, the coordinate position-corresponding default filter Fbase generated based on the blend coefficient α (focus, r) may be applied as a final blur correction filter.

Alternatively, step S121 or step S122 of the flowchart illustrated in FIG. 9 may be omitted, and the blur correction filter may be generated through only the process of step S123. That is, the filter, which is obtained by allowing a default filter held in a memory in advance to be subjected to the process of step S123 of the flowchart illustrated in FIG. 9, that is, the band division process, the magnitude adjustment of the AC component using the enhancing magnitude adjustment parameter β (focus, r), and the re-synthesis process, which has been described with reference to FIG. 14 and FIG. 15, may be applied to the blur correction.

Furthermore, in the above embodiment, the configuration example, in which the blend coefficient α or the enhancing magnitude adjustment parameter β is determined using the image height r and the focus position information focus, has been described. However, the blend coefficient α or the enhancing magnitude adjustment parameter β may be determined depending only on the image height r. Alternatively, the blend coefficient α or the enhancing magnitude adjustment parameter β may be determined depending only on the focus position information focus. Moreover, the blend coefficient α or the enhancing magnitude adjustment parameter β may be determined in consideration of other parameters, for example, a zoom position and the like.

4. (Second Embodiment) Configuration Example of Image Processing Apparatus for Performing Blur Correction in Consideration of Color Ratio In the aforementioned embodiment, the imaging element has the RGB array. In recent years, an imaging element provided with a filter having an RGBW array including W (White), which transmits visible rays including RGB, has been widely used in addition to the RGB.

As described above, in the case of using the filter having the RGBW array including the W (White) pixel, since the W pixel transmits visible rays with a wide wavelength region, a blur pattern is changed according to an object color.

Japanese Unexamined Patent Application Publication No. 2011-055038 previously filed by the present applicant discloses a blur correction process configuration for a photographed image having an RGBW pixel array. However, since a process disclosed in the priority application corresponds to a configuration in which correction is performed without considering a color ratio in blur correction for the W (White) pixel, a correction effect may not be sufficiently obtained for the W pixel in which a blur pattern is changed according to the color ratio.

Hereinafter, an embodiment solving the above problem will be described.

Figure 18:
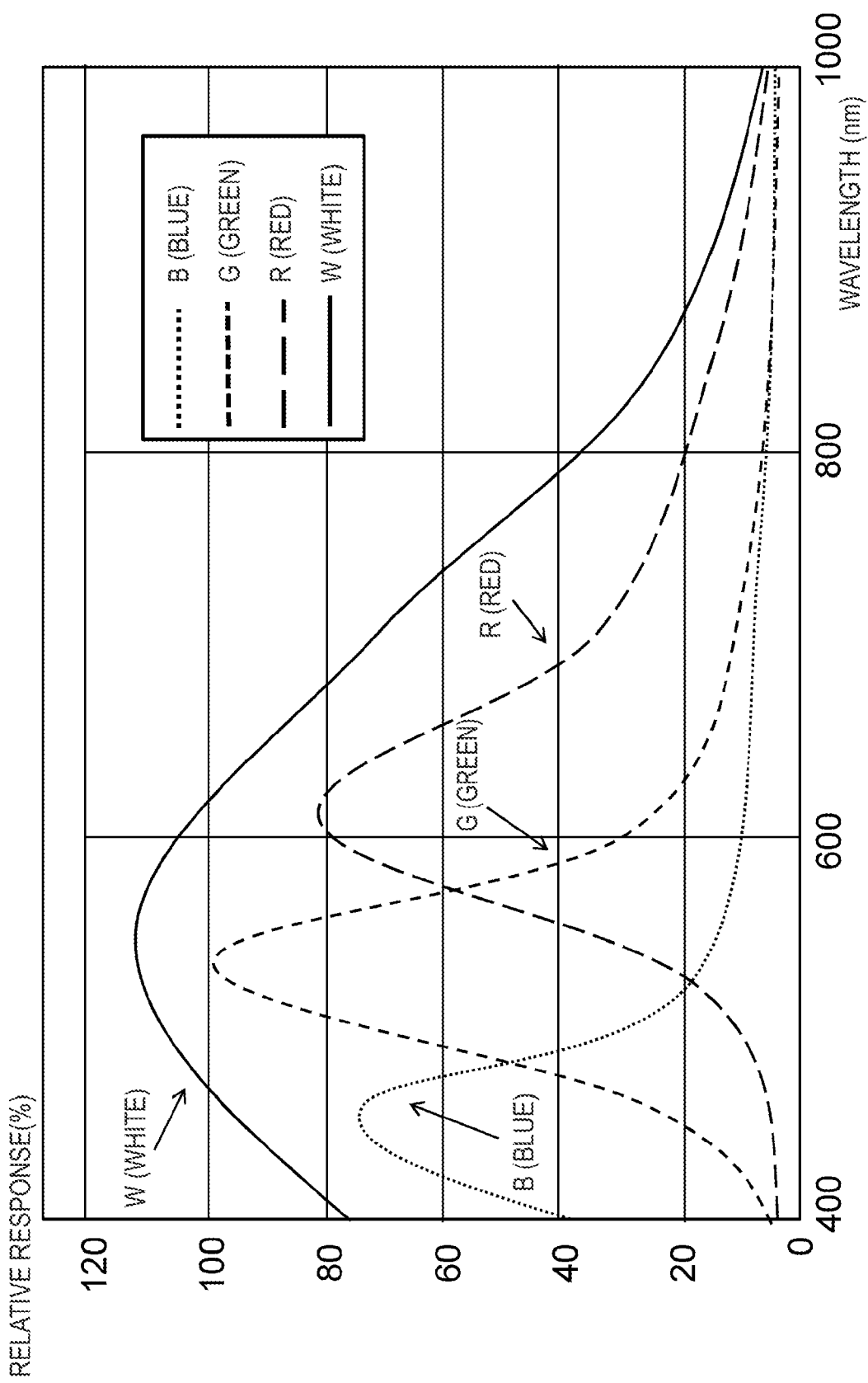
FIG. 18 is a diagram illustrating spectral magnitude characteristics of each color in RGBW filters.

FIG. 18 is a diagram illustrating spectral magnitude characteristics of each color in RGBW filters:

Red (R) that efficiently transmits wavelength light corresponding to a red color around 600 nm;

Green (G) that efficiently transmits wavelength light corresponding to a green color around 530 nm;

Blue (B) that efficiently transmits wavelength light corresponding to a blue color around 430 nm; and For these RGB filters, the W (White) transmits all RGB wavelength light.

Figure 19:
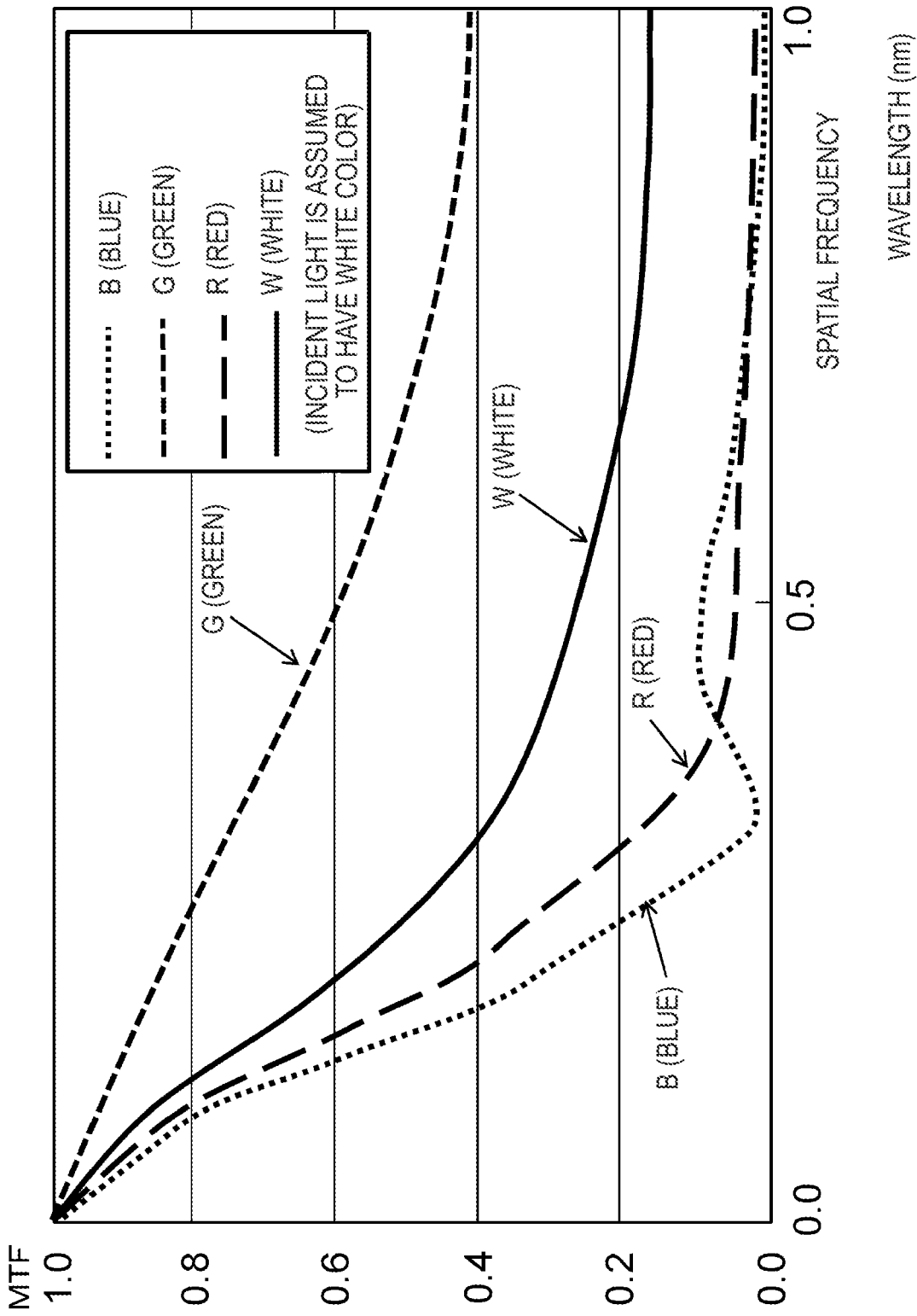
FIG. 19 is a diagram illustrating MTF characteristics of each RGBW color.

FIG. 19 is a diagram illustrating MTF characteristics of RGBW colors, wherein a horizontal axis denotes a spatial frequency and a vertical axis denotes MTF. In addition, incident light is assumed to have a white color.

As the MTF is high, blurring is small, and as the MTF is reduced, the degree of blurring is severe.

For example, in relation to the G (Green), since the MTF has a high value over a wide spatial frequency with respect to other colors RB, blurring is small. This means that blurring is small when a large amount of a G (Green) component is included in incident light, and blurring is severe when a large amount of an R (Red) or B (Blue) component is included in incident light.

In a configuration using an RGB array of a Bayer array, a filter corresponding to the MTF characteristics of RGB colors is used, so that blur correction corresponding to individual RGB characteristics is possible. That is, if blur correction filters for R, G, and B are applied for blur correction of R, G, and B pixels, it is possible to perform appropriate correction corresponding to the MTF characteristics of the RGB.

However, in the case of W (White), wavelength light input through a W filter is changed according to a color of an object. As a consequence, MTF characteristics are also changed according to the color of the object and a light source, resulting in a change in a blur pattern according to the color of the object and the light source. Thus, although one filter is applied, it is difficult to perform appropriate correction.

In addition, since the MTF characteristics of the W (White) illustrated in FIG. 19 are only an example when incident light is white light, the MTF characteristics of the W (White) are significantly changed according to the color of the object.

Hereinafter, a configuration example, in which blur correction is performed in consideration of a color ratio in order to solve the above problem, will be described.

An image processing apparatus (an imaging apparatus) to be described below performs a process for an input signal from an imaging element using a filter having an RGBW array.

The image processing apparatus performs a process of converting an RGBW image to an RGB image, in addition to the blur correction process.

First, a conversion process from an RGBW image to an RGB image will be described with reference to FIG. 20.

The image processing apparatus of the present embodiment performs a process for acquirement data of an imaging element (an image sensor) having an RGBW color filter including W (White) that transmits all RGB wavelength light, in addition to RGB filters that selectively transmit wavelength light of each RGB color.

Figure 20:
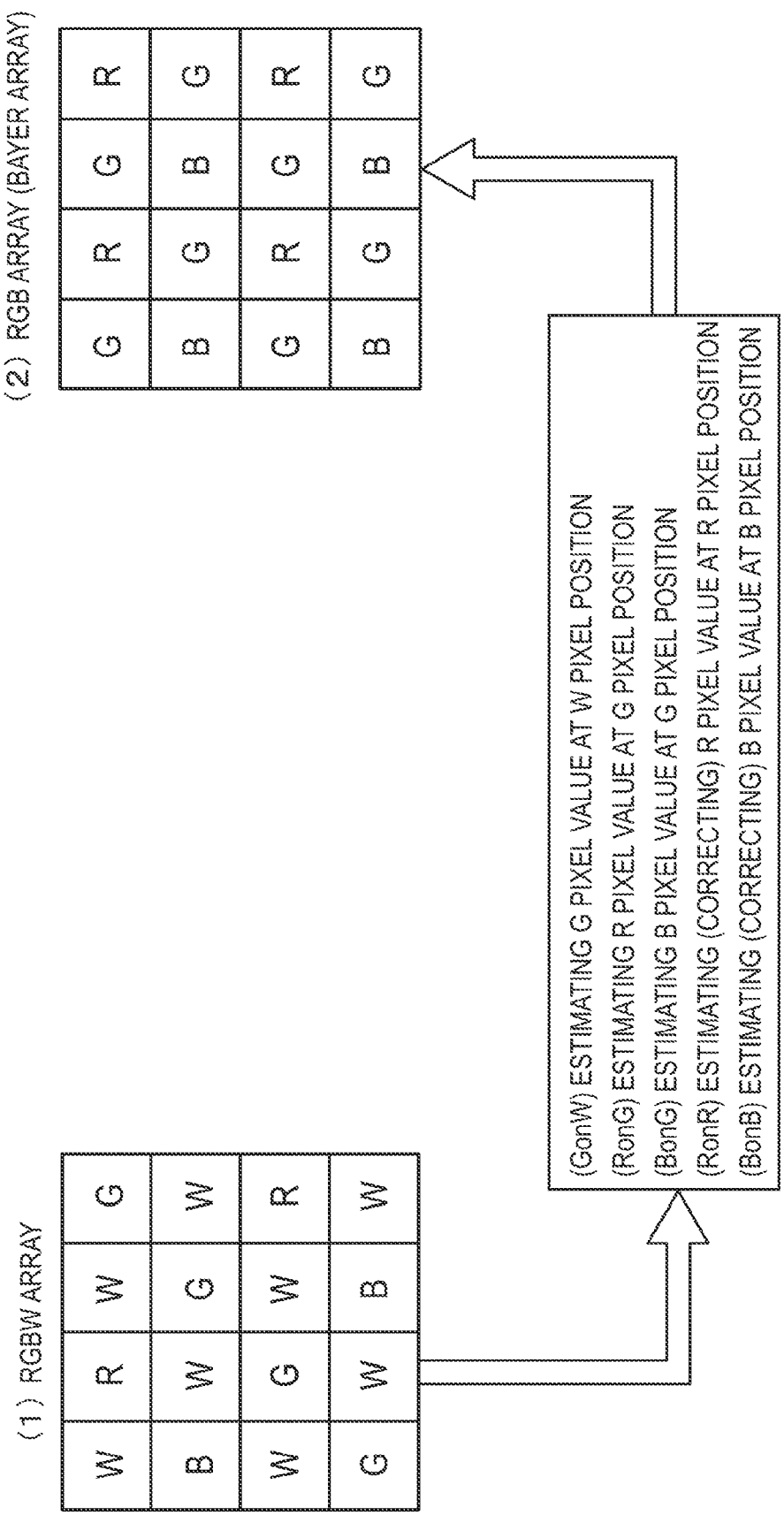
FIG. 20 is a diagram for describing a process of converting an RGBW image into an RGB image.

In detail, the image processing apparatus performs a process of converting acquirement data of an imaging element having, for example, an RGBW color filter including W (White) as illustrated in (1) of FIG. 20 to an RGB array (a Bayer array) illustrated in (2) of FIG. 20. Moreover, at the time of the conversion process, the image processing apparatus performs a process for preventing the occurrence of blurring or a false color.

In detail, the image processing apparatus performs the following five conversion or correction processes in the conversion process from the RGBW array to the RGB Bayer array:

Converting a $W$ pixel position to a $G$ pixel (estimating a $G$ pixel value)=($GonW$);

Converting a $G$ pixel position to an $R$ pixel (estimating an $R$ pixel value)=($RonG$);

Converting a $G$ pixel position to a $B$ pixel (estimating a $B$ pixel value)=($BonG$);

Converting an $R$ pixel position to an $R$ pixel (correcting an $R$ pixel value)=($RonR$); and Converting a $B$ pixel position to a $B$ pixel (correcting a $B$ pixel value)=($BonB$).

Each correction process is performed as a pixel value estimation or correction process of converting RGBW pixels in the RGBW array to RGB pixels in the RGB array. These processes are performed so that the RGB Bayer array illustrated in (2) of FIG. 20 is generated from the RGBW color array illustrated in (1) of FIG. 20.

Hereinafter, the conversion process of the color array will be referred to as a demosaicing process.

In the following embodiment, a description will be provided for a configuration in which the demosaicing process is performed to convert an RGBW color array having White (W) to an RGB color array (a Bayer array), and a process for preventing the occurrence of blurring or a false color is performed at the time of the demosaicing process.

Figure 21:
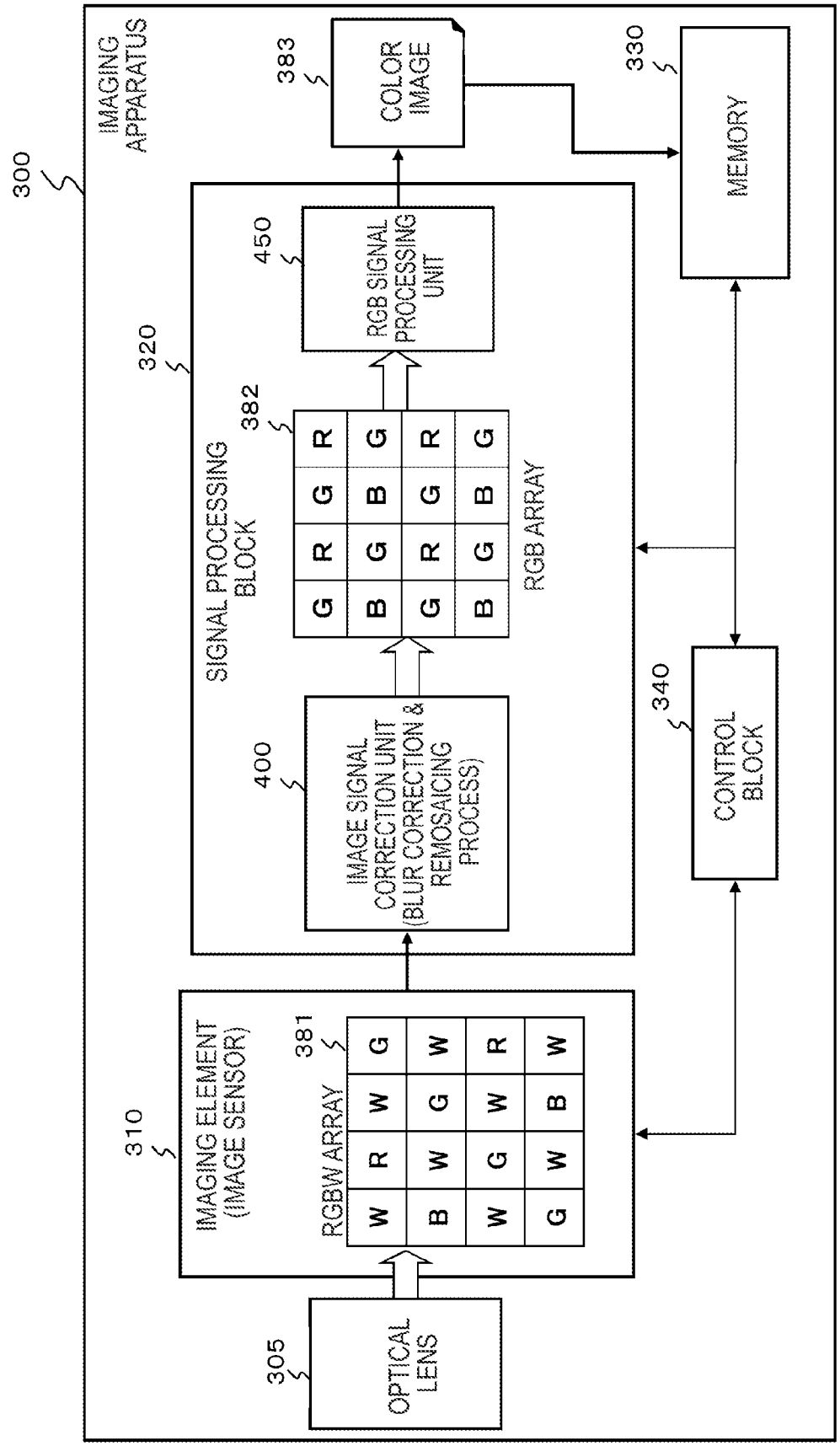
FIG. 21 is a diagram for describing an embodiment of an image processing apparatus.

FIG. 21 is a diagram illustrating a configuration example of an imaging apparatus 300 which is an embodiment of the image processing apparatus of the present disclosure. The imaging apparatus 300 includes an optical lens 305, an imaging element (an image sensor) 310, a signal processing block 320, a memory 330, and a control block 340. The basic configuration is equivalent to the configuration described with reference to FIG. 3.

In addition, the imaging apparatus corresponds to an aspect of the image processing apparatus. The image processing apparatus of the present disclosure, for example, includes an apparatus such as a PC. The image processing apparatus such as a PC includes elements other than the optical lens 305 and the imaging element 310 of the imaging apparatus 300 illustrated in FIG. 21, and is provided with an input unit or a storage unit for data acquired by the imaging element 310.

Differently from the imaging apparatus 100 illustrated in FIG. 3 described above, the imaging apparatus 300 illustrated in FIG. 21 has a configuration in which the imaging element (the image sensor) 310 includes a filter having an RGBW array. That is, the imaging element 310 is an imaging element provided with a filter having four types of spectral characteristics of White (W) that transmits RGB, in addition to Red (R) that transmits a wavelength around a red color, Green (G) that transmits a wavelength around a green color, and Blue (B) that transmits a wavelength around a blue color.

The imaging element 310 having the RGBW array 381 receives RGBW light through the optical lens 305 in units of pixels, generates an electrical signal corresponding to the intensity of a light receiving signal through photoelectric conversion, and outputs the electrical signal. Through the imaging element 310, a mosaic image having four types of RGBW spectra is obtained.

An output signal of the imaging element (the image sensor) 310 is input to an image signal correction unit 400 of the image processing block 320.

Similarly to the previous embodiment, the image signal correction unit 400, for example, performs blur correction in consideration of a blur pattern changed according to an image height (a distance from an optical center) or a focus position, and further a color ratio.

Moreover, the image signal correction unit 400 performs a conversion process from the RGBW array 381 to an RGB array 382. In detail, the image signal correction unit 400 performs the following five conversion or correction processes described with reference to FIG. 20:

Converting the W pixel position to the G pixel(estimating the G pixel value)=(GonW);

Converting the G pixel position to the R pixel(estimating the R pixel value)=(RonG);

Converting the G pixel position to the B pixel(estimating the B pixel value)=(BonG);

Converting the R pixel position to the R pixel(correcting the R pixel value)=(RonR); and Converting the B pixel position to the B pixel(correcting the B pixel value)=(BonB).

At the time of the conversion or correction processes, the image signal correction unit 400 performs a process for preventing the occurrence of a false color or blurring.

The RGB array 382, for which blur correction and data conversion have been performed in the image signal correction unit 400, is output to an RGB signal processing unit 450.

The RGB signal processing unit 450 performs the same process as a signal processing unit in an existing camera. In detail, the RGB signal processing unit 450 performs a demosaicing process, a white balance adjustment process, a γ correction process and the like, thereby generating a color image 383. The generated color image 383 is stored in the memory 330.

The control block 340 controls this series of processes. For example, in the state in which a program for executing the series of processes is stored in the memory 330, the control block 340 executes the program read from the memory 330, thereby controlling the series of processes.

In addition, the memory 330, for example, may include various recording media such as a magnetic disk, an optical disc, or a flash memory.

A detailed configuration of the image signal correction unit 400 will be described with reference to FIG. 22.

Figure 22:
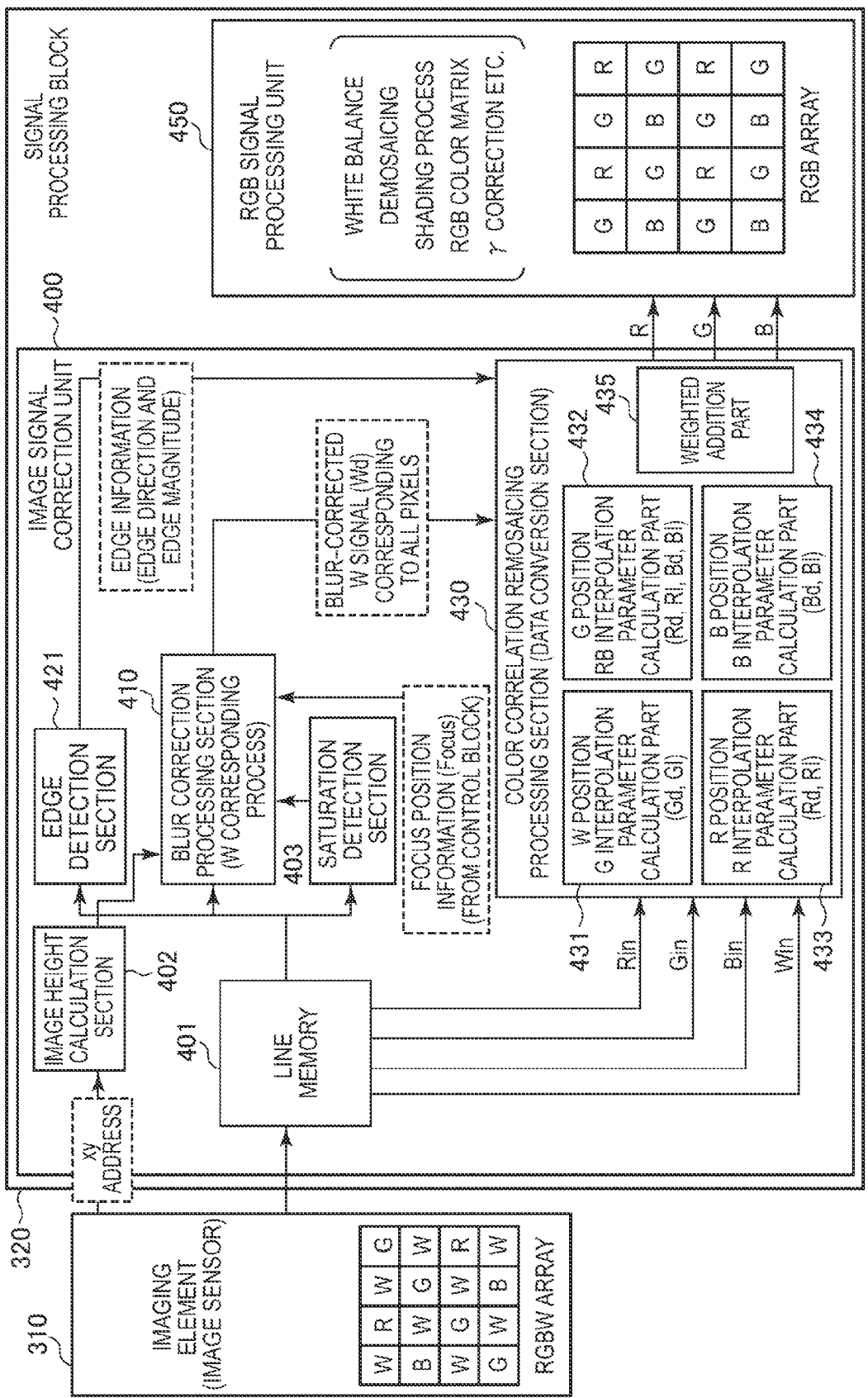
FIG. 22 is a diagram for describing an embodiment of an image processing apparatus.

As illustrated in FIG. 22, the image signal correction unit 400 includes a line memory 401, an image height calculation section 402, a saturation detection section 403, a blur correction processing section 410, an edge detection section 421, and a color correlation remosaicing processing section (a data conversion section) 430.

The color correlation remosaicing processing section (a data conversion section) 430 includes a W position G interpolation parameter calculation part 431, a G position RB interpolation parameter calculation part 432, an R position R interpolation parameter calculation part 433, a B position B interpolation parameter calculation part 434, and a weighted addition part 435.

Pixel value signals corresponding to pixels output from the imaging element 310 are stored in the line memory 401 once.

Furthermore, an xy address indicating a coordinate position of each pixel associated with the pixel value of each pixel is output to the image height calculation section 402.

The line memory 401 has a line memory corresponding to seven horizontal lines of an imaging element. The line memory 401 sequentially outputs data corresponding to the seven horizontal lines in a parallel manner. An output destination is the blur correction processing section 410, the edge detection section 421, and the saturation detection section 403. Captured data of the RGBW array 381 is output to these processing sections in units of seven lines.

In addition, the edge detection section 421 and the blur correction processing section 410 perform a process for a white (W) signal of the captured data of the RGBW array 381.

Furthermore, the color correlation remosaicing processing section 430 performs a process using RGBW signals of the captured data of the RGBW array 381.

The edge detection section 421 verifies a discrete white (W) signal included in an output signal from the line memory 401, generates edge information included in an image, for example, edge information including an edge direction and edge magnitude, and outputs the generated edge information to the color correlation remosaicing processing section 430.

In detail, the edge detection section 421, for example, calculates flatness weightFlat calculated from pixel information of 7×7 pixels about a pixel to be processed (a center pixel of the 7×7 pixels), and outputs the flatness weightFlat to the color correlation remosaicing processing section 430.

In addition, the flatness weightFlat calculation process can be performed as the same process as a process disclosed in Japanese Unexamined Patent Application Publication No. 2011-55038 which is the present applicant's priority application.

First, the blur correction processing section 410 applies a white (W) pixel included in the output signal from the line memory 401, sets the W pixel at RGB pixel positions through a blur correction process, and generates an interpolated image in which the W pixel has been set in all pixels. Moreover, the blur correction processing section 410 performs an interpolation process for each W pixel of the image in which the W pixel has been set in all pixels, generates a blur-corrected W signal of all pixels, that is, a blur-corrected W signal Wd, and outputs the blur-corrected W signal Wd to the color correlation remosaicing processing section 430.

In addition, the blur correction processing section 410 performs blur correction in consideration of at least color ratio.

Moreover, similarly to the previously described embodiment, the blur correction processing section 410, for example, may perform blur correction in consideration of a blur pattern changed according to an image height (a distance from an optical center) or a focus position, and further a color ratio.

The color correlation remosaicing processing section 430 receives the RGBW signal of the output signal from the line memory 401, the edge information output from the edge detection section 421, and the blur-corrected W signal Wd corresponding to all pixels and output from the blur correction processing section 410.

The color correlation remosaicing processing section 430 performs the conversion process from the RGBW color array to the RGB array 382 using the received information.

In detail, as described with reference to FIG. 20, the color correlation remosaicing processing section 430 performs the following five conversion or correction processes:

Converting the W pixel position to the G pixel(estimating the G pixel value)=(GonW);

Converting the G pixel position to the R pixel(estimating the R pixel value)=(RonG);

Converting the G pixel position to the B pixel(estimating the B pixel value)=(BonG);

Converting the R pixel position to the R pixel(correcting the R pixel value)=(RonR); and Converting the B pixel position to the B pixel(correcting v B pixel value)=(BonB).

The W position G interpolation parameter calculation part 431 calculates an interpolation parameter to be applied to calculation of a G pixel value to be set to the W pixel position of the RGBW array 381. Using W and B signals of the output signal from the line memory 401 and the blur-corrected W signal Wd input from the blur correction processing section 410, the W position G interpolation parameter calculation part 431 calculates the interpolation parameter to be applied to the process of (GonW).

The G position RB interpolation parameter calculation part 432 calculates an interpolation parameter to be applied to calculation of an R pixel value or a B pixel value to be set to the G pixel position of the RGBW array 381. Using the W and B signals of the output signal from the line memory 401 and the blur-corrected W signal Wd input from the blur correction processing section 410, the G position RB interpolation parameter calculation part 432 calculates the parameter to be applied to the processes of (RonG) and (BonG).

The R position R interpolation parameter calculation part 433 calculates an interpolation parameter to be applied to calculation of a correction R pixel value to be set to the R pixel position of the RGBW array 381. Using the W and B signals of the output signal from the line memory 401 and the blur-corrected W signal Wd input from the blur correction processing section 410, the R position R interpolation parameter calculation part 433 calculates the interpolation parameter to be applied to the process of (RonR).

The B position B interpolation parameter calculation part 434 calculates an interpolation parameter to be applied to calculation of a correction B pixel value to be set to the B pixel position of the RGBW array 381. Using the W and B signals of the output signal from the line memory 401 and the blur-corrected W signal Wd input from the blur correction processing section 410, the B position B interpolation parameter calculation part 434 calculates the interpolation parameter to be applied to the process of (BonB).

The weighted addition part 435 receives the interpolation parameters calculated by the interpolation parameter calculation parts 431 to 434, and further applies the edge information output from the edge detection section 421, thereby calculating RGB signal values of all pixels constituting the RGB array (the Bayer array) 382.

In addition, the data conversion process from the RGBW array to the RGB array, which is performed by the color correlation remosaicing processing section (the data conversion section) 430, may basically use the process disclosed in Japanese Unexamined Patent Application Publication No. 2011-55038 which is the present applicant's priority application. Details of the data conversion process can be found in Japanese Unexamined Patent Application Publication No. 2011-55038.

In this way, the image signal correction unit 400 generates the RGB array (the Bayer array) 382 including Gr, Rr, and Br calculated by the weighted addition part 435, and outputs the RGB array 382 to the RGB signal processing unit 450.

The RGB signal processing unit 450 is equivalent to a signal processing unit for an RGB array (a Bayer array) included in a general camera or image processing apparatus. The RGB signal processing unit 450 performs signal processing for the RGB array (the Bayer array) 382 output from the weighted addition part 435, thereby generating the color image 383 (refer to FIG. 21). In detail, the RGB signal processing unit 450, for example, performs a white balance process, a demosaicing process, a shading process, an RGB color matrix process, a γ correction process and the like, thereby generating the color image 383.

5. Details of Blur Correction Process of Image Processing Apparatus according to Second Embodiment Next, details of the blur correction process of the image processing apparatus according to the second embodiment will be described.

Figure 23:
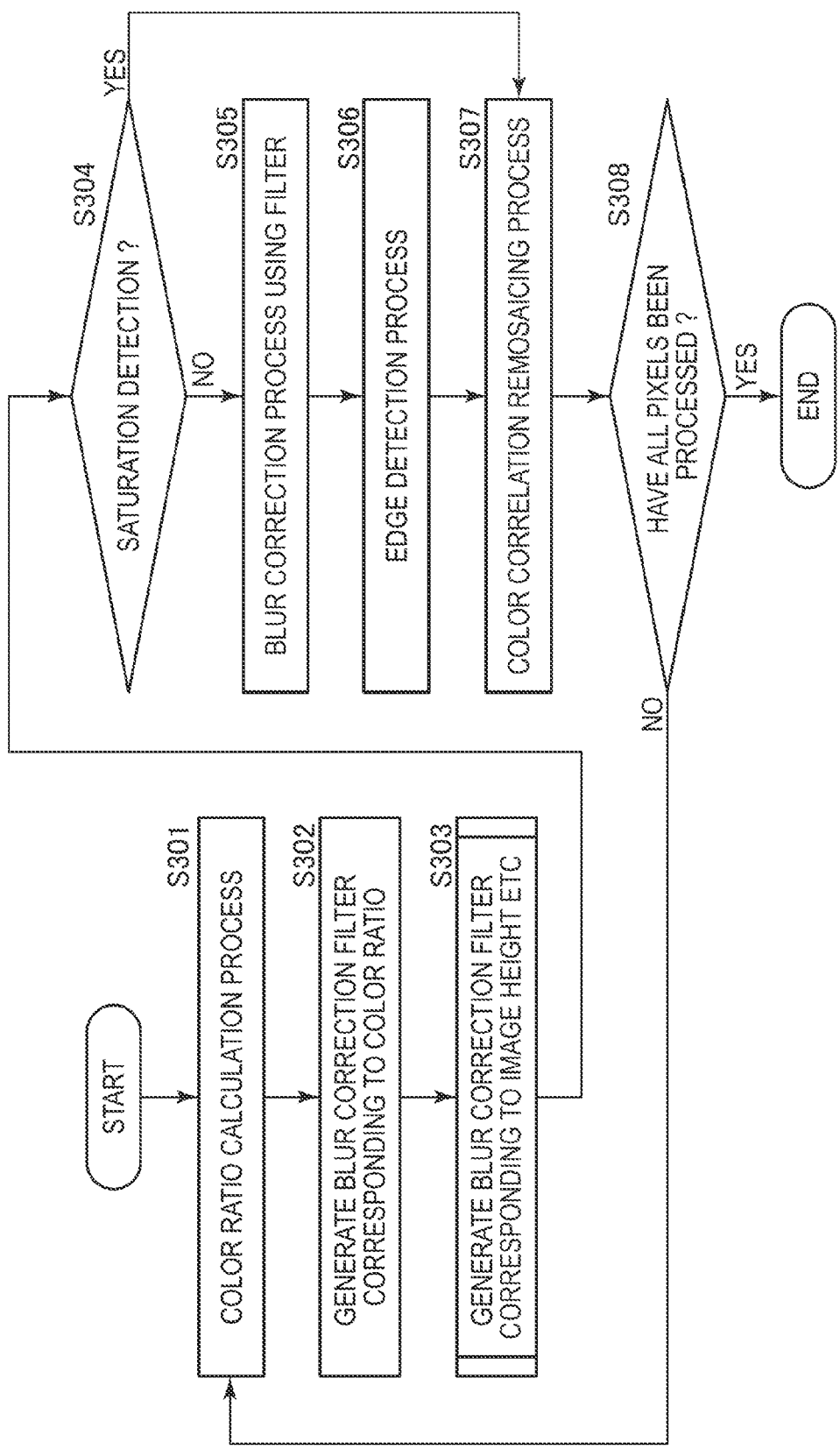
FIG. 23 is a flowchart for describing an entire sequence of a process performed by an image signal correction unit.

FIG. 23 is a flowchart for describing an entire sequence of a process performed by the image signal correction unit 400.

In addition, main processing bodies of processes of all steps of the flowchart illustrated in FIG. 23 are as follows.

The processes of steps S301 to S305 are mainly performed by the blur correction processing section 410.

The process of step S306 is performed by the edge detection section 421.

The process of step S307 is performed by the color correlation remosaicing processing section (the data conversion section) 430.

Furthermore, the processes of steps S301 to S305 mainly performed by the blur correction processing section 410 and the process of step S306 performed by the edge detection section 421 are performed using the W pixel included in the image data of the RGBW array as described above.

Details of the processes of all the steps will be described.

First, in step S301, the blur correction processing section 410 calculates a color ratio of a predetermined local area about one W pixel to be subjected to blur correction.

In addition, similarly to the previous embodiment, the blur correction processing section 410 performs a process for a predetermined image area (=a local area) about a pixel to be subjected to a blur correction process, for example, a rectangular image area of 7×7 pixels.

When a center pixel of the area of the 7×7 pixels is the W pixel, the blur correction processing section 410 performs a blur correction process for the W pixel.

When the center pixel of the area of the 7×7 pixels is not the W pixel, the blur correction processing section 410 performs a blur correction process for an interpolation W pixel value set based on pixel values of W pixels around a center position of the center pixel.

That is, as a pre-process of step S301, the blur correction processing section 410 applies the white (W) pixel included in the output signal from the line memory 401, sets the W pixel at RGB pixel positions rather than those of the W pixel through an interpolation process, and generates image data in which all pixels are W pixels. The blur correction processing section 410 sequentially selects the W pixel from the image data in which all the pixels are the W pixels one by one, and performs the blur correction process.

In step S301, the blur correction processing section 410 calculates color ratios (an R (Red) ratio, a G (Green) ratio, and a B (Blue) ratio) of the area of the 7×7 pixels about the W pixel to be subjected to blur correction through the following equations:

$R \text{ ratio} = mR/(mG+mR+mB);$ $G \text{ ratio} = mG/(mG+mR+mB); \text{ and}$ $B \text{ ratio} = mB/(mG+mR+mB).$ In the equations above, mR denotes a low frequency component of an R signal in a local area (for example, an area of 7×7 pixels), mG denotes a low frequency component of a G signal in the local area (for example, the area of the 7×7 pixels), and mB denotes a low frequency component of a B signal in the local area (for example, the area of the 7×7 pixels).

In addition, when the R (Red) ratio, the G (Green) ratio, and the B (Blue) ratio are calculated through the equations above, it is necessary to calculate the low frequency components mR, mG, and mB of the RGB signals in the local area (for example, the area of the 7×7 pixels).

In order to calculate the low frequency component corresponding to each color, the blur correction processing section 410, for example, performs a process using low frequency component calculation filters illustrated in FIG. 24 to FIG. 27.

The low frequency component calculation filters, which correspond to each color and are illustrated in FIG. 24 to FIG. 27, are filters to be applied to filter processing for output image data from the imaging element 310 of the 7×7 pixels about the W pixel (also includes an interpolated W pixel) to be subjected to blur correction. The low frequency component calculation filters are applied to the output image data from the imaging element 310, other than an interpolated image in which all the pixels are set as the W pixels through the interpolation process, so that the low frequency components mR, mG, and mB of the RGB signals are calculated.

The low frequency component calculation filters are variously set according to the configurations of 7×7 pixels.

FIG. 24 to FIG. 27 illustrate the following three filters to be selectively applied according to each configuration of the following 7×7 pixels:

a low frequency component (mG) calculation filter of the G signal;

a low frequency component (mR) calculation filter of the R signal; and a low frequency component (mB) calculation filter of the B signal.

Figure 24:
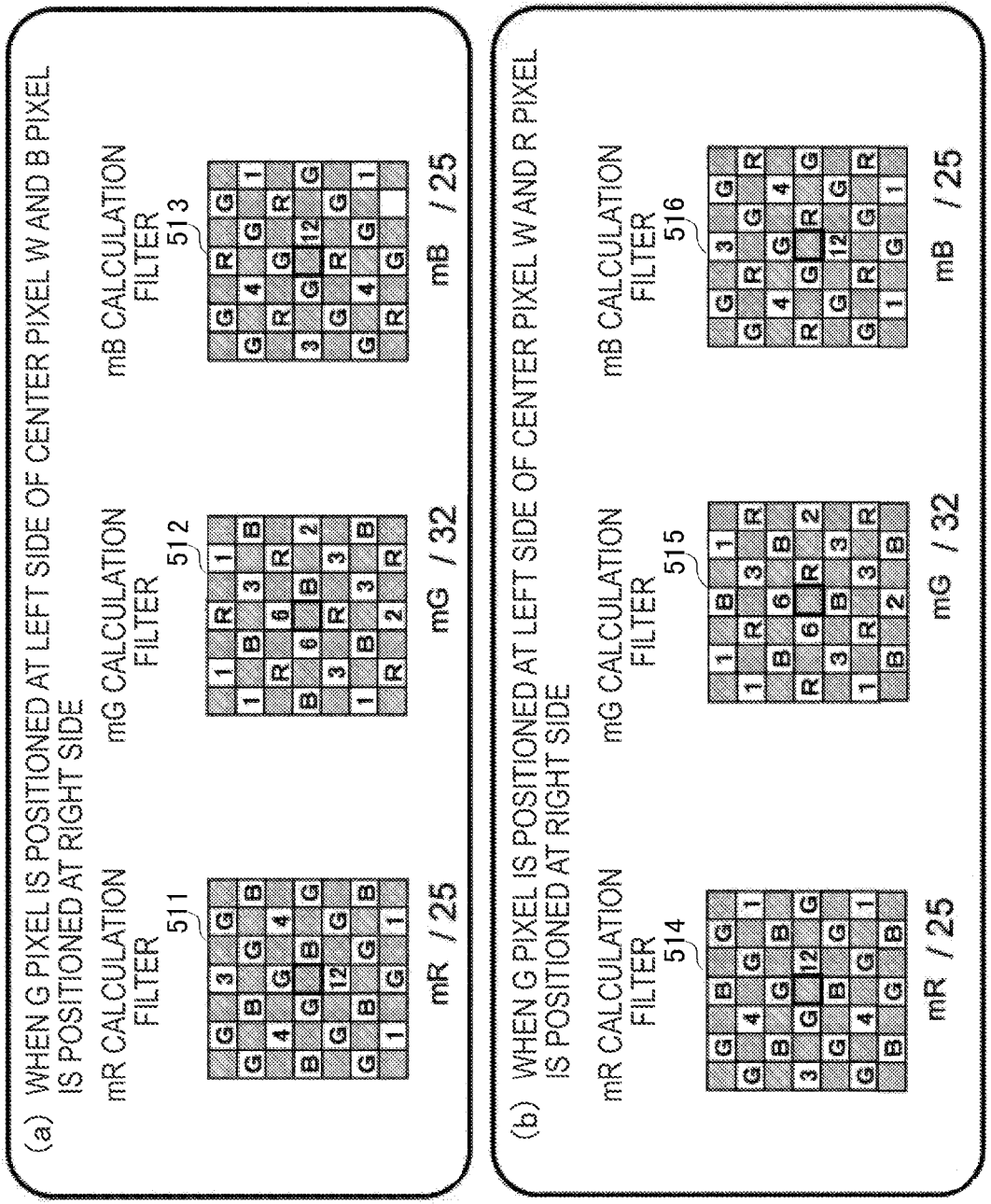
FIG. 24 is a diagram for describing a configuration example of low frequency component calculation filters for calculating low frequency components mR, mG, and mB.

FIG. 24 illustrates configurations of low frequency component calculation filters for calculating the low frequency components mR, mG, and mB of the RGB signals when the output image data from the imaging element 310 of the 7×7 pixels about the W pixel (also includes the interpolated W pixel) to be subjected to the blur correction is set as follows:

(a) low frequency component calculation filters (an mR calculation filter 511, an mG calculation filter 512, and an mB calculation filter 513) to be applied when a G pixel is positioned at the left side of a center pixel W and a B pixel is positioned at the right side of the center pixel W; and (b) low frequency component calculation filters (an mR calculation filter 514, an mG calculation filter 515, and an mB calculation filter 516) to be applied when the G pixel is positioned at the left side of the center pixel W and an R pixel is positioned at the right side of the center pixel W.

Numerical values (coefficients) in each filter are set only at setting positions of a color (R, G, or B) from which a low frequency component is to be calculated. These coefficient values are multiplied by pixel values of corresponding pixel positions of 7×7 pixels input from the imaging element, multiplication values are added to one another, and an addition value is divided by values (32, 25 and the like) illustrated in the lower portion of each filter, so that low frequency components are calculated.

Figure 25:
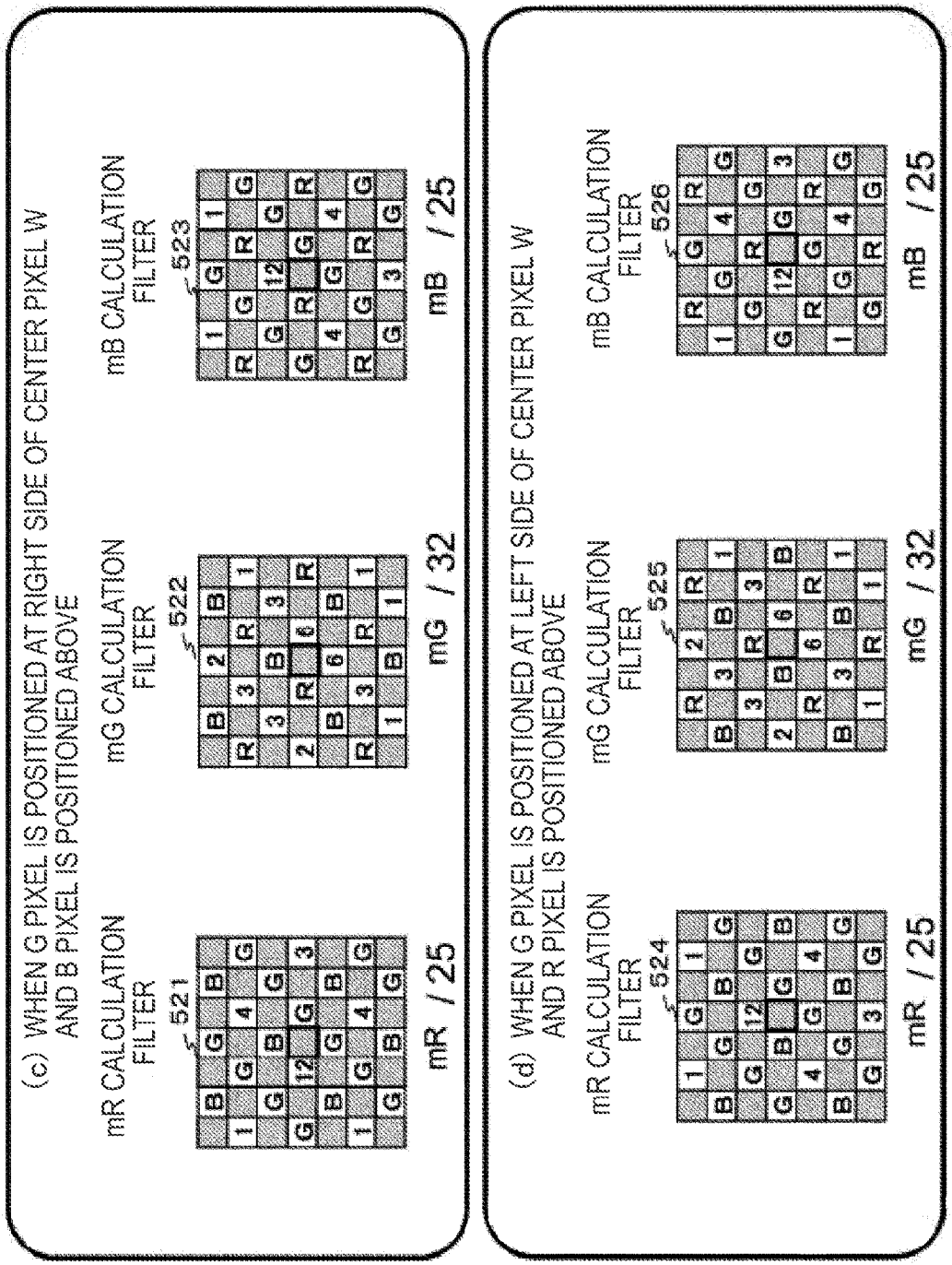
FIG. 25 is a diagram for describing a configuration example of low frequency component calculation filters for calculating low frequency components mR, mG, and mB.

FIG. 25 illustrates configurations of low frequency component calculation filters for calculating the low frequency components mR, mG, and mB of the RGB signals when the output image data from the imaging element 310 of the 7×7 pixels about the W pixel (also includes the interpolated W pixel) to be subjected to the blur correction is set as follows:

(c) low frequency component calculation filters (an mR calculation filter 521, an mG calculation filter 522, and an mB calculation filter 523) to be applied when a G pixel is positioned at the right side of a center pixel W and a B pixel is positioned above the center pixel W; and (d) low frequency component calculation filters (an mR calculation filter 524, an mG calculation filter 525, and an mB calculation filter 526) to be applied when the G pixel is positioned at the right side of the center pixel W and an R pixel is positioned above the center pixel W.

FIG. 26 illustrates configurations of low frequency component calculation filters for calculating the low frequency components mR, mG, and mB of the RGB signals when the output image data from the imaging element 310 of the 7×7 pixels about the W pixel (also includes the interpolated W pixel) to be subjected to the blur correction is set as follows:

(e) low frequency component calculation filters (an mR calculation filter 541, an mG calculation filter 542, and an mB calculation filter 543) to be applied when R pixels are positioned on an oblique line from left upper to right lower side of a center pixel G; and (f) low frequency component calculation filters (an mR calculation filter 544, an mG calculation filter 545, and an mB calculation filter 546) to be applied when B pixels are positioned on the oblique line from left upper to right lower side of the center pixel G.

In the example illustrated in FIG. 26, the center pixel of the 7×7 pixels input from the imaging element is not the W pixel. In addition, in this case, the blur correction process is performed for the aforementioned interpolated image in which the W pixels have been set in all pixels.

Figure 27:
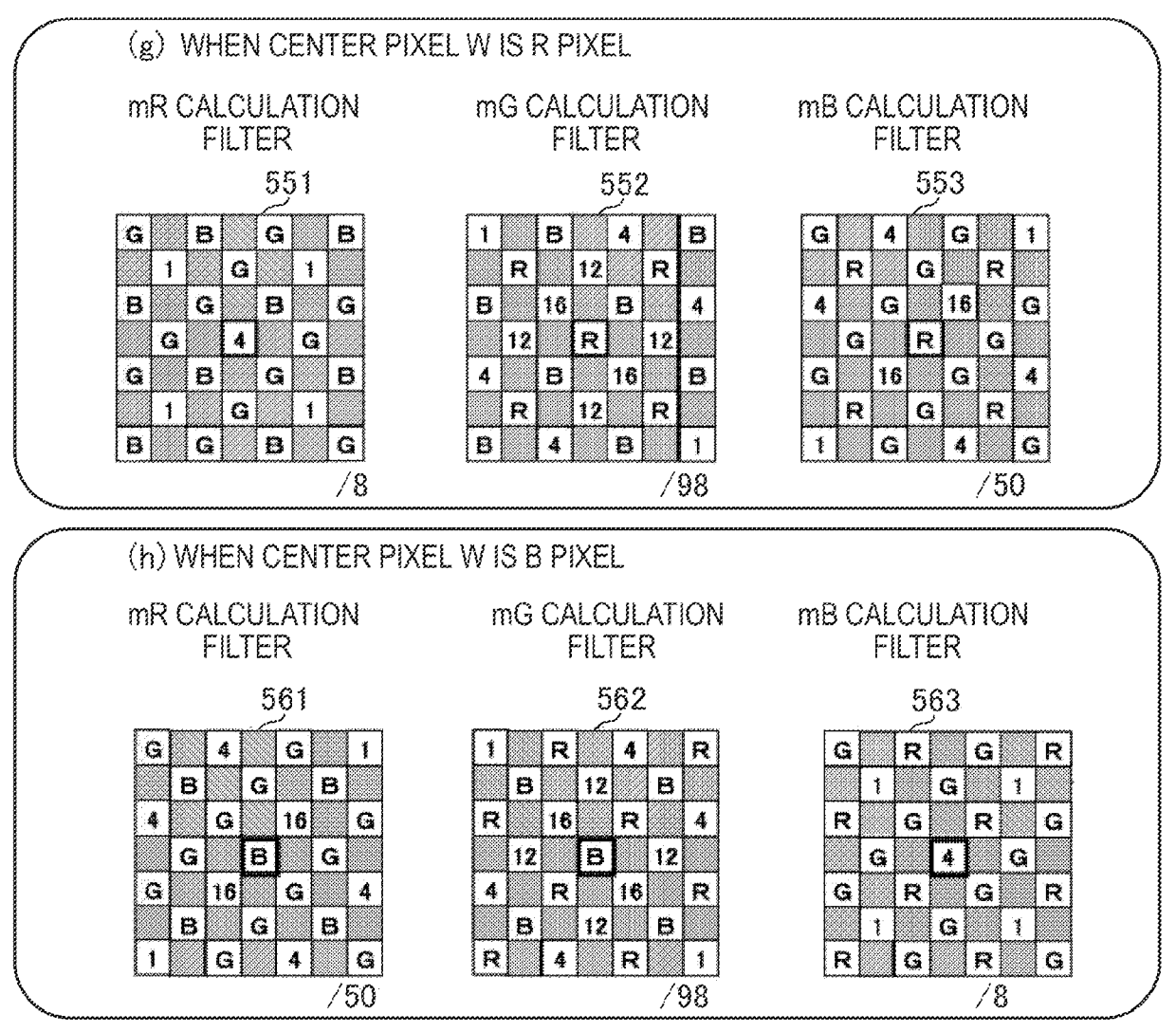

FIG. 27 illustrates configurations of low frequency component calculation filters for calculating the low frequency components mR, mG, and mB of the RGB signals when the output image data from the imaging element 310 of the 7×7 pixels about the W pixel (also includes the interpolated W pixel) to be subjected to the blur correction is set as follows:

(g) low frequency component calculation filters (an mR calculation filter 551, an mG calculation filter 552, and an mB calculation filter 553) to be applied when a center pixel W is an R pixel; and (h) low frequency component calculation filters (an mR calculation filter 561, an mG calculation filter 562, and an mB calculation filter 563) to be applied when the center pixel W is a B pixel.

Also in the example illustrated in FIG. 27, the center pixel of the 7×7 pixels input from the imaging element is not the W pixel. In addition, in this case, the blur correction process is performed for the aforementioned interpolated image in which the W pixels have been set in all pixels.

In step S301, the blur correction processing section 410 selectively applies the low frequency component calculation filters illustrated in FIG. 24 to FIG. 27 according to pixel patterns of the area of the 7×7 pixels about the W pixel to be subjected to the blur correction, thereby calculating the low frequency components mR, mG, and mB of the RGB signals in the local area (for example, the area of the 7×7 pixels).

Moreover, using the low frequency components of these colors, the blur correction processing section 410 calculates the color ratios (the R (Red) ratio, the G (Green) ratio, and the B (Blue) ratio), which correspond to the W pixel (also includes the interpolated W pixel) to be subjected to the blur correction at the center of the area of the 7×7 pixels, according to the following equations:

$$R\text{ ratio}=mR/(mG+mR+mB);$$

$$G\text{ ratio}=mG/(mG+mR+mB);\text{ and}$$

$$B\text{ ratio}=mB/(mG+mR+mB).$$

Next, in step S302, the blur correction processing section 410 applies the color ratios calculated in step S301 to generate blur correction filters corresponding to the color ratios.

This process will be described with reference to FIG. 28.

Figure 28:
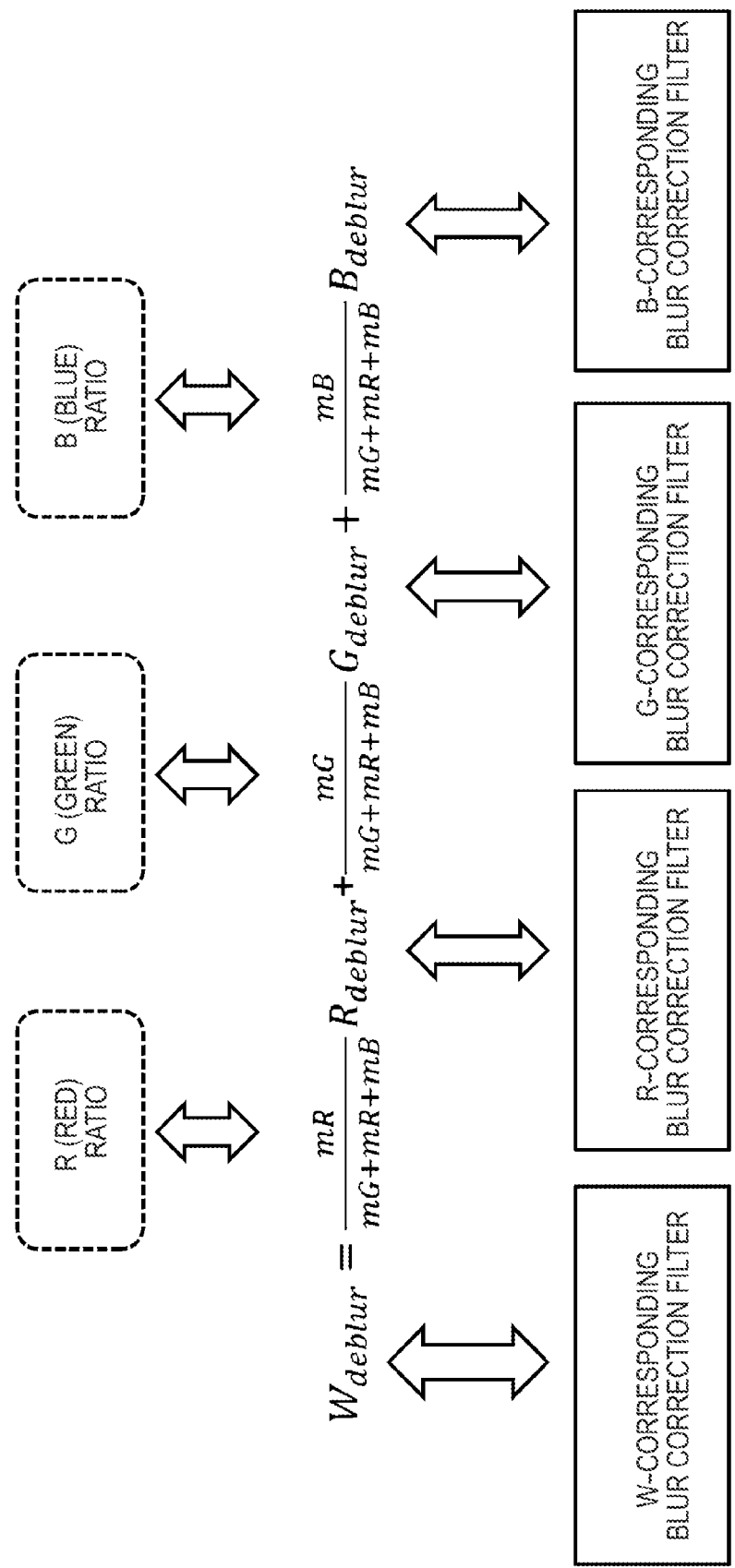
FIG. 28 is a diagram for describing a calculation processing example of a W-corresponding blur correction filter.

The equation illustrated in FIG. 28 is a generation equation of the blur correction filters corresponding to the color ratios.

Three blur correction filters, that is, an R-corresponding blur correction filter, a G-corresponding blur correction filter, and a B-corresponding blur correction filter, are blur correction filters which are stored in advance in the memory of the image processing apparatus and correspond to each color.

These filters are filters which enable an optimal process to be performed in blur correction corresponding to each color according to the MTF characteristics of each color described with reference to FIG. 19.

In the blur correction process of the present embodiment, a blur correction filter to be applied to the W (White) pixel is calculated using these RGB-corresponding blur correction filters, and the color ratios calculated in step S301, that is, the R (Red) ratio, the G (Green) ratio, and the B (Blue) ratio.

In detail, as illustrated in FIG. 28, the blur correction processing section 410 calculates a W-corresponding blur correction filter $W_{deblur}$ according to the following equation.

$$W_{deblur}=(mR/(mG+mR+mB))/R_{deblur}(mG/(mG+mR+mB))/G_{deblur}(mB/(mG+mR+mB))/B_{deblur}.$$

In the equation above, $R_{deblur}$ denotes the R-corresponding blur correction filter, $G_{deblur}$ denotes the G-corresponding blur correction filter, $B_{deblur}$ denotes the B-corresponding blur correction filter, mR/(mG+mR+mB) denotes the R (Red) ratio, mG/(mG+mR+mB) denotes the G (Green) ratio, and mB/(mG+mR+mB) denotes the B (Blue) ratio.

As described above, the blur correction processing section 410 blends the blur correction filters corresponding to each color according to the color ratios of a predetermined pixel area (the 7×7 pixels in the present example) about the W pixel to be corrected, thereby generating the blur correction filter to be applied to the W (White) pixel.

It is possible for the blur correction processing section 410 illustrated in FIG. 22 to apply the W (White) pixel-corresponding blur correction filter having reflected the color ratios and having been generated in step S302, to perform the blur correction process for the image data, which has been generated in the interpolation process and includes the W pixels set as all pixels, to generate the blur-corrected W signal Wd corresponding to all pixels, and to output the generated blur-corrected W signal Wd to the color correlation remosaicing processing section (the data conversion section) 430.

Moreover, it is possible for the blur correction processing section 410 to perform the filter generation process in which an image height and the like are considered for the W (White) pixel-corresponding blur correction filter having reflected the color ratios and having been generated in step S302, similarly to the previous embodiment, to generate a W (White) pixel-corresponding blur correction filter having reflected the image height and the like as well as the color ratios, and to perform the blur correction process for the image data, which has been generated by the interpolation process and includes the W pixels set as all pixels, using the generated W (White) pixel-corresponding blur correction filter.

Hereinafter, this processing example will be described.

In step S303, the blur correction processing section 410 performs the filter generation process in which the image height and the like are considered based on the W (White) pixel-corresponding blur correction filter having reflected the color ratios and having been generated in step S302, similarly to the previous embodiment.

The process of step S303 is equivalent to the process of step S101 of the flowchart in FIG. 5 described in the previous embodiment.

That is, the process of step S303 is performed as the process according to the flowcharts illustrated in FIG. 9 and FIG. 10.

The blur correction filter having reflected the color ratios generated in step S302 is used as the default filter applied in step S122 of the flowchart of FIG. 9.

In detail, the blur correction processing section 410 generates the final blur correction filter Ffinal according to the following procedure.

First, in step S121 of the flowchart of FIG. 9, the blur correction processing section 410 generates the high pass filter HPF_dist corresponding to the image height which is calculated from the pixel position of an image to be corrected.

The high pass filter HPF_dist corresponding to the image height is generated by the processes of steps S131 and S132 of the flowchart illustrated in FIG. 10.

Next, in step S122 of the flowchart illustrated in FIG. 9, the blur correction processing section 410 blends (1) the default filter and (2) the coordinate position-corresponding high pass filter HPF_dist according to the blend coefficient α (focus, r) determined according to the image height r and the focus position information focus, thereby generating (3) the coordinate position-corresponding default filter Fbase.

(1) The default filter is the blur correction filter having reflected the color ratios generated in step S302 of the flowchart illustrated in FIG. 23.

In step S122 of the flowchart illustrated in FIG. 9, the blur correction processing section 410 blends the blur correction filter having reflected the color ratios (the default filter) and the coordinate position-corresponding high pass filter HPF_dist generated in step S121, thereby generating the coordinate position-corresponding default filter Fbase.

The coordinate position-corresponding default filter Fbase is calculated through the following equation based on the blend coefficient α determined according to the image height r and the focus position information focus.

$$F\text{base}=(1.0-\alpha)\times(\text{default filter})+\alpha(\text{HPF\_dist})$$

In the equation above, the default filter is the blur correction filter having reflected the color ratios.

In addition, the blend coefficient α is determined according to the image height r and the focus position information focus as described in the previous embodiment.

As described with reference to FIG. 13, the MTF characteristics generally deteriorate when an image height is increased (a distance from an image center is increased). Particularly, since a high frequency region is buried in noise, enhancing characteristics of the Wiener filter are shifted to a low frequency region as illustrated in (b) of FIG. 13.

In this regard, as illustrated in (c) of FIG. 13, when the image height is increased (the distance from the image center is increased), a blend rate of a high pass filter is allowed to be reduced. That is, it is preferable that the blend coefficient α be allowed to be small.

It can be said that focus shift is similar. That is, as the focus shift is increased, the blend coefficient α is allowed to be small.

In addition, the focus shift corresponds to a value unique to an image processing apparatus (a camera), and a shift amount generated corresponding to each focus position is a unique value in each camera. Accordingly, since a focus shift amount can be calculated from focus position information, the blur correction processing section 410 receives the focus position information (refer to FIG. 22) from the control block 340 illustrated in FIG. 21, calculates the focus shift amount according to a preset calculation equation, and calculates the blend coefficient α (focus, r) using the focus shift amount and the image height r acquired from the image height calculation section 402.

Moreover, in step S123 of the flowchart of FIG. 9, the blur correction processing section 410 applies the magnitude adjustment parameter β (focus, r) corresponding to the image height and the focus position to the coordinate position-corresponding default filter Fbase generated in step S122, thereby generating the blur correction filter Ffinal subject to the enhancing magnitude adjustment, which is to be actually applied to blur correction.

The blur correction filter Ffinal generated in step S123 is a filter to be actually applied to a blur correction process for the pixel (x, y) to be processed.

In addition, the process of applying the magnitude adjustment parameter β (focus, r) corresponding to the image height and the focus position in step S123 is equivalent to the process described with reference to FIG. 14 to FIG. 17.

That is, the coordinate position-corresponding default filter Fbase is band-divided into a DC component and an AC component to obtain two filters, the AC component is multiplied by the enhancing magnitude (the enhancing magnitude adjustment parameter β), and a synthesis process is performed to add the multiplication result to each corresponding coefficient of the DC component, thereby generating the final blur correction filter Ffinal subject to the enhancing magnitude adjustment.

In addition, the enhancing magnitude adjustment parameter β is determined according to the image height r and the focus position information focus, similarly to the blend coefficient α described above. As described with reference to FIG. 17, when the image height is increased (the distance from the image center is increased), the enhancing magnitude adjustment parameter β is allowed to be increased. As the focus shift becomes large, the enhancing magnitude adjustment parameter β is allowed to be increased.

As described above, the blur correction processing section 410 performs the processes according to the flowchart illustrated in FIG. 9 by using the color ratio-corresponding blur correction filter generated in step S302 of the flowchart illustrated in FIG. 23 as the default filter in step S122 of the flowchart illustrated in FIG. 9, thereby generating the final blur correction filter Ffinal.

The final blur correction filter Ffinal is a blur correction filter to be generated in step S303 of the flowchart illustrated in FIG. 23.

In step S304, it is determined whether a pixel to be subjected to blur correction has been saturated.

In detail, the saturation of the pixel to be subjected to the blur correction is detected by a saturation detection section 403 illustrated in FIG. 22, and detection information is input to the blur correction processing section 410.

When the pixel to be subjected to the blur correction has been saturated, if the blur correction is performed, a false color is likely to be generated. This is because the blur correction process includes a process of setting a pixel value of a pixel to be corrected with reference to pixel values of pixels around the pixel to be subjected to the blur correction as described with reference to FIG. 6 and FIG. 7 in the previous embodiment.

In order to prevent the generation of the false color, when a saturation pixel is included around the pixel to be subjected to the blur correction, for example, 7×7 pixels about a pixel to be corrected as illustrated in FIG. 7, no blur correction is performed for the pixel to be corrected.

As described above, the blur correction processing section 410 illustrated in FIG. 22 performs a process for replacing a saturation pixel area with a signal without the blur correction process according to the detection information of a saturation pixel (highlight) area in the saturation detection section 403.

The saturation detection section 403, for example, determines whether pixels of an area of 7×7 pixels about a pixel to be subjected to a blur correction process do not exceed a predetermined threshold value. If at least one pixel of the area of the 7×7 pixels exceeds the threshold value, since the false color is highly likely to be generated, the blur correction processing section 410 performs a process for replacing the pixel area with a signal without the correction process.

This process corresponds to a process when the determination of step S304 of the flowchart illustrated in FIG. 23 is Yes. In this case, step S307 is performed without performing steps S305 and S306.

That is, the blur correction process for a pixel to be processed (a center pixel of the 7×7 pixels) is not performed.

When no pixels of the area of the 7×7 pixels about the pixel to be subjected to the blur correction process exceed the predetermined threshold value and the saturation detection has not been performed, the determination of step S304 is No and a blur correction process using a filter is performed in step S305.

This blur correction process is a process performed by the blur correction processing section 410 illustrated in FIG. 22, and is performed using the blur correction filter generated in step S303 according to the color ratios, the image height and the like.

Next, an edge detection process is performed in step S306. This process is performed by the edge detection section 421 illustrated in FIG. 22. The edge detection section 421 verifies the output signal from the line memory 401 and generates the edge information included in the image, for example, the edge information including the edge direction and the edge magnitude.

In detail, as described above, for example, the edge detection section 421 calculates the flatness weightFlat calculated from the pixel information of the 7×7 pixels about the pixel to be processed (the center pixel of the 7×7 pixels), and outputs the flatness weightFlat to the color correlation remosaicing processing section (the data conversion section) 430.

The flatness weightFlat has values in the range of 0 to 1 as illustrated in FIG. 8, and is an index value of flatness indicating an image state in which flatness is low (many textures) as it approaches 1 and the flatness is high (a few textures) as it approaches 0.

As illustrated in FIG. 8, the flatness weightFlat is calculated using two preset threshold values Limit0 and Limit1 as follows:

If 0≤(ratioFlat)<Limit0, flatness(weightFlat)=0;

If Limit0≤(ratioFlat)<Limit1, flatness(weightFlat)=0 to 1; and

If Limit1≤(ratioFlat), flatness(weightFlat)=1.

The edge detection section 421, for example, outputs information on the flatness weightFlat to the color correlation remosaicing processing section 430 as the edge information.

In addition, as described above, since the flatness weightFlat calculation process can be performed as the same process as a process disclosed in Japanese Unexamined Patent Application Publication No. 2011-55038 which is the present applicant's priority application, details of the flatness weightFlat calculation process can be found in Japanese Unexamined Patent Application Publication No. 2011-55038.

Next, a color correlation remosaicing process is performed in step S307.

The color correlation remosaicing process is performed by the color correlation remosaicing processing section (the data conversion section) 430 of FIG. 22.

The color correlation remosaicing processing section 430 performs the conversion process from the RGBW color array to the RGB array.

In detail, as described with reference to FIG. 20, the color correlation remosaicing processing section 430 performs the following five conversion or correction processes:

Converting the $W$ pixel position to the $G$ pixel(estimating the $G$ pixel value)=($G$on$W$);

Converting the $G$ pixel position to the $R$ pixel(estimating the $R$ pixel value)=($R$on$G$);

Converting the $G$ pixel position to the $B$ pixel(estimating the $B$ pixel value)=($B$on$G$);

Converting the $R$ pixel position to the $R$ pixel(correcting the $R$ pixel value)=($R$on$R$); and Converting the $B$ pixel position to the $B$ pixel(correcting the $B$ pixel value)=($B$on$B$).

On the assumption that there is positive correlation between a W signal (a main component of luminance in the RGBW array) and G, R, and B signals (color components), the color correlation remosaicing processing section 430 estimates a target pixel value of RGB to be set to each pixel of the RGBW array.

As illustrated in FIG. 22, the color correlation remosaicing processing section 430 includes the W position G interpolation parameter calculation part 431, the G position RB interpolation parameter calculation part 432, the R position R interpolation parameter calculation part 433, the B position B interpolation parameter calculation part 434, and the weighted addition part 435.

First, the process of the W position G interpolation parameter calculation part 431 for converting the W pixel position of the RGBW array to the G pixel of the RGB array (estimating the G pixel value) will be described.

The W position G interpolation parameter calculation part 431 calculates an interpolation parameter to be applied to calculation of the G pixel value to be set to the W pixel position of the RGBW array. The interpolation parameter is an interpolation parameter to be applied to the process of GonW.

In detail, using Win and Gin signals of the output signal from the line memory 401 and the blur-corrected W signal Wd input from the blur correction processing section 410, the W position G interpolation parameter calculation part 431 calculates signal values of a G signal with blur correction (Gd) and a G signal without blur correction (Gl).

These signal values correspond to interpolation parameters (GonW interpolation parameters) to be applied to the G pixel value calculation for setting the G pixel of the RGB array at the W pixel position of the RGBW array.

In addition, the color correlation remosaicing processing section 430 also performs a process by setting an area of 7×7 pixels as a processing unit. First, the W position G interpolation parameter calculation part 431 calculates a ratio of the G signal with respect to the W signal in the area of the 7×7 pixels as the processing unit.

In detail, the W position G interpolation parameter calculation part 431 sets the area of the 7×7 pixels, where the W pixel to be converted to the G pixel is a center pixel, as the processing unit, and calculates low frequency components mW and mG of the W signal and the G signal.

In detail, it is possible for the W position G interpolation parameter calculation part 431 to calculate the low frequency components using the filter that calculates low frequency components as described with reference to FIG. 27. An example of an mW calculation filter 601 for calculating the low frequency component mW is illustrated in (1) of FIG. 29.

The W position G interpolation parameter calculation part 431 multiplies the values of the W pixels of the 7×7 pixels about the W pixel position of a pixel to be converted of an input signal of the 7×7 pixels by a filter coefficient of a corresponding pixel position of the mW calculation filter 601, thereby calculating an addition value of multiplication results as the low frequency component mW of the W signal. Since the filter coefficient illustrated in (1) of FIG. 29 is an example, other coefficients may be used.

Figure 30:
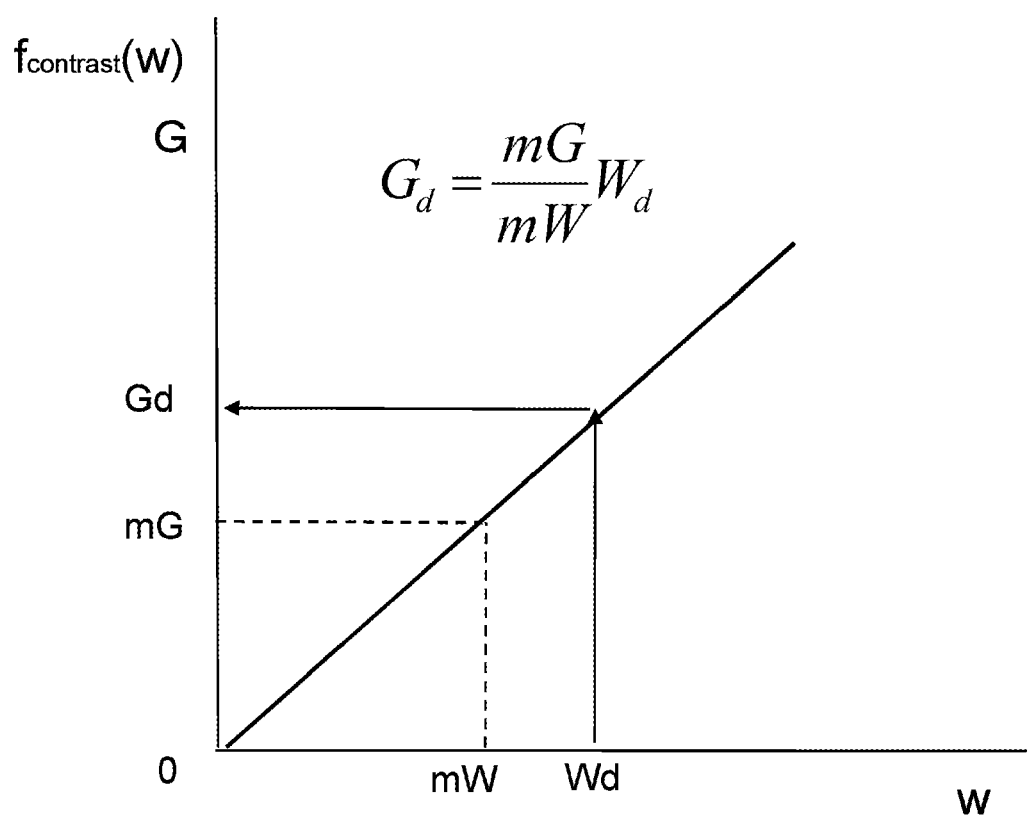
FIG. 30 is a diagram for describing an example of a correspondence relation between pixel value ratios of W and G in a local area.

The calculated ratio of the G signal with respect to the W signal is assumed to be held in a local area of an image. Based on this assumption, a correspondence relation of the ratio of W and G pixel values in the local area is indicated by a graph illustrated in FIG. 30. In the graph of FIG. 30, a horizontal axis denotes the W pixel value and a vertical axis denotes the G pixel value. In a specific narrow local area of an image, if the ratio of the W and G pixel values is assumed to be constant, it is possible to assume that there is a direct proportional relation between the W pixel value and the G pixel value as illustrated in FIG. 30.

Based on this assumption, using the blur-corrected white (W) signal Wd at a position of a pixel to be converted, which is output from the blur correction processing section 410, the W position G interpolation parameter calculation part 431 calculates the G signal with blur correction (Gd) through the following equation.

$$Gd=(mG/mW) \times Wd$$

The signal Gd is a G signal including a high frequency component.

So far, the estimation technique of assuming that the ratio of the W and G pixel values is constant has been described as an example. However, other techniques using the correlation of the W and G pixel values may be used.

As described above, the W position G interpolation parameter calculation part 431 calculates the values of the G signal with blur correction (Gd) and the G signal without blur correction (Gl) as the interpolation parameters to be applied to the calculation of the G pixel value to be set at the W pixel position of the RGBW array. The weighted addition part 435 performs a blend process for the two signals Gd and Gl according to edge information of the image to be converted, thereby determining a final G pixel value.

A calculation process of the G signal without blur correction (Gl) will be described. At the time of the calculation of the G signal without blur correction (Gl), the W position G interpolation parameter calculation part 431 calculates a W signal Wn having no noise using a Wn calculation filter 602 serving as a smoothing filter illustrated in (2) of FIG. 29.

The W position G interpolation parameter calculation part 431 multiplies the values of W pixels of nine pixels about a W pixel position of a pixel 502 to be converted of an input signal 501 of 7×7 pixels by a filter coefficient of a corresponding pixel position of the Wn calculation filter 602, thereby calculating an addition value of multiplication results as the noise-removed white (W) signal Wn of the W signal. Since the filter coefficient illustrated in (2) of FIG. 29 is an example, other coefficients may be used. Furthermore, an area wider than the nine pixels may be used. Furthermore, in order to reduce an operation cost, the W signal input from the line memory 401 may be used as is.

Using the noise-removed white (W) signal Wn and the low frequency components mW and mG of the W signal and the G signal, the W position G interpolation parameter calculation part 431 calculates the G signal without blur correction (Gl) through the following equation.

$$Gl = (mG/mW) \times Wn$$

The signal Gl is not a signal to which the blur-corrected signal Wd has been applied, and corresponds to a G signal in which a high frequency component is not emphasized.

So far, the estimation technique of assuming that the ratio of the W and G pixel values is constant has been described as an example. However, other techniques using the correlation of the W and G pixel values may be used.

The weighted addition part 435 performs a blend process for the two signals Gd and Gl according to edge information of the image to be converted, thereby determining a final G pixel value. In detail, since the ratio of the G signal with blur correction (Gd) is high at an edge part, at which the degree of texture is high, rather than a flat part, the weighted addition part 435 performs a blend process for increasing the ratio of the G signal without blur correction (Gl) at the flat portion, thereby determining the final G pixel value.

The G position RB interpolation parameter calculation part 432 calculates interpolation parameters to be applied to processes, that is, converting the G pixel position to the R pixel (estimating the R pixel value)=(RonW) and converting the G pixel position to the B pixel (estimating the B pixel value)= (BonG).

In detail, the G position RB interpolation parameter calculation part 432 calculates the values of an R signal with blur correction (Rd), an R signal without blur correction (Rl), a B signal with blur correction (Bd), and a B signal without blur correction (Bl).

These signal values correspond to interpolation parameters (a RonG interpolation parameter and a BonG interpolation parameter) to be applied to the R or B pixel value calculation for setting the R or B pixel of the RGB array at the G pixel position of the RGBW array.

Similarly to the process of the W position G interpolation parameter calculation part 431, the calculation process of these signal values is performed as a process of calculating the low frequency components mW, mR, and mB of each signal and calculating the following values using the blur-corrected white (W) signal Wd of the position of a pixel to be converted, which is output from the blur correction processing section 410:

the R signal with blur correction (Rd);
the B signal with blur correction (Bd);
the R signal without blur correction (Rl); and
the B signal without blur correction (Bl).

The G position RB interpolation parameter calculation part 432 calculates these signals through the following equations:

$$Rd = (mR/mW) \times Wd;$$

$$Bd = (mB/mW) \times Wd;$$

$$Rl = (mR/mW) \times Wn; \text{ and}$$

$$Bl = (mB/mW) \times Wn.$$

In the equations above, the signals Rd and Bd include a high frequency component, and the signals Rl and Bl are not signals to which the blur-corrected signal Wd has been applied, and correspond to signals in which a high frequency component is not emphasized.

So far, the estimation technique of assuming that the ratio of the W pixel value and the G or B pixel value is constant has been described as an example. However, other techniques using the correlation of the W pixel value and the G or B pixel value may be used.

Next, the processes of the R position R interpolation parameter calculation part 433 and the B position B interpolation parameter calculation part 434, which are interpolation parameter calculation parts for converting the R pixel position of the RGBW array to the R pixel of the RGB array (estimating the R pixel value) will be described.

Since the R pixel position of the RGBW array corresponds to the R pixel position of the RGB array (the Bayer array), it is possible to use an R signal as is.

Similarly, since the B pixel position of the RGBW array corresponds to the B pixel position of the RGB array (the Bayer array), it is possible to use a B signal as is.

However, in relation to this information, a high frequency signal may be lost due to the influence of aberration of the optical lens. In this case, the characteristics of the R signal and B signal to be set to the G pixel position may be likely to be different from each other.

In order to prevent the occurrence of the difference between the characteristics, the R position R interpolation parameter calculation part 433 calculates a parameter for correcting the R signal using the W signal and the R signal included in the input signal. In detail, the R position R interpolation parameter calculation part 433 calculates the values of the R signal with blur correction (Rd) and the R signal without blur correction (Rl).

These signal values correspond to an interpolation parameter (an RonR interpolation parameter) to be applied to the R pixel value calculation for setting a corrected R pixel of the RGB array at the R pixel position of the RGBW array.

Similarly to other interpolation parameter calculation parts described above, the R position R interpolation parameter calculation part 433 calculates the low frequency component mW of the W signal, the low frequency component mR of the R signal, and the noise-removed white (W) signal Wn of the W signal.

Moreover, using these signals, the R position R interpolation parameter calculation part 433 calculates the R signal with blur correction (Rd) and the R signal without blur correction (Rl) through the following equations:

$$Rd = (mR/mW) \times Wd; \text{ and}$$

$Rl=(mR/mW) \times Wn$.

So far, the estimation technique of assuming that the ratio of the W pixel value and the G or B pixel value is constant has been described as an example. However, other techniques using the correlation of the W pixel value and the G or B pixel value may be used.

Similarly to other interpolation parameter calculation parts described above, the B position B interpolation parameter calculation part 434 calculates the low frequency component mW of the W signal, the low frequency component mB of the B signal, and the noise-removed white (W) signal Wn of the W signal.

Moreover, using these signals, the B position B interpolation parameter calculation part 434 calculates the B signal with blur correction (Bd) and the B signal without blur correction (Bl) through the following equations:

$Bd=(mB/mW) \times Wd$; and $Bl=(mB/mW) \times Wn$.

So far, the estimation technique of assuming that the ratio of the W pixel value and the G or B pixel value is constant has been described as an example. However, other techniques using the correlation of the W pixel value and the G or B pixel value may be used.

As described above, each of the W position G interpolation parameter calculation part 431, the G position RB interpolation parameter calculation part 432, the R position R interpolation parameter calculation part 433, and the B position B interpolation parameter calculation part 434 calculates the G R, and B signals with blur correction (Gd, Rd, and Bd) and the G, R, and B signals without blur correction (Gl, Rl, and Bl).

Next, the process of the weighted addition part 435 will be described.

The weighted addition part 435 calculates weighted average values Gr, Rr, and Br of the signals with blur correction (Gd, Rd, and Bd) and the signals without blur correction (Gl, Rl, and Bl) using the edge information input from the edge detection section 421. Gr, Rr, and Br calculated by the weighted addition part 435 correspond to RGB signal values of pixels constituting the RGB array (the Bayer array) 382 illustrated in FIG. 21.

In each of the W position G interpolation parameter calculation part 431, the G position RB interpolation parameter calculation part 432, the R position R interpolation parameter calculation part 433, and the B position B interpolation parameter calculation part 434, Gd, Rd, and Bd have been calculated using the blur-corrected W signal Wd, which has been generated as the W signal subject to the blur correction process by the blur correction processing section 410. Furthermore, if Gd, Rd, and Bd include a high frequency component, noise of Gd, Rd, and Bd is also amplified at the same time.

Meanwhile, Gl, Rl, and Bl are signals calculated from the W signal not subject to the blur correction process, and do not include a high frequency component, but include a small amount of noise.

The weighted addition part 435 determines the blend rates of the signals with blur correction (Gd, Rd, and Bd) and the signals without blur correction (Gl, Rl, and Bl) according to the edge information of the pixel to be converted, and performs the blend process, thereby determining final G, R, and B pixel values. In detail, since the ratios of the signals with blur correction (Gd, Rd, and Bd) are high at an edge part, at which the degree of texture is high, other than a flat part, the weighted addition part 435 performs the blend process for increasing the ratios of the signals without blur correction (Gl, Rl, and Bl) at the flat portion, thereby determining the final G, R, and B pixel values.

Preferably, there is a sharp signal with a restored high frequency component around the edge. However, since a high frequency component is not originally included at the flat part, it is preferable that there be a signal in which noise has been suppressed.

In this regard, the weighted addition part 435 performs a weighted averaging process for the signals with blur correction (Gd, Rd, and Bd) and the signals without blur correction (Gl, Rl, and Bl) through the following equations according to the edge information of the pixel to be processed calculated by the edge detection section 421, that is, the flatness weightFlat, thereby calculating pixel values Gr, Rr, and Br to be set to the RGB array 382.

$Gr=(\text{weightFlat}) \times (Gd)+(1-\text{weightFlat}) \times Gl$ $Br=(\text{weightFlat}) \times (Bd)+(1-\text{weightFlat}) \times Bl$ $Rr=(\text{weightFlat}) \times (Rd)+(1-\text{weightFlat}) \times Rl$ The weighted addition part 435 outputs Gr, Rr, and Br obtained as calculation results of these equations to the RGB signal processing unit 450 as the signals of the RGB array 382. Through this process, it is possible to obtain the signals Gr, Rr, and Br with high resolution while suppressing the amplification of noise.

However, as described above, when the saturation pixel is detected from the predetermined unit of pixel area, for example, the area of the 7×7 pixels about the pixel to be subjected to the blur correction process, since the blur correction is not performed for the pixel, the signals without blur correction (Gl, Rl, and Bl) are output.

Finally, in step S308, it is determined whether all the input pixels have been completely processed. When there is an unprocessed pixel, the processes of step S301 to step S307 are repeatedly performed for the unprocessed pixel.

In step S308, when it is determined that all the input pixels have been completely processed, the process of the image signal correction unit 400 is ended.

The RGB array (the Bayer array) 382 including Gr, Rr, and Br generated by the weighted addition part 435 is provided to the RGB signal processing unit 450 as illustrated in FIG. 21 and FIG. 22.

In addition, as described above, the data conversion process from the RGBW array to the RGB array, which is performed by the color correlation remosaicing processing section (the data conversion section) 430, may basically use the process disclosed in Japanese Unexamined Patent Application Publication No. 2011-55038 which is the present applicant's priority application. Details of the data conversion process can be found in Japanese Unexamined Patent Application Publication No. 2011-55038.

The RGB signal processing unit 450 is equivalent to a signal processing unit for an RGB array (a Bayer array) included in a general camera or image processing apparatus. The RGB signal processing unit 450 performs signal processing for the RGB array (the Bayer array) 382 output from the weighted addition part 435, thereby generating the color image 383 (refer to FIG. 21). In detail, the RGB signal processing unit 450, for example, performs a white balance process, a demosaicing process, a shading process, an RGB color matrix process, a γ correction process and the like, thereby generating the color image 383.

In addition, in the aforementioned embodiments, a processing example for the RGB array illustrated in (1) of FIG. 20 has been described. However, the process of the present disclosure is not limited the color array. For example, the process of the present disclosure can be applied to captured data of an imaging element provided with a filter having various color arrays including a W pixel having a high sampling rate as compared with a color signal.

Furthermore, in the aforementioned embodiments, the example, in which the blur correction filter to be applied to the blur correction process in step S305 of the flowchart illustrated in FIG. 22 is used as the filter changed in consideration of the image height and the like in step S303 based on the color ratio reflection filter generated in step S302 of the flowchart illustrated in FIG. 22, has been described.

However, for example, the blur correction filter to be applied to the blur correction process in step S305 of the flowchart illustrated in FIG. 22 may be the color ratio reflection filter generated in step S302 of the flowchart illustrated in FIG. 22. That is, the process of step S303 may be omitted.

Furthermore, even when steps S302 and S303 are performed, similarly to the first embodiment described above, for example, step S123 of the flowchart illustrated in FIG. 9, which is a detailed flowchart of the filter generation process of step S303, may be omitted, and the coordinate position-corresponding default filter Fbase generated based on the blend coefficient α (focus, r) in step S122 may be applied as the final blur correction filter.

Alternatively, step S121 or step S122 of the flowchart illustrated in FIG. 9 may be omitted, and the blur correction filter may be generated through only the process of step S123. That is, the color ratio reflection filter generated in step S302 may be used as a default filter, and the filter, which is obtained through the process of step S123 of the flowchart illustrated in FIG. 9, that is, the band division process, the magnitude adjustment of the AC component using the enhancing magnitude adjustment parameter β (focus, r), and the re-synthesis process, which has been described with reference to FIG. 14 and FIG. 15, may be applied to the blur correction.

Furthermore, in the above embodiment, the configuration example, in which the blend coefficient α or the enhancing magnitude adjustment parameter β is determined using the image height r and the focus position information focus, has been described. However, the blend coefficient α or the enhancing magnitude adjustment parameter β may be determined depending only on the image height r. Alternatively, the blend coefficient α or the enhancing magnitude adjustment parameter β may be determined depending only on the focus position information focus. Moreover, the blend coefficient α or the enhancing magnitude adjustment parameter β may be determined in consideration of other parameters, for example, a zoom position and the like.

6. Conclusion of Configuration of Present Disclosure

So far, the embodiment of the present disclosure has been described in detail with reference to a specific embodiment. However, it should be noted that various modifications and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Note that the present technology may also be configured as below.

(1) An image processing apparatus comprising an image signal correction unit for performing a blur correction process on an image, wherein the image signal correction unit includes a blur correction processing section configured to perform a blend process for a default filter and a coordinate position-corresponding high pass filter, which is generated according to an image height of a pixel to be subjected to blur correction, using a blend coefficient determined according to the image height of the pixel to be subjected to blur correction, and to perform a blur correction process using a filter generated through the blend process.

(2) The image processing apparatus according to (1), wherein the blur correction processing section performs a blend process for the default filter and the coordinate position-corresponding high pass filter using a blend coefficient determined according to the image height of the pixel to be subjected to blur correction and focus position information, and performs the blur correction process using a filter generated through the blend process.

(3) The image processing apparatus according to (1) or (2), wherein the blur correction processing section performs the blend process to reduce a blend rate of the coordinate position-corresponding high pass filter when the image height is increased as a pixel position of the pixel to be subjected to blur correction becomes farther from an image center.

(4) The image processing apparatus according to any one of (1) to (3), wherein the blur correction processing section blends a high pass filter HPF_x for x direction adjustment, a high pass filter HPF_y for y direction adjustment, and a center filter HPF_center corresponding to a center position of a view angle [(x,y)=(0,0)] according to a pixel position of the pixel to be subjected to blur correction, thereby generating the coordinate position-corresponding high pass filter, the high pass filter HPF_x and the high pass filter HPF_y being held in a memory in advance.

(5) The image processing apparatus according to any one of (1) to (4), wherein the blur correction processing section generates a magnitude adjustment filter by performing enhancing magnitude adjustment for the coordinate position-corresponding high pass filter according to the image height of the pixel to be subjected to blur correction, and performs the blur correction process using the magnitude adjustment filter.

(6) The image processing apparatus according to any one of (1) to (5), wherein the blur correction processing section divides the coordinate position-corresponding high pass filter into a DC component and an AC component, performs an adjustment process for the AC component using a magnitude adjustment parameter corresponding to the image height of the pixel to be subjected to blur correction, and re-synthesizes the DC component with the AC component for which the adjustment process has been performed, thereby generating the magnitude adjustment filter.

(7) The image processing apparatus according to any one of (1) to (6), wherein the blur correction processing section performs enhancing magnitude adjustment for the coordinate position-corresponding high pass filter using the image height of the pixel to be subjected to blur correction and a magnitude adjustment parameter corresponding to focus position information, thereby generating the magnitude adjustment filter.

(8) The image processing apparatus according to any one of (1) to (7), wherein the image signal correction unit further includes:

an edge detection section configured to detect edge information of an image; and a blend processing section configured to output an image signal correction result, wherein the blend processing section receives the edge information output from the edge detection section, a blur-corrected signal generated by the blur correction processing section through the blur correction process, and a signal without blur correction before the blur correction process is performed, and performs a blend process for the blur-corrected signal and the signal without blur correction according to a blend rate determined according to the edge information, thereby generating an output signal.

(9) The image processing apparatus according to any one of (1) to (8), wherein the image signal correction unit is configured to perform the blur correction process for an output signal of an imaging element having an RGBW array including RGB pixels and a W (White) pixel, and at a time of the blur correction process for a W pixel signal to be corrected, the image signal correction unit generates a color ratio reflection blur correction filter having reflected a color ratio of a local area including the W pixel signal, and performs the blur correction process using the color ratio reflection blur correction filter.

(10) The image processing apparatus according to any one of (1) to (9), wherein the blur correction processing section generates an interpolated image having the W pixel signal corresponding to all pixels through an interpolation process using the W pixel signal included in the output signal of the imaging element, generates the color ratio reflection blur correction filter for each W pixel constituting the generated interpolated image, and performs the blur correction process using the color ratio reflection blur correction filter.

(11) The image processing apparatus according to any one of (1) to (10), wherein the blur correction processing section calculates low frequency components of RGB colors of the local area, and sets a ratio of values of the calculated low frequency components of the RGB colors as the color ratio of the local area.

(12) The image processing apparatus according to any one of (1) to (11), wherein the blur correction processing section blends an R-corresponding blur correction filter, a G-corresponding blur correction filter, a B-corresponding blur correction filter held in a memory in advance according to a blend rate determined according to RGB color ratios of the local area, thereby generating the color ratio reflection blur correction filter.

(13) The image processing apparatus according to any one of (1) to (12), wherein the image signal correction unit includes:
    a saturation detection section configured to detect whether a saturation pixel is included in a local area including a plurality of pixels having the pixel to be subjected to blur correction,
    wherein the blur correction processing section receives detection information from the saturation detection section, does not perform blur correction on the pixel to be subjected to blur correction when the saturation pixel is included in the local area, and performs the blur correction on the pixel to be subjected to blur correction only when the saturation pixel is not included in the local area.

(14) An image processing apparatus comprising an image signal correction unit for performing a blur correction process on an image,
    wherein the image signal correction unit divides a filter for blur correction into a DC component and an AC component, performs magnitude adjustment for the AC component using a magnitude adjustment parameter to be calculated according to an image height of a pixel to be subjected to blur correction, re-synthesizes the DC component with the AC component for which the magnitude adjustment has been performed to generate a magnitude adjustment filter, and performs blur correction using the magnitude adjustment filter.

Additionally, the configuration of the present disclosure is included in a method of performing a process to be performed in the aforementioned apparatus and system, a program for allowing the process to be performed, and a recording medium recording the program.

Furthermore, a series of processes described in the specification can be performed by hardware, software or a composite configuration thereof. When the processes are performed by software, a program recording a process sequence can be executed after being installed in a memory in a computer embedded in dedicated hardware, or the program can be executed after being installed in a general purpose computer capable of performing various processes. For example, the program can be recorded on a recording medium in advance. In addition to the installation from a recording medium to a computer, the program can be received through a network such as a local area network (LAN) or the Internet, and can be installed on a recording medium such as an embedded hard disk.

In addition, various processes described in the specification may not only be performed in time series according to a description, but may also be performed in a parallel or individual manner according to processing capability of an apparatus for performing processes or necessity. Furthermore, the system in the present specification corresponds to a logical aggregate configuration of a plurality of apparatuses and the apparatuses of each configuration are not necessarily in the same housing.

As described above, according to the configuration of an embodiment of the present disclosure, an apparatus and method for performing an optimal blur correction process according to an image height and the like of each pixel constituting an image are realized.

In detail, the apparatus includes an image signal correction unit for performing a blur correction process on an image, wherein the image signal correction unit blends a default filter and a coordinate position-corresponding high pass filter, which is generated according to an image height of a pixel to be subjected to blur correction, using a blend coefficient corresponding to the image height of the pixel to be subjected to blur correction, and performs blur correction using a filter generated through the blend process. For example, when the image height is increased the farther a pixel position of the pixel to be subjected to blur correction is from an image center, the image signal correction unit performs a blend process to reduce a blend rate of the coordinate position-corresponding high pass filter. Alternatively, the image signal correction unit generates a magnitude adjustment blur correction filter for which magnitude adjustment has been performed according to the image height, and performs blur correction.

Through the present processes, the optimal blur correction process according to an image height and the like of each pixel constituting an image is realized.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-194417 filed in the Japan Patent Office on Sep. 6, 2011 and Japanese Priority Patent Application JP 2011-194418 filed in the Japan Patent Office on Sep. 6, 2011, the entire content of which is hereby incorporated by reference.

What is claimed is:

1. An image processing apparatus comprising an image signal correction unit for performing a blur correction process on an image, wherein the image signal correction unit includes a blur correction processing section configured to perform a blend process for a default filter and a coordinate position-corresponding high pass filter, which is generated according to an image height of a pixel to be subjected to blur correction, using a blend coefficient determined according to the image height of the pixel to be subjected to blur correction, and to perform a blur correction process using a filter generated through the blend process.

2. The image processing apparatus according to claim 1, wherein the blur correction processing section performs a blend process for the default filter and the coordinate position-corresponding high pass filter using a blend coefficient determined according to the image height of the pixel to be subjected to blur correction and focus position information, and performs the blur correction process using a filter generated through the blend process.

3. The image processing apparatus according to claim 1, wherein the blur correction processing section performs the blend process to reduce a blend rate of the coordinate position-corresponding high pass filter when the image height is increased as a pixel position of the pixel to be subjected to blur correction becomes farther from an image center.

4. The image processing apparatus according to claim 1, wherein the blur correction processing section blends a high pass filter HPF_x for x direction adjustment, a high pass filter HPF_y for y direction adjustment, and a center filter HPF_center corresponding to a center position of a view angle [(x,y)=(0,0)] according to a pixel position of the pixel to be subjected to blur correction, thereby generating the coordinate position-corresponding high pass filter, the high pass filter HPF_x and the high pass filter HPF_y being held in a memory in advance.

5. The image processing apparatus according to claim 1, wherein the blur correction processing section generates a magnitude adjustment filter by performing enhancing magnitude adjustment for the coordinate position-corresponding high pass filter according to the image height of the pixel to be subjected to blur correction, and performs the blur correction process using the magnitude adjustment filter.

6. The image processing apparatus according to claim 5, wherein the blur correction processing section divides the coordinate position-corresponding high pass filter into a DC component and an AC component, performs an adjustment process for the AC component using a magnitude adjustment parameter corresponding to the image height of the pixel to be subjected to blur correction, and re-synthesizes the DC component with the AC component for which the adjustment process has been performed, thereby generating the magnitude adjustment filter.

7. The image processing apparatus according to claim 5, wherein the blur correction processing section performs enhancing magnitude adjustment for the coordinate position-corresponding high pass filter using the image height of the pixel to be subjected to blur correction and a magnitude adjustment parameter corresponding to focus position information, thereby generating the magnitude adjustment filter.

8. The image processing apparatus according to claim 1, wherein the image signal correction unit further includes:
an edge detection section configured to detect edge information of an image; and
a blend processing section configured to output an image signal correction result,
wherein the blend processing section receives the edge information output from the edge detection section, a blur-corrected signal generated by the blur correction processing section through the blur correction process, and a signal without blur correction before the blur correction process is performed, and performs a blend process for the blur-corrected signal and the signal without blur correction according to a blend rate determined according to the edge information, thereby generating an output signal.

9. The image processing apparatus according to claim 1, wherein the image signal correction unit is configured to perform the blur correction process for an output signal of an imaging element having an RGBW array including RGB pixels and a W (White) pixel, and at a time of the blur correction process for a W pixel signal to be corrected, the image signal correction unit generates a color ratio reflection blur correction filter having reflected a color ratio of a local area including the W pixel signal, and performs the blur correction process using the color ratio reflection blur correction filter.

10. The image processing apparatus according to claim 9, wherein the blur correction processing section generates an interpolated image having the W pixel signal corresponding to all pixels through an interpolation process using the W pixel signal included in the output signal of the imaging element, generates the color ratio reflection blur correction filter for each W pixel constituting the generated interpolated image, and performs the blur correction process using the color ratio reflection blur correction filter.

11. The image processing apparatus according to claim 9, wherein the blur correction processing section calculates low frequency components of RGB colors of the local area, and sets a ratio of values of the calculated low frequency components of the RGB colors as the color ratio of the local area.

12. The image processing apparatus according to claim 9, wherein the blur correction processing section blends an R-corresponding blur correction filter, a G-corresponding blur correction filter, a B-corresponding blur correction filter held in a memory in advance according to a blend rate determined according to RGB color ratios of the local area, thereby generating the color ratio reflection blur correction filter.

13. The image processing apparatus according to claim 1, wherein the image signal correction unit includes:
a saturation detection section configured to detect whether a saturation pixel is included in a local area including a plurality of pixels having the pixel to be subjected to blur correction,
wherein the blur correction processing section receives detection information from the saturation detection section, does not perform blur correction on the pixel to be subjected to blur correction when the saturation pixel is included in the local area, and performs the blur correction on the pixel to be subjected to blur correction only when the saturation pixel is not included in the local area.

14. An image processing apparatus comprising an image signal correction unit for performing a blur correction process on an image,
wherein the image signal correction unit divides a filter for blur correction into a DC component and an AC component, performs magnitude adjustment for the AC component using a magnitude adjustment parameter to be calculated according to an image height of a pixel to be subjected to blur correction, re-synthesizes the DC component with the AC component for which the magnitude adjustment has been performed to generate a magnitude adjustment filter, and performs blur correction using the magnitude adjustment filter.

15. An image processing method of performing a blur correction process on an image with an image processing apparatus, comprising:

performing, with an image signal correction unit, a blend process for blending a default filter and a coordinate position-corresponding high pass filter, which is generated according to an image height of a pixel to be subjected to blur correction according to a blend rate determined according to the image height of the pixel to be subjected to blur correction, and performing the blur correction process using a filter generated through the blend process.

16. An image processing method of performing a blur correction process on an image with an image processing apparatus, comprising:
dividing, with an image signal correction unit, a filter for blur correction into a DC component and an AC component,
performing magnitude adjustment for the AC component using a magnitude adjustment parameter to be calculated according to an image height of a pixel to be subjected to blur correction,
re-synthesizing the DC component with the AC component for which the magnitude adjustment has been performed to generate a magnitude adjustment filter, and performing blur correction using the magnitude adjustment filter.

17. A non-transitory computer-readable medium on which is stored a program for causing a blur correction process on an image to be performed in an image processing apparatus,
wherein the program causes an image signal correction unit to perform:
a blend process for blending a default filter and a coordinate position-corresponding high pass filter, which is generated according to an image height of a pixel to be subjected to blur correction according to a blend rate determined according to the image height of the pixel to be subjected to blur correction, and
the blur correction process using a filter generated through the blend process.

18. A non-transitory recording medium having recorded thereon a program for causing a blur correction process on an image to be performed in an image processing apparatus,
wherein the recording medium has recorded thereon the program for causing an image signal correction unit to perform:
a blend process for blending a default filter and a coordinate position-corresponding high pass filter, which is generated according to an image height of a pixel to be subjected to blur correction according to a blend rate determined according to the image height of the pixel to be subjected to blur correction, and
the blur correction process using a filter generated through the blend process.

19. An image processing apparatus including a blur correction processing section configured to perform a blur correction process for an output signal of an imaging element having an RGBW array including RGB pixels and a W (white) pixel,
wherein at a time of the blur correction process for a W pixel signal to be corrected, the blur correction processing section generates a color ratio reflection blur correction filter having reflected a color ratio of a local area including the W pixel signal, and performs the blur correction process using the color ratio reflection blur correction filter.

20. The image processing apparatus according to claim 19, wherein the blur correction processing section generates an interpolated image having the W pixel signal corresponding to all pixels through an interpolation process using the W pixel signal included in the output signal of the imaging element, generates the color ratio reflection blur correction filter for each W pixel constituting the generated interpolated image, and performs the blur correction process using the color ratio reflection blur correction filter.

21. The image processing apparatus according to claim 19, wherein the blur correction processing section calculates low frequency components of RGB colors of the local area, and sets a ratio of values of the calculated low frequency components of the RGB colors as the color ratio of the local area.

22. An image processing method of performing a blur correction process on an image with an image processing apparatus, the image processing method comprising:
performing, with a blur correction processing section, a blur correction process for an output signal of an imaging element having an RGBW array including RGB pixels and a W (white) pixel,
wherein in the blur correction process, at a time of the blur correction process for a W pixel signal to be corrected, a color ratio reflection blur correction filter having reflected a color ratio of a local area including the W pixel signal is generated, and the blur correction process uses the color ratio reflection blur correction filter.

* * * * *